(12) United States Patent
Hirschmann et al.

(10) Patent No.: US 8,236,390 B2
(45) Date of Patent: Aug. 7, 2012

(54) LIQUID-CRYSTALLINE MEDIUM

(75) Inventors: Harald Hirschmann, Darmstadt (DE); Michael Wittek, Darmstadt (DE); Sabine Schoen, Herten (DE)

(73) Assignee: Merck Patent Gesellschaft mit beschränkter Haftung, Darmstadt (DE)

( * ) Notice: Subject to any disclaimer, the term of this patent is extended or adjusted under 35 U.S.C. 154(b) by 0 days.

(21) Appl. No.: 12/809,828

(22) PCT Filed: Dec. 17, 2008

(86) PCT No.: PCT/EP2008/010736
§ 371 (c)(1), (2), (4) Date: Jun. 21, 2010

(87) PCT Pub. No.: WO2009/080261
PCT Pub. Date: Jul. 2, 2009

(65) Prior Publication Data
US 2010/0320420 A1 Dec. 23, 2010

(30) Foreign Application Priority Data
Dec. 21, 2007 (DE) .......... 10 2007 061 997
May 23, 2008 (DE) .......... 10 2008 024 866

(51) Int. Cl.
*C09K 19/34* (2006.01)
*C09K 19/30* (2006.01)
*C09K 19/12* (2006.01)

(52) U.S. Cl. ............ 428/1.1; 252/299.61; 252/299.63; 252/299.66

(58) Field of Classification Search .......... 428/1.1; 252/299.61, 299.63, 299.66
See application file for complete search history.

(56) References Cited

U.S. PATENT DOCUMENTS

| | | | |
|---|---|---|---|
| 7,189,440 B2 | 3/2007 | Manabe et al. | |
| 7,579,053 B2 * | 8/2009 | Czanta et al. | 428/1.1 |
| 7,635,505 B2 * | 12/2009 | Manabe et al. | 428/1.1 |
| 7,964,253 B2 * | 6/2011 | Wittek et al. | 428/1.1 |
| 2005/0205842 A1 | 9/2005 | Heckmeier et al. | |
| 2006/0061699 A1 | 3/2006 | Kirsch et al. | |
| 2006/0278850 A1 | 12/2006 | Czanta et al. | |
| 2007/0221880 A1 | 9/2007 | Czanta et al. | |
| 2007/0228327 A1 | 10/2007 | Hirschmann et al. | |
| 2008/0128653 A1 * | 6/2008 | Manabe et al. | 252/299.63 |

FOREIGN PATENT DOCUMENTS

| | | |
|---|---|---|
| DE | 10 2004 056 901 A1 | 7/2005 |
| EP | 1 832 643 A1 | 9/2007 |
| WO | WO 2004/048501 A1 | 6/2004 |
| WO | WO 2005123879 A1 * | 12/2005 |

OTHER PUBLICATIONS

International Search Report of PCT/EP2008/010736 (Mar. 12, 2009).

* cited by examiner

*Primary Examiner* — Shean Wu
(74) *Attorney, Agent, or Firm* — Millen, White, Zelano & Branigan, P.C.

(57) ABSTRACT

The invention relates to a liquid-crystalline medium based on a mixture of polar compounds, characterized in that it comprises one or more compounds of the formula I

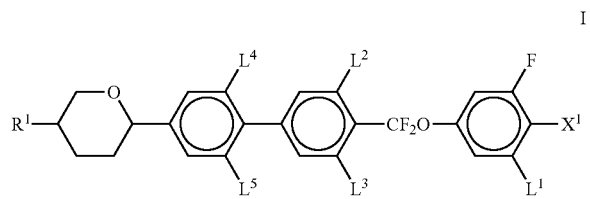

in which $R^1$, $X^1$, $L^{1-5}$ have the meanings indicated in Claim 1, and to the use thereof for electro-optical purposes, in particular TN monitor applications.

22 Claims, No Drawings

LIQUID-CRYSTALLINE MEDIUM

The present invention relates to a liquid-crystalline medium, to the use thereof for electro-optical purposes, and to displays containing this medium.

Liquid crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (super-birefringence effect) cells and OMI (optical mode interference) cells. The commonest display devices are based on the Schadt-Helfrich effect and have a twisted nematic structure.

The liquid-crystal materials must have good chemical and thermal stability and good stability to electric fields and electromagnetic radiation. Furthermore, the liquid-crystal materials should have low viscosity and produce short addressing times, low threshold voltages and high contrast in the cells.

They should furthermore have a suitable mesophase, for example a nematic or cholesteric mesophase for the above-mentioned cells, at the usual operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, have to satisfy various requirements depending on the cell type and area of application. For example, materials for cells having a twisted nematic structure should have positive dielectric anisotropy and low electrical conductivity.

For example, for matrix liquid-crystal displays with integrated non-linear elements for switching individual pixels (MLC displays), media having large positive dielectric anisotropy, broad nematic phases, relatively low birefringence, very high specific resistance, good UV and temperature stability and lower vapour pressure are desired.

Matrix liquid-crystal displays of this type are known. Non-linear elements which can be used for individual switching of the individual pixels are, for example, active elements (i.e. transistors). The term "active matrix" is then used, where a distinction can be made between two types:
1. MOS (metal oxide semiconductor) or other diodes on a silicon wafer as substrate.
2. Thin-film transistors (TFTs) on a glass plate as substrate.

The use of single-crystal silicon as substrate material restricts the display size, since even modular assembly of various part-displays results in problems at the joints.

In the case of the more promising type 2, which is preferred, the electro-optical effect used is usually the TN effect. A distinction is made between two technologies: TFTs comprising compound semiconductors, such as, for example, CdSe, or TFTs based on polycrystalline or amorphous silicon. Intensive work is being carried out worldwide on the latter technology.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The TFT displays usually operate as TN cells with crossed polarisers in transmission and are back-lit.

The term MLC displays here encompasses any matrix display with integrated non-linear elements, i.e., besides the active matrix, also displays with passive elements, such as varistors or diodes (MIM=metal-insulator-metal).

MLC displays of this type are particularly suitable for TV applications (for example pocket TVs) or for high-information displays for computer applications (laptops) and in automobile or aircraft construction. Besides problems regarding the angle dependence of the contrast and the response times, difficulties also arise in MLC displays due to insufficiently high specific resistance of the liquid-crystal mixtures [TOGASHI, S., SEKOGUCHI, K., TANABE, H., YAMAMOTO, E., SORIMACHI, K, TAJIMA, E., WATANABE, H., SHIMIZU, H., Proc. Eurodisplay 84, September 1984: A 210-288 Matrix LCD Controlled by Double Stage Diode Rings, pp. 141 ff, Paris; STROMER, M., Proc. Eurodisplay 84, September 1984: Design of Thin Film Transistors for Matrix Addressing of Television Liquid Crystal Displays, pp. 145 ff, Paris]. With decreasing resistance, the contrast of an MLC display deteriorates, and the problem of after-image elimination may occur. Since the specific resistance of the liquid-crystal mixture generally drops over the life of an MLC display owing to interaction with the interior surfaces of the display, a high (initial) resistance is very important in order to achieve acceptable service lives. In particular in the case of low-volt mixtures, it was hitherto impossible to achieve very high specific resistance values. It is furthermore important that the specific resistance exhibits the smallest possible increase with increasing temperature and after heating and/or UV exposure. The low-temperature properties of the mixtures from the prior art are also particularly disadvantageous. It is demanded that no crystallisation and/or smectic phases occur, even at low temperatures, and the temperature dependence of the viscosity is as low as possible. The MLC displays from the prior art thus do not satisfy today's requirements.

There thus continues to be a great demand for MLC displays having very high specific resistance at the same time as a large working-temperature range, short response times even at low temperatures and low threshold voltage which do not have these disadvantages, or only do so to a reduced extent.

In TN (Schadt-Helfrich) cells, media are desired which facilitate the following advantages in the cells:
 extended nematic phase range (in particular down to low temperatures)
 stable on storage, even at extremely low temperatures
 the ability to switch at extremely low temperatures (outdoor use, automobiles, avionics)
 increased resistance to UV radiation (longer service life).

The media available from the prior art do not allow these advantages to be achieved while simultaneously retaining the other parameters.

In the case of supertwisted (STN) cells, media are desired which enable greater multiplexability and/or lower threshold voltages and/or broader nematic phase ranges (in particular at low temperatures). To this end, a further widening of the available parameter latitude (clearing point, smectic-nematic transition or melting point, viscosity, dielectric parameters, elastic parameters) is urgently desired.

The invention has the object of providing media, in particular for MLC, TN or STN displays of this type, which do not have the above-mentioned disadvantages or only do so to a reduced extent, and preferably simultaneously have very high specific resistance values and low threshold voltages.

It has now been found that this object can be achieved if media according to the invention are used in displays.

The invention thus relates to a liquid-crystalline medium based on a mixture of polar compounds, characterised in that it comprises at least one compound of the formula I

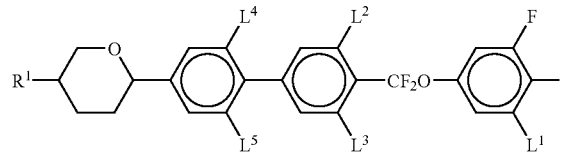

I in which
$R^1$ denotes a halogenated or unsubstituted alkyl or alkoxy radical having 1 to 15 C atoms, where, in addition, one or more $CH_2$ groups in these radicals may each be replaced, independently of one another, by —C≡C—, —CH=CH—, —O—, —CO—O— or —O—CO— in such a way that O atoms are not linked directly to one another,
$X^1$ in each case, independently of one another, denotes F, Cl, CN, $SF_5$, NCS, a halogenated alkyl radical, a halogenated alkenyl radical, a halogenated alkoxy radical or a halogenated alkenyloxy radical having up to 6 C atoms,
$L^1$ to $L^5$ each, independently of one another, denote H or F, with the provisos that
the liquid-crystalline mixture comprises no further compounds having a $CF_2O$ bridge and
no further compounds containing a pyran ring.

WO 2004/048501 A1 and U.S. Pat. No. 7,189,440132 disclose liquid-crystalline mixtures for TN-TFT applications which comprise compounds of the formula I and at least one further pyran compound and/or at least one further mesogenic compound having a $CF_2O$ bridge.

Mixture concepts of this type are distinguished by the fact that they have relatively high values for the rotational viscosity $\gamma_1$ and/or relatively high values for the threshold voltage.

The mixtures according to the invention based on a mixture of polar compounds of positive dielectric anisotropy are preferably suitable for monitor and TV applications since they are distinguished by low rotational viscosities ($\gamma_1$) and low threshold voltages at the same time as high Δn values. The mixtures according to the invention are particularly suitable for TN-TFT monitor applications and in applications with 5 V drivers or with higher-voltage drivers. The broad nematic phase of the compounds of the formula I and the very good $\gamma_1/T_{NI}$ ratio mean that the mixtures according to the invention are particularly suitable for TN-TFT and IPS applications.

The compounds of the formula I have a broad range of applications and some of them are known from the patent specification GB 22 29 438 B. Depending on the choice of substituents, these compounds can serve as base materials of which liquid-crystalline media are predominantly composed; however, it is also possible to add compounds of the formula I to liquid-crystalline base materials from other classes of compound in order, for example, to modify the dielectric and/or optical anisotropy of a dielectric of this type and/or in order to optimise its threshold voltage and/or its viscosity.

In the pure state, the compounds of the formula I are colourless and form liquid-crystalline mesophases in a temperature range which is favourably located for electro-optical use. They are stable chemically, thermally and to light.

$X^1$ in the compounds of the formula I preferably denotes F, Cl, CN, NCS, $CF_3$, $SF_5$, $CF_2H$, $OCF_3$, $OCF_2H$, $OCFHCF_3$, $OCFHCFH_2$, $OCFHCF_2H$, $OCF_2CH_3$, $OCF_2CFH_2$, $OCF_2CF_2H$, $OCF_2CF_2CF_2H$, $OCF_2CF_2CFH_2$, $OCFHCF_2CF_3$, $OCFHCF_2CF_2H$, $OCFHCFHCF_3$, $OCH_2CF_2CF_3$, $OCF_2CF_2CF_3$, $OCF_2CFHCFH_2$, $OCF_2CH_2CF_2H$, $OCFHCF_2CFH_2$, $OCFHCFHCF_2H$, $OCFHCH_2CF_3$, $OCH_2CFHCF_3$, $OCH_2CF_2CF_2H$, $OCF_2CFHCH_3$, $OCF_2CH_2CFH_2$, $OCFHCF_2CH_3$, $OCFHCFHCFH_2$, $OCFHCH_2CF_3$, $OCH_2CF_2CFH_2$, $OCH_2CFHCF_2H$, $OCF_2CH_2CH_3$, $OCFHCFHCH_3$, $OCFHCH_2CFH_2$, $OCH_2CF_2CH_3$, $OCH_2CFHCFH_2$, $OCH_2CH_2CF_2H$, $OCHCH_2CH_3$, $OCH_2CFHCH_3$, $OCH_2CH_2CF_2H$, $OCClFCF_3$, $OCClFCClF_2$, $OCClFCFH_2$, $OCFHCCl_2F$, $OCClFCF_2H$, $OCClFCClF_2$, $OCF_2CClH_2$, $OCF_2CCl_2H$, $OCF_2CCl_2F$, $OCF_2CClFH$, $OCF_2CClF_2$, $OCF_2CF_2CClF_2$, $OCF_2CF_2CCl_2F$, $OCClFCF_2CF_3$, $OCClFCF_2CF_2H$, $OCClFCF_2CClF_2$, $OCClFCFHCF_3$, $OCClFCClFCF_3$, $OCCl_2CF_2CF_3$, $OCCHCF_2CF_3$, $OCClFCF_2CF_3$, $OCClFCClFCF_3$, $OCF_2CClFCFH_2$, $OCF_2CF_2CCl_2F$, $OCF_2CCl_2CF_2H$, $OCF_2CH_2CClF_2$, $OCClFCF_2CFH_2$, $OCFHCF_2CCl_2F$, $OCClFCFHCF_2H$, $OCClFCClFCF_2H$, $OCFHCFHCClF_2$, $OCClFCH_2CF_3$, $OCFHCCl_2CF_3$, $OCCl_2CFHCF_3$, $OCH_2CClFCF_3$, $OCCl_2CF_2CF_2H$, $OCH_2CF_2CClF_2$, $OCF_2CClFCH_3$, $OCF_2CFHCCl_2H$, $OCF_2CCl_2CFH_2$, $OCF_2CH_2CCl_2F$, $OCClFCF_2CH_3$, $OCFHCF_2CCl_2H$, $OCClFCFHCFH_2$, $OCFHCFHCClF_2$, $OCClFCHCF_3$, $OCFHCCl_2CF_3$, $OCCl_2CF_2CFH_2$, $OCH_2CF_2CCl_2F$, $OCCl_2CFHCF_2H$, $OCClHCClFCF_2H$, $OCF_2CClHCClH_2$, $OCF_2CH_2CCl_2H$, $OCClFCFHCH_3$, $OCF_2CClFCCl_2H$, $OCClFCH_2CFH_2$, $OCFHCCl_2CFH_2$, $OCCl_2CF_2CH_3$, $OCH_2CF_2CClH_2$, $OCCl_2CFHCFH_2$, $OCH_2CClFCFCl_2$, $OCH_2CH_2CF_2H$, $OCClHCClHCF_2H$, $OCH_2CCl_2CF_2H$, $OCClFCH_2CH_3$, $OCFHCH_2CCl_2H$, $OCClHCFHCClH_2$, $OCH_2CFHCCl_2H$, $OCCl_2CH_2CF_2H$, $OCH_2CCl_2CF_2H$, CH=$CF_2$, CF=$CF_2$, OCH=$CF_2$, OCF=$CF_2$, CH=CHF, OCH=CHF, CF=CHF, OCF=CHF, in particular F, Cl, CN, NCS, $CF_3$, $SF_5$, $CF_2H$, $OCF_3$, $OCF_2H$, $OCFHCF_3$, $C_2F_5$, $C_3F_7$, $OCFHCFH_2$, $OCFHCF_2H$, $OCF_2CH_3$, $OCF_2CFH_2$, $OCF_2CF_2H$, $OCF_2CF_2CF_2H$, $OCF_2CF_2CFH_2$, $OCFHCF_2CF_3$, OCH=$CF_2$, OCF=$CF_2$, $OCFHCF_2CF_2H$, $OCF_2CF_2CF_3$ or $OCF_2CHFCF_3$.

In the compounds of the formula I, $X^1$ preferably denotes F or $OCF_3$. $L^1$, $L^2$ and $L^3$ preferably each denote F. $L^4$ and $L^5$ preferably each denote H. $R^1$, $R^2$ and $R^3$ each, independently of one another, preferably denote alkyl, in particular straight-chain alkyl having 1-6 C atoms.

If $R^1$ in the formula I denotes an alkyl radical and/or an alkoxy radical, this may be straight-chain or branched. It is preferably straight-chain, has 2, 3, 4, 5, 6 or 7 C atoms and accordingly preferably denotes ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy.

Oxaalkyl preferably denotes straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, or 2-, 3-, 4-, 5-, 6-, 7-, 8- or 9-oxadecyl.

If $R^1$ denotes an alkyl radical in which one $CH_2$ group has been replaced by —CH=CH—, this may be straight-chain or branched. It is preferably straight-chain and has 2 to 10 C atoms. Accordingly, it denotes, in particular, vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, or dec-1-, -2-, -3-, -4-, -5-, -6-, -7-, -8- or -9-enyl. $R^1$ preferably denotes $CH_2$=CH, $CH_3CH$=CH, $CH_2$=$CHCH_2CH_2$ or $CH_3CH$=$CHCH_2CH_2$.

If $R^1$ denotes an alkyl radical in which one $CH_2$ group has been replaced by —O— and one has been replaced by —CO—, these are preferably adjacent. These thus contain an acyloxy group —CO—O— or an oxycarbonyl group —O—CO—. These are preferably straight-chain and have 2 to 6 C atoms. Accordingly, they denote, in particular, acetoxy, propionyloxy, butyryloxy, pentanoyloxy, hexanoyloxy, acetoxymethyl, propionyloxymethyl, butyryloxymethyl, pentanoyloxymethyl, 2-acetoxyethyl, 2-propionyloxyethyl, 2-butyryloxyethyl, 3-acetoxypropyl, 3-propionyloxypropyl, 4-acetoxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxycarbonyl)propyl, 3-(ethoxycarbonyl)propyl or 4-(methoxycarbonyl)butyl.

If $R^1$ denotes an alkyl radical in which one $CH_2$ group has been replaced by unsubstituted or substituted —CH=CH— and an adjacent $CH_2$ group has been replaced by CO or CO—O or O—CO, this may be straight-chain or branched. It is preferably straight-chain and has 4 to 12 C atoms. Accordingly, it denotes, in particular, acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyl, 8-acryloyloxyoctyl, 9-acryloyloxynonyl, 10-acryloyloxydecyl, methacryloyloxymethyl, 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl, 8-methacryloyloxyoctyl or 9-methacryloyloxynonyl.

If $R^1$ denotes an alkyl or alkenyl radical which is monosubstituted by CN or $CF_3$, this radical is preferably straight-chain. The substitution by CN or $CF_3$ is in any desired position.

If $R^1$ denotes an alkyl or alkenyl radical which is at least monosubstituted by halogen, this radical is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the ω-position.

Compounds containing branched wing groups $R^1$ may occasionally be of importance owing to better solubility in the conventional liquid-crystalline base materials, but in particular as chiral dopants if they are optically active. Smectic compounds of this type are suitable as components of ferroelectric materials.

Branched groups of this type generally contain not more than one chain branch. Preferred branched radicals $R^1$ are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexyloxy, 1-methylhexyloxy and 1-methylheptyloxy.

If $R^1$ represents an alkyl radical in which two or more $CH_2$ groups have been replaced by —O— and/or —CO—O—, this may be straight-chain or branched. It is preferably branched and has 3 to 12 C atoms. Accordingly, it denotes, in particular, biscarboxymethyl, 2,2-biscarboxyethyl, 3,3-biscarboxypropyl, 4,4-biscarboxybutyl, 5,5-biscarboxypentyl, 6,6-biscarboxyhexyl, 7,7-biscarboxyheptyl, 8,8-biscarboxyoctyl, 9,9-biscarboxynonyl, 10,10-biscarboxydecyl, bis(methoxycarbonyl)methyl, 2,2-bis(methoxycarbonyl)ethyl, 3,3-bis(methoxycarbonyl)propyl, 4,4-bis(methoxycarbonyl)butyl, 5,5-bis(methoxycarbonyl)pentyl, 6,6-bis(methoxycarbonyl)hexyl, 7,7-bis(methoxycarbonyl)heptyl, 8,8-bis(methoxycarbonyl)octyl, bis(ethoxycarbonyl)methyl, 2,2-bis(ethoxycarbonyl)ethyl, 3,3-bis(ethoxycarbonyl)propyl, 4,4-bis(ethoxycarbonyl)butyl or 5,5-bis(ethoxycarbonyl)pentyl.

The compounds of the formula I are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants which are known per se, but are not mentioned here in greater detail.

The invention also relates to electro-optical displays (in particular STN or MLC displays having two plane-parallel outer plates, which, together with a frame, form a cell, integrated non-linear elements for switching individual pixels on the outer plates, and a nematic liquid-crystal mixture of positive dielectric anisotropy and high specific resistance which is located in the cell) which contain media of this type, and to the use of these media for electro-optical purposes.

The liquid-crystal mixtures according to the invention enable a significant widening of the available parameter latitude.

The achievable combinations of clearing point, viscosity at low temperature, thermal and UV stability and dielectric anisotropy are far superior to previous materials from the prior art.

The liquid-crystal mixtures according to the invention, while retaining the nematic phase down to −20° C. and preferably down to −30° C., particularly preferably down to −40° C., enable clearing points above 70° C., preferably above 75° C., particularly preferably above 80° C., simultaneously dielectric anisotropy values Δε of ≧4, preferably ≧4.5, and a high value for the specific resistance to be achieved, enabling excellent STN and MLC displays to be obtained. In particular, the mixtures are characterised by low operating voltages. The TN thresholds are generally ≦2.2 V, preferably ≦2.0 V, particularly preferably ≦1.8 V.

It goes without saying that, through a suitable choice of the components of the mixtures according to the invention, it is also possible for higher clearing points (for example above 110° C.) to be achieved at higher threshold voltages or lower clearing points to be achieved at lower threshold voltages with retention of the other advantageous properties. At viscosities correspondingly increased only slightly, it is likewise possible to obtain mixtures having greater Δε and thus low thresholds. The MLC displays according to the invention preferably operate at the first Gooch and Tarry transmission minimum [C. H. Gooch and H. A. Tarry, Electron. Lett. 10, 2-4, 1974; C. H. Gooch and H. A. Tarry, Appl. Phys., Vol. 8, 1575-1584, 1975], where, besides particularly favourable electro-optical properties, such as, for example, high steepness of the characteristic line and low angle dependence of the contrast (German Patent 30 22 818), a lower dielectric anisotropy is sufficient at the same threshold voltage as in an analogous display at the second minimum. This enables significantly higher specific resistance values to be achieved using the mixtures according to the invention at the first minimum than in the case of mixtures comprising cyano compounds. Through a suitable choice of the individual components and their proportions by weight, the person skilled in the art is able to set the birefringence necessary for a pre-specified layer thickness of the MLC display using simple routine methods.

The flow viscosity $v_{20}$ at 20° C. is preferably <60 mm$^2$·s$^{-1}$, particularly preferably <50 mm$^2$·s$^{-1}$. The rotational viscosity $\gamma_1$ at 20° C. of the mixtures according to the invention is preferably ≦100 mPa·s, particularly preferably ≦80 mPa·s, very particularly preferably ≦60 mPa·s. The nematic phase range is preferably at least 90°, in particular at least 100°. This range preferably extends at least from −20° to +70°. The value for the optical anisotropy Δn is preferably ≧0.08, in particular ≧0.1, very particularly preferably ≧0.12, at 20° C. [589 nm].

A short response time is desired in liquid-crystal displays. This applies in particular to displays which are capable of video reproduction. For displays of this type, response times (sum: $t_{on}+t_{off}$) of at most 25 ms are required. The upper limit of the response time is determined by the image refresh frequency.

Measurements of the voltage holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formula I exhibit a significantly smaller decrease in the HR with increasing temperature than analogous mixtures comprising cyanophenylcyclohexanes of the formula

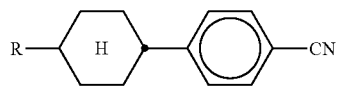

or esters of the formula

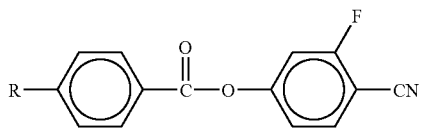

instead of the compounds of the formula I.

The UV stability of the mixtures according to the invention is also considerably better, i.e. they exhibit a significantly smaller decrease in the HR on exposure to UV.

The mixtures according to the invention preferably comprise little (≦10% by weight) or no nitriles. The values for the holding ratio of the mixtures according to the invention are preferably >98%, in particular >99% at 20° C.

Particularly preferred compounds of the formula I are compounds of the formulae I-1 to I-48

I-1

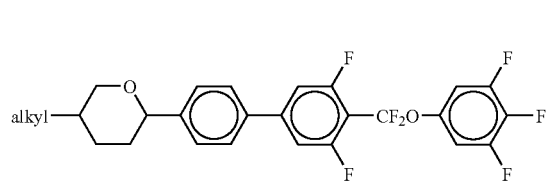

I-2

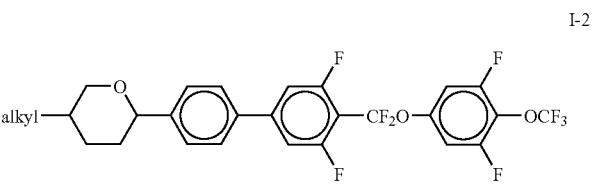

I-3

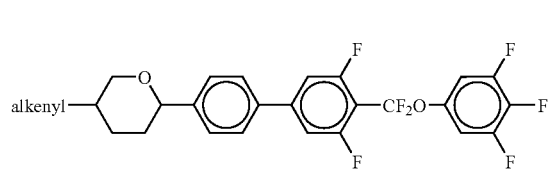

I-4

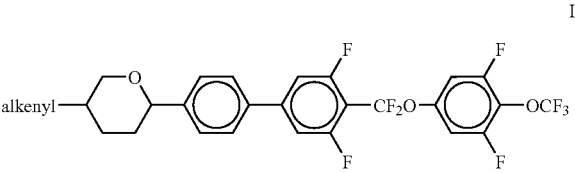

I-5

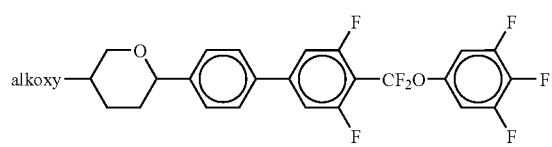

I-6

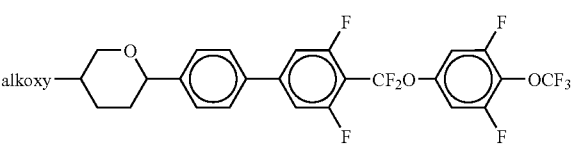

I-7

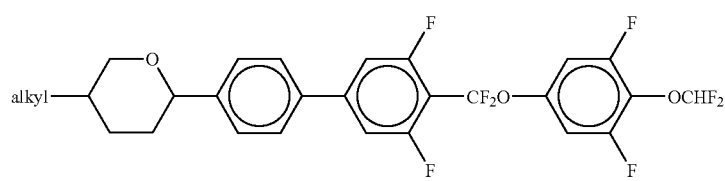

I-8

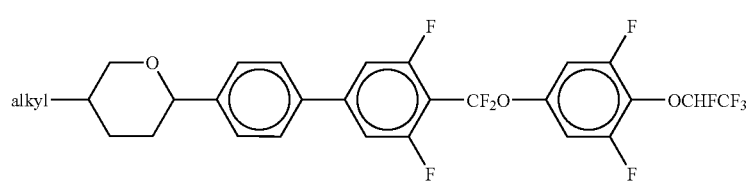

-continued
I-9
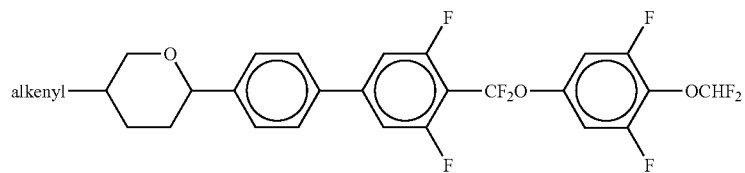
I-10
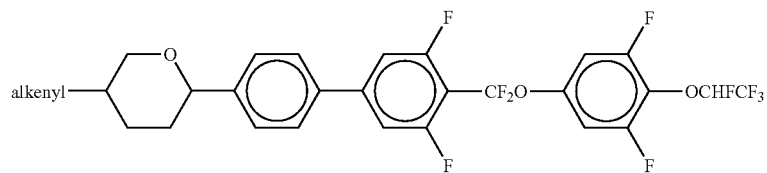
I-11
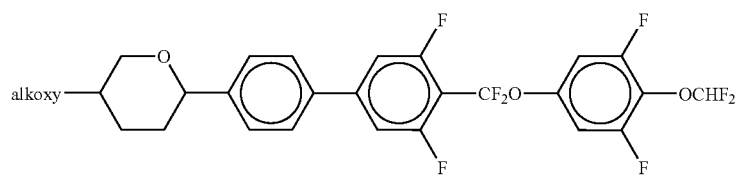
I-12
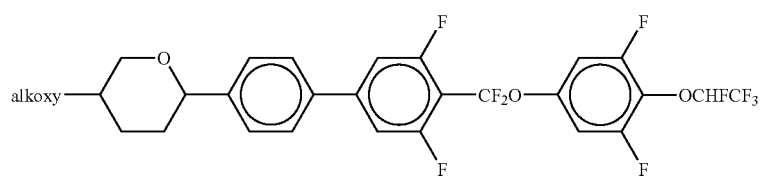
I-13
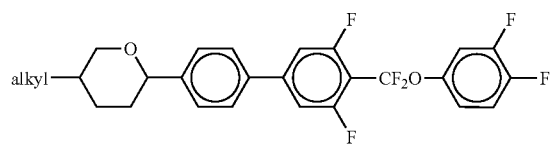
I-14
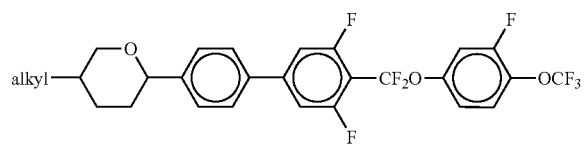
I-15
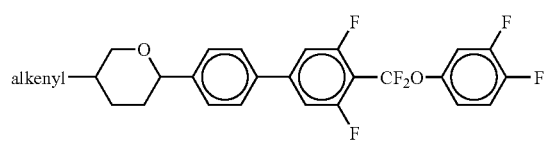
I-16
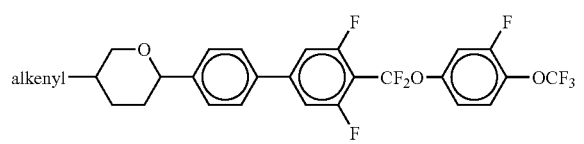
I-17
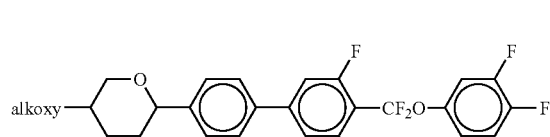
I-18
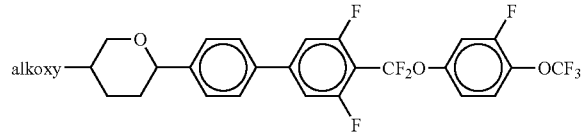
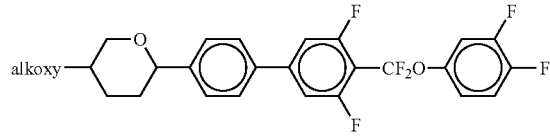
I-19
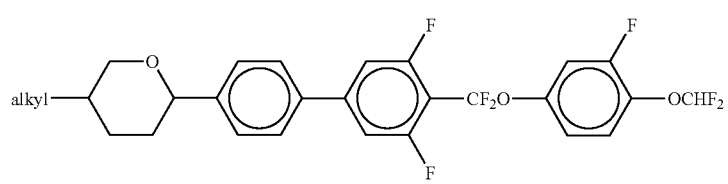
I-20

-continued
I-21
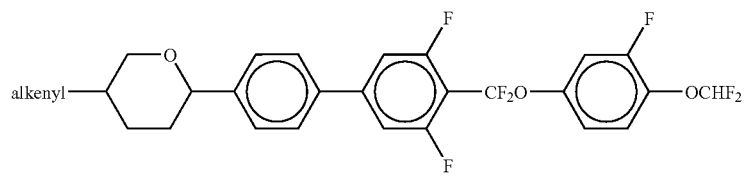
I-22
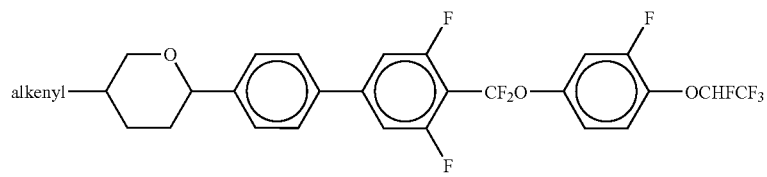
I-23
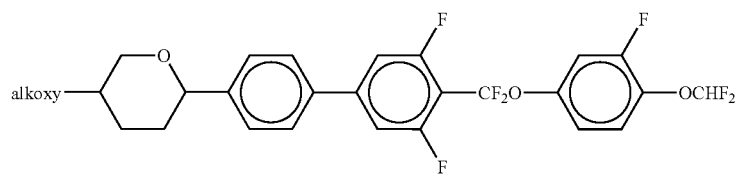
I-24
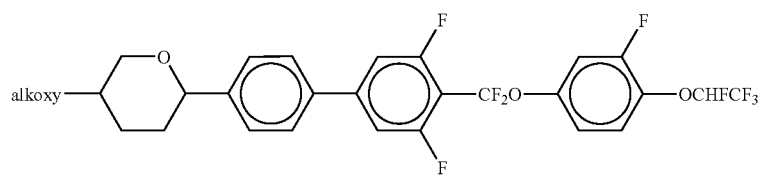
I-25
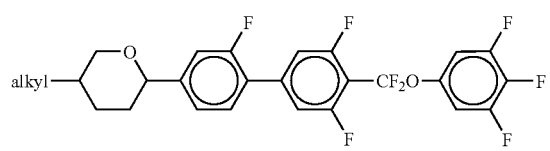
I-26
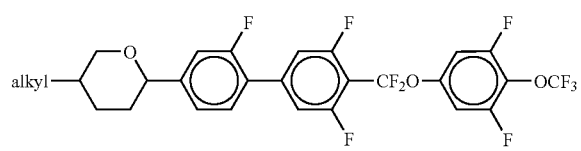
I-27
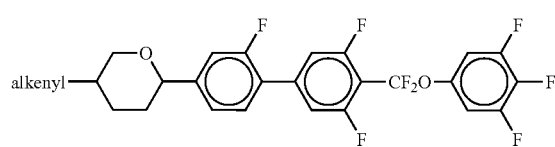
I-28
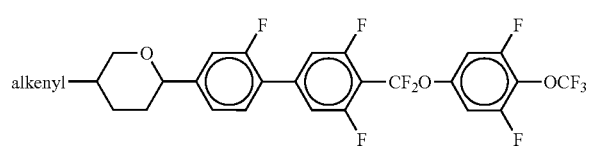
I-29
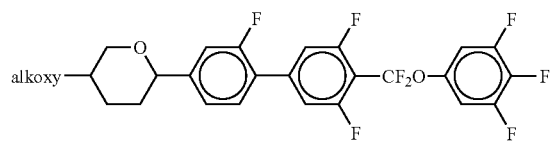
I-30
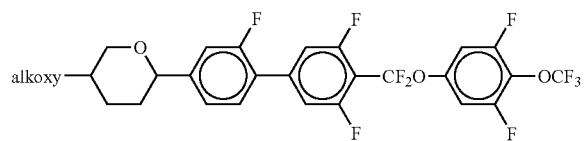
I-31
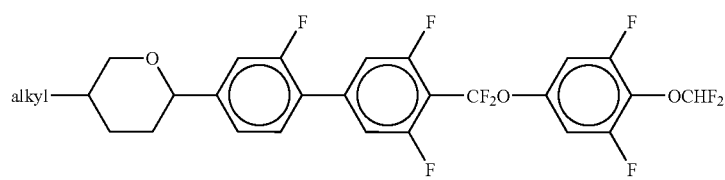
I-32
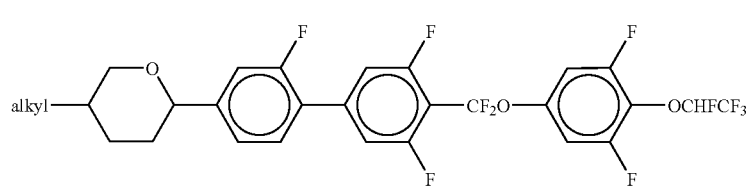

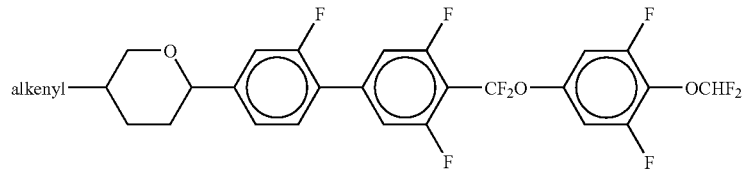
I-33
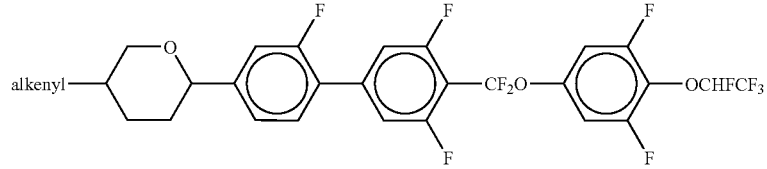
I-34
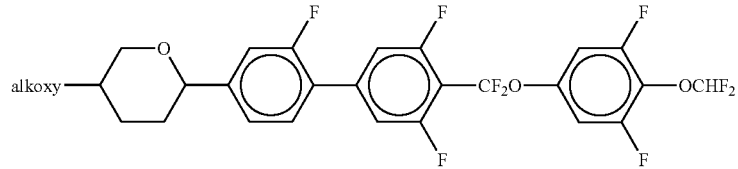
I-35
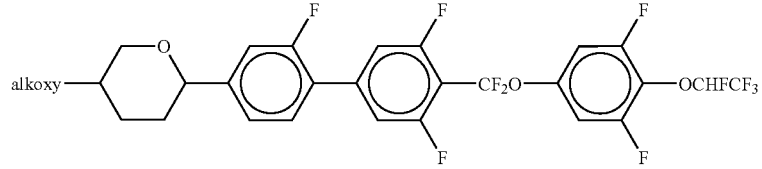
I-36
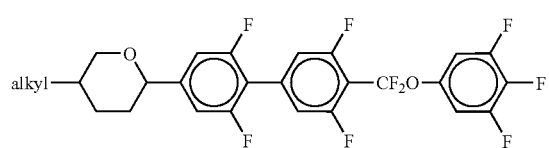
I-37
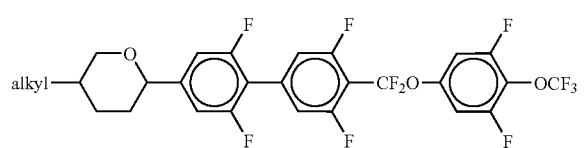
I-38
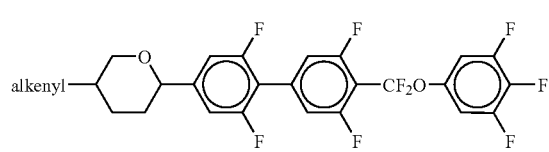
I-39
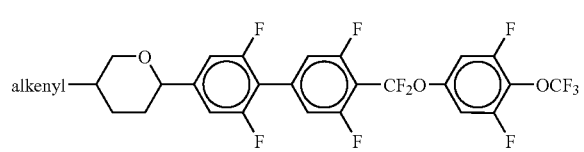
I-40
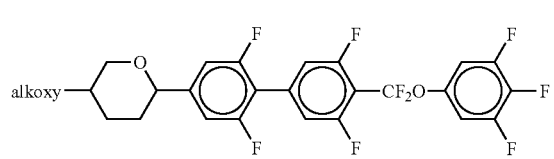
I-41
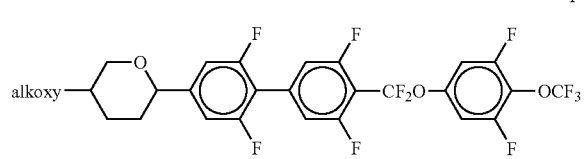
I-42
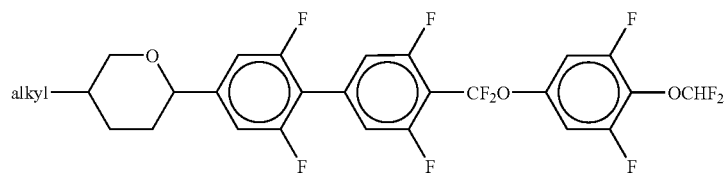
I-43
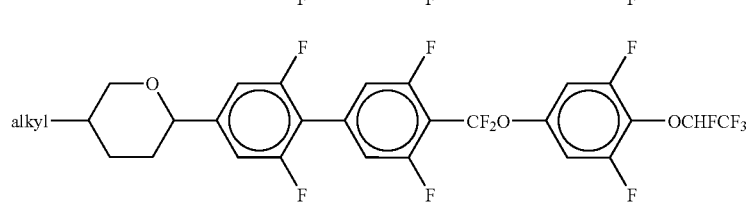
I-44

-continued

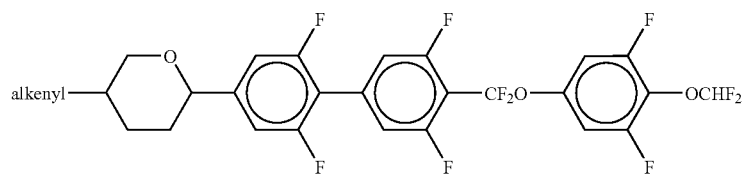
I-45

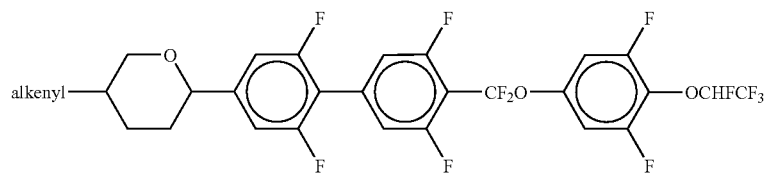
I-46

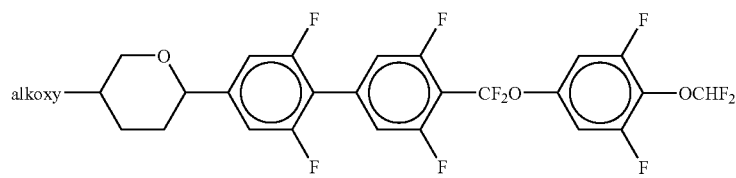
I-47

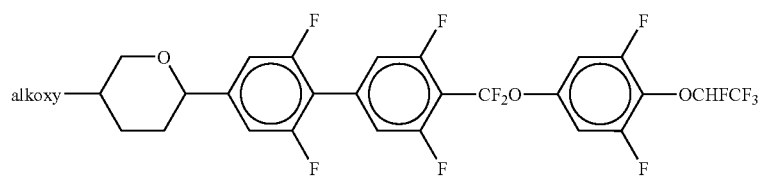
I-48 in which
alkyl is a straight-chain alkyl radical having 1-7 C atoms,
alkoxy is a straight-chain alkoxy radical having 1-7 C atoms,
alkenyl is a straight-chain alkenyl radical having 2-7 C atoms.

Of these preferred compounds, particular preference is given to those of the formulae I-1, I-2 and in particular those of the formula I-1.

Preferred embodiments are indicated below:

The medium comprises one, two or more compounds of the formulae I-1 to I-24; preferably one or two compounds;

The medium preferably comprises one or two compounds of the formula

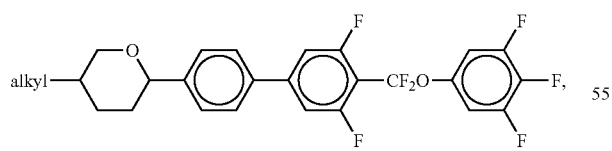

where alkyl is a straight-chain alkyl radical having 1-6 C atoms, preferably ethyl or propyl, furthermore pentyl.

The proportion of the compounds of the formula I in the mixture is preferably 3-40% by weight, in particular 3-30% by weight, very particularly preferably 3-20% by weight.

The medium preferably comprises one or more bicyclic compounds of the formula K

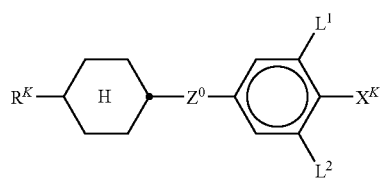
K in which $R^K$, $X^K$ have the meanings indicated for $R^1$ and $X^1$, and $Z^0$ denotes a single bond, —COO—, —OOC—, —$C_2F_4$—, —CF=CF—, —$C_2H_4$—, —$(CH_2)_4$—, —$OCH_2$— or —$CH_2$—. $L^1$ and $L^2$ each, independently of one another, denote H or F. $R^K$ is preferably straight-chain alkyl. $X^K$ preferably denotes F or Cl, preferably Cl.

The proportion of compounds of the formula K in the mixture is 5-40%, preferably 5-30%, in particular 5-20%.

Particularly preferred bicyclic compounds are the compounds of the formulae K-1 to K-18

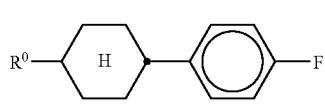
K-1

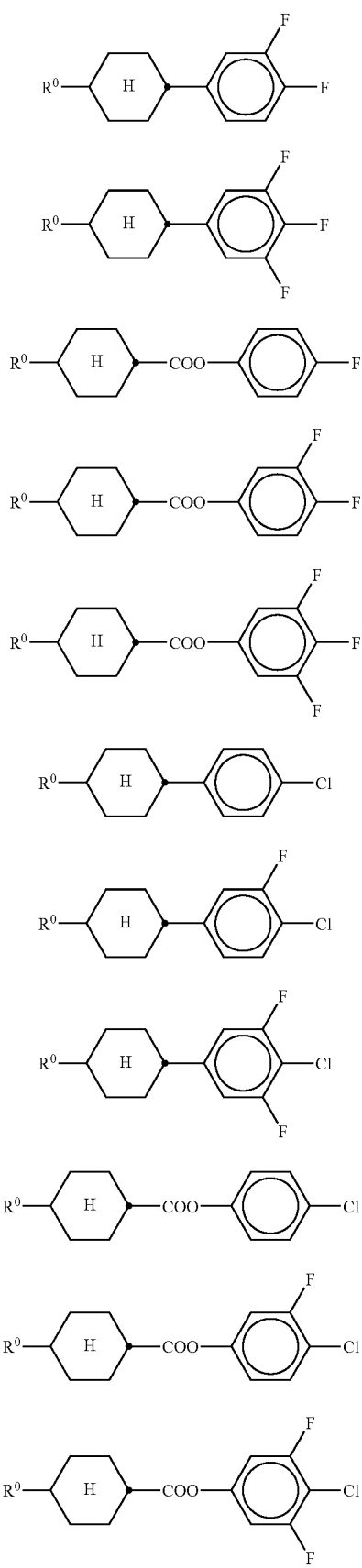
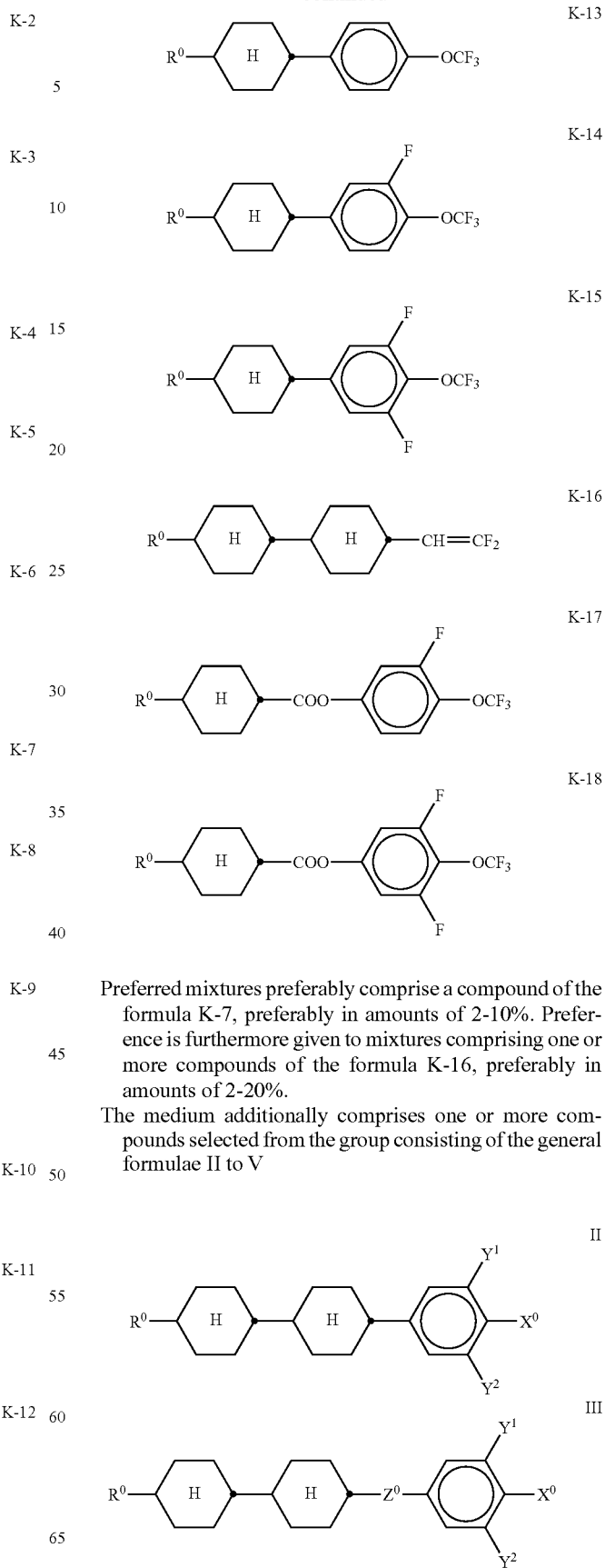
Preferred mixtures preferably comprise a compound of the formula K-7, preferably in amounts of 2-10%. Preference is furthermore given to mixtures comprising one or more compounds of the formula K-16, preferably in amounts of 2-20%.
The medium additionally comprises one or more compounds selected from the group consisting of the general formulae II to V -continued

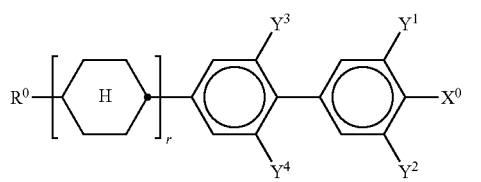
IV

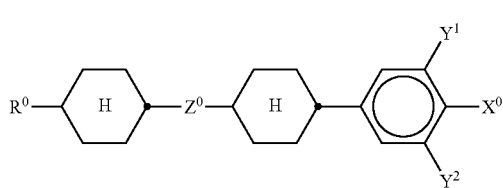
V in which the individual radicals have the following meanings:
$R^0$ denotes n-alkyl, alkylalkoxy, alkoxy, fluoroalkyl, alkenyloxy or alkenyl, each having up to 9 C atoms,
$X^0$ denotes F, Cl, halogenated alkyl, halogenated alkenyl, halogenated alkylalkoxy, halogenated alkenyloxy or halogenated alkoxy having up to 6 C atoms,
$Z^0$ denotes —$C_2F_4$—, —CF=CF—, —$C_2H_4$—, —$(CH_2)_4$—, —$OCH_2$—, —$CH_2O$—,
$Y^1$ to $Y^4$ each, independently of one another, denote H or F,
r denotes 0 or 1.

The compound of the formula II is preferably selected from the group of the compounds of the formulae IIa to IIe

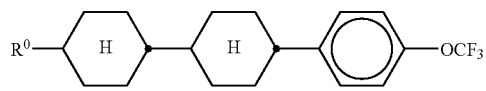
IIa

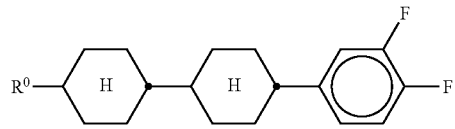
IIb

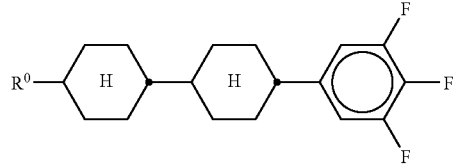
IIc

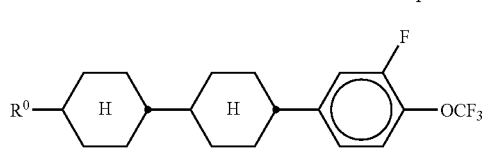
IId

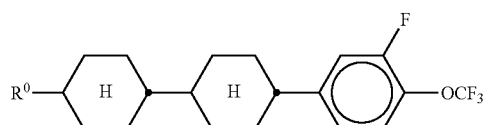
IIe in which $R^0$ has the meanings indicated above.

Preferred mixtures comprise one or more compounds of the formulae IIa, IIb and/or IIc, preferably in amounts of 3-40%, very particularly preferably 5-30%.

The compound of the formula III is preferably selected from the group of the compounds of the formulae IIIa to IIIk

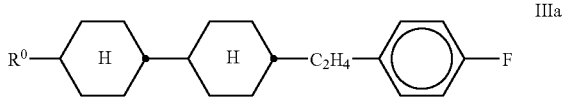
IIIa

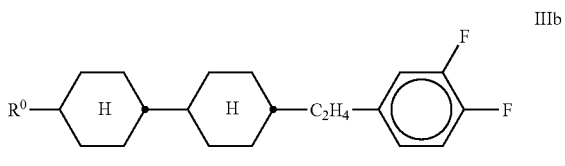
IIIb

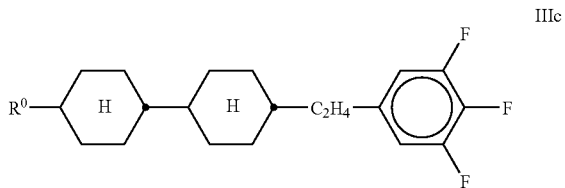
IIIc

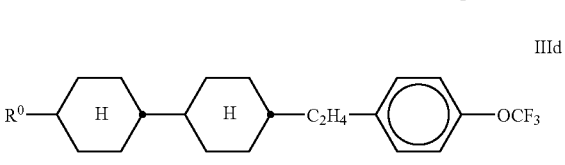
IIId

IIIe

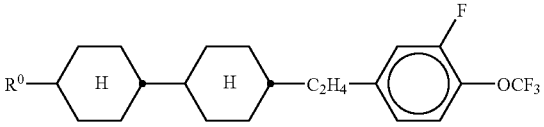
IIIf

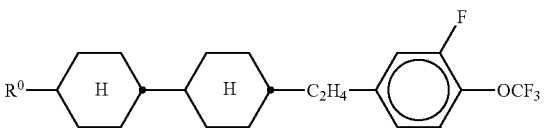
IIIg

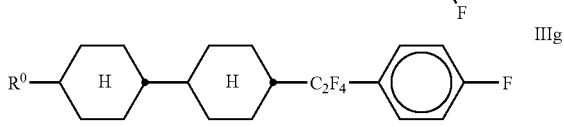
IIIh

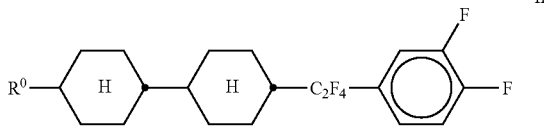
IIIi

IIIj

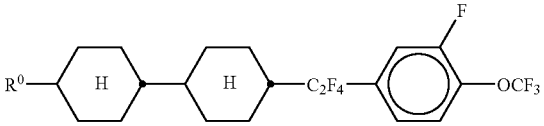

-continued

IIIk
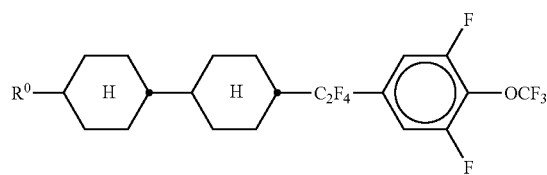

in which a $R^0$ has the meanings indicated above.

Preferred mixtures comprise one or more compounds of the formula IIIb, preferably in amounts of 3-30%, in particular 5-20%.

The compound of the formula IV is preferably selected from the group of the compounds of the formulae IVa to IVi IVa
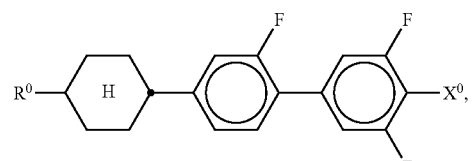

IVb
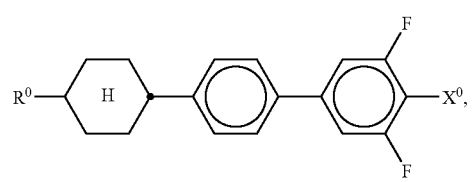

IVc
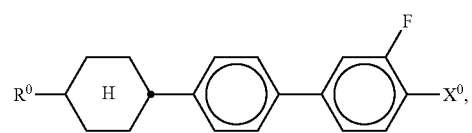

IVd
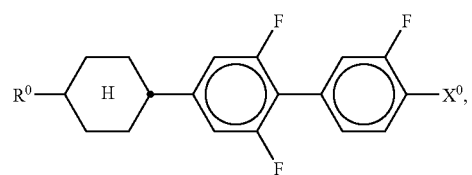

IVe
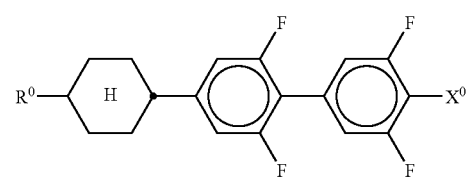

IVf
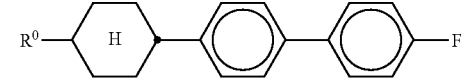

IVg
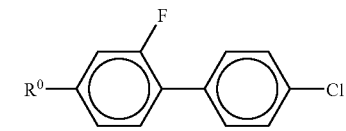

-continued

IVh
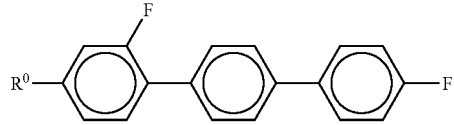

IVi
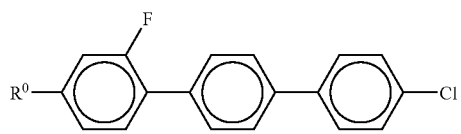

in which $R^0$ has the meanings indicated above.

Preferred mixtures comprise one or more compounds of the formula IVa, IVb, IVc, IVf or IVg, preferably in amounts of 5-40%, in particular 5-30%. In the compounds of the formula IV, $X^0$ preferably denotes F, $OCF_3$ or $OCH=CF_2$.

The compound of the formula V is preferably selected from the group of the compounds of the formulae Va and Vb Va
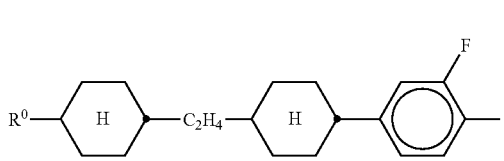

Vb
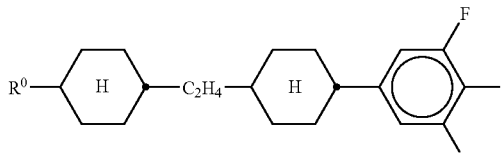

in which $R^0$ has the meanings indicated above.

The medium additionally comprises one or more compounds selected from the group consisting of the general formulae VI to X VI
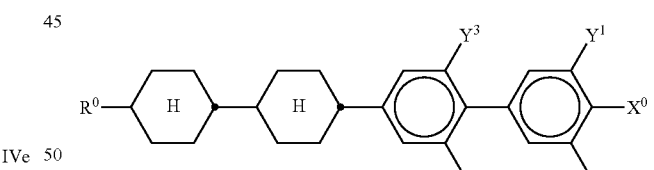

VII

VIII
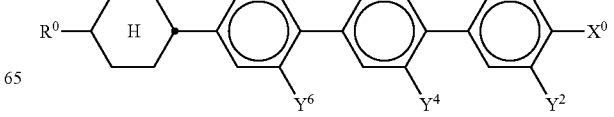

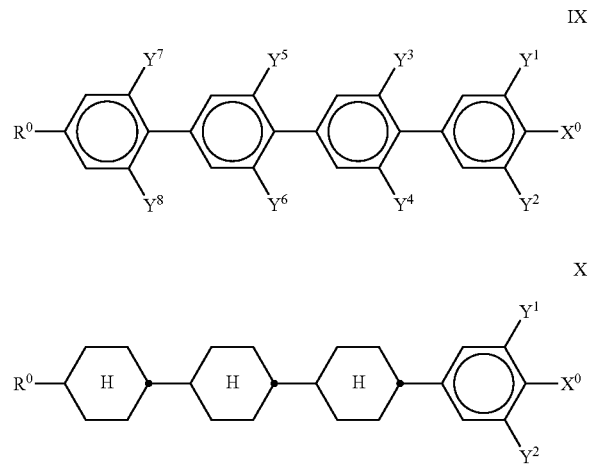

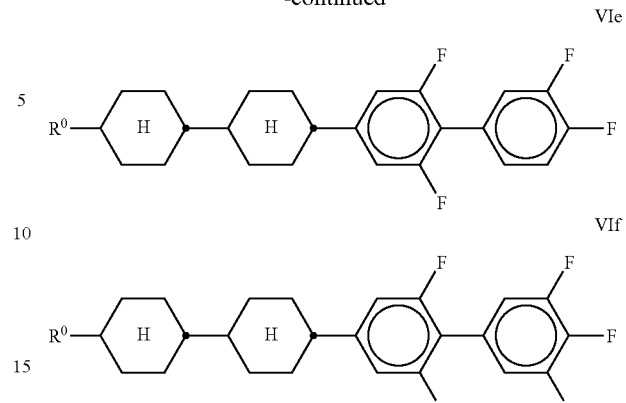

in which R⁰ denotes n-alkyl, alkylalkoxy, alkoxy, alkenyloxy, fluoroalkyl or alkenyl, each having up to 9 C atoms, X⁰ denotes F, Cl, halogenated alkyl, halogenated alkenyl, halogenated alkenyloxy or halogenated alkoxy having up to 6 C atoms, and $Y^{1-8}$ each, independently of one another, denote H or F. $X^0$ is preferably F, Cl, $CF_3$, $OCF_3$ or $OCHF_2$. $R^0$ preferably denotes alkyl, oxaalkyl, fluoroalkyl or alkenyl, each having up to 6 C atoms.

The compound of the formula VI is preferably selected from the group of the compounds of the formulae VIa to VIf in which $R^0$ denotes n-alkyl, alkylalkoxy, alkoxy, alkenyloxy, fluoroalkyl or alkenyl, each having up to 9 C atoms. $R^0$ in the compounds of the formulae VIa to VIf preferably denotes straight-chain alkyl, preferably having 1-6 C atoms, in particular ethyl, propyl or pentyl.

The compound of the formula VII is preferably selected from the group of the compounds of the formulae VIIa to VIIg

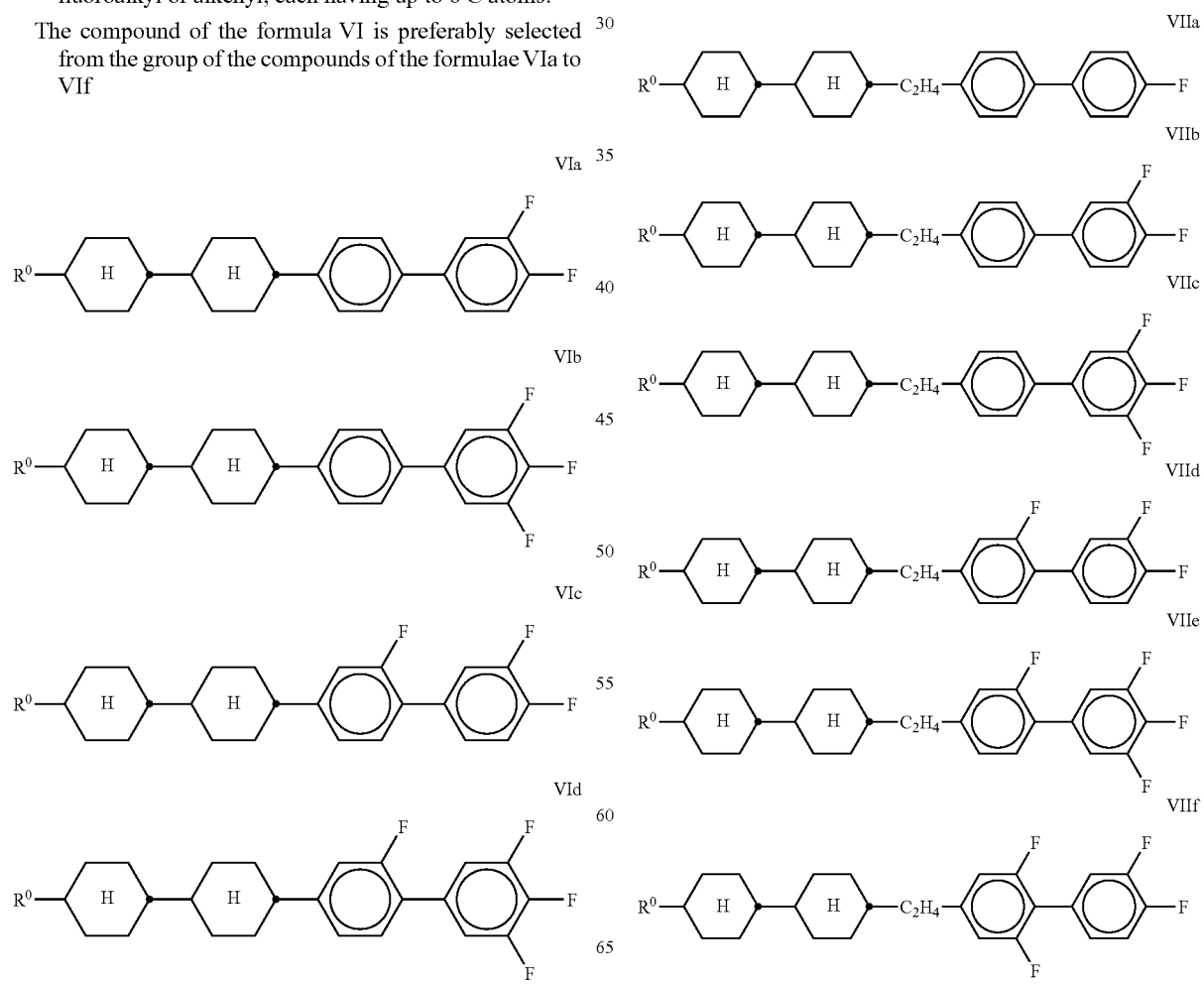

VIIg
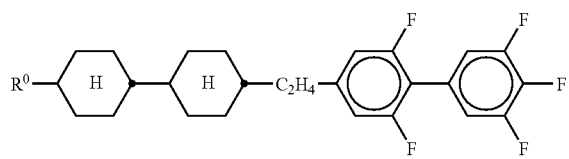

in which R⁰ denotes n-alkyl, alkylalkoxy, alkoxy, alkenyloxy, fluoroalkyl or alkenyl, each having up to 9 C atoms. R⁰ in the compounds of the formulae VIIa to VIIf preferably denotes straight-chain alkyl, preferably having 1-6 C atoms, in particular ethyl, propyl and pentyl.

The compound of the formula VIII is preferably selected from the group of the compounds of the formulae VIIIa to VIIIr VIIIa
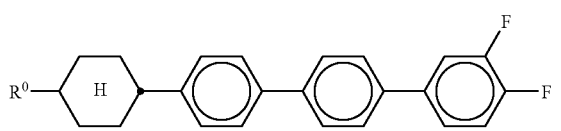

VIIIb
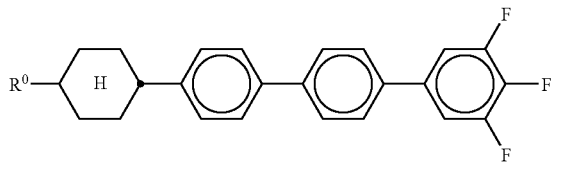

VIIIc
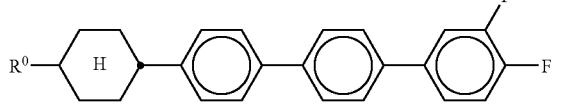

VIIId
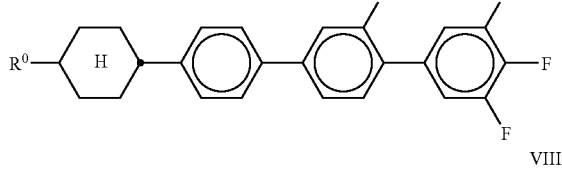

VIIIe
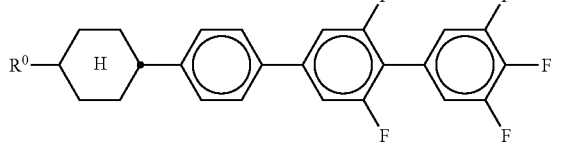

VIIIf
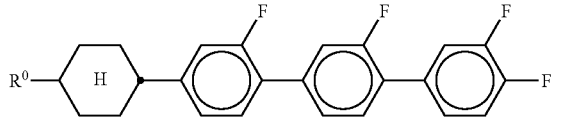

VIIIg
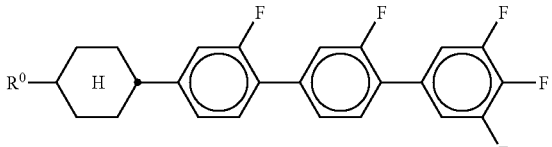

VIIIh
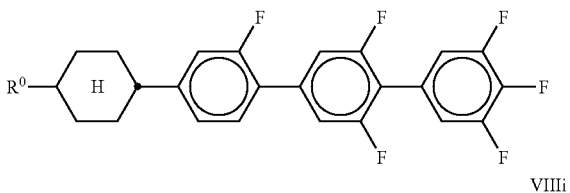

VIIIi
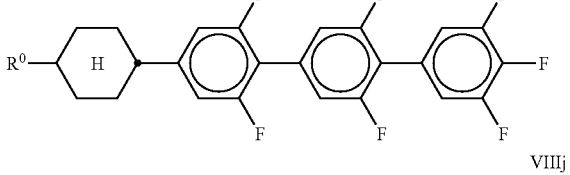

VIIIj
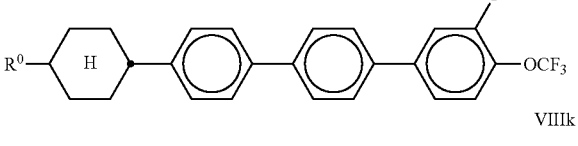

VIIIk
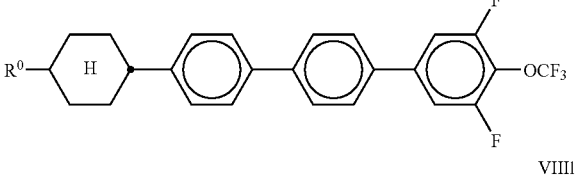

VIIIl
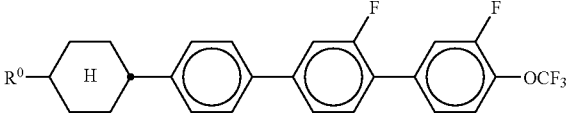

VIIIm
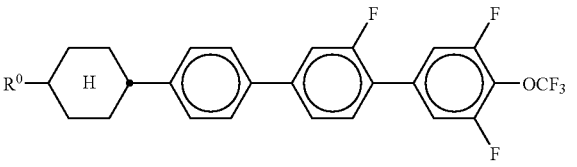

VIIIn
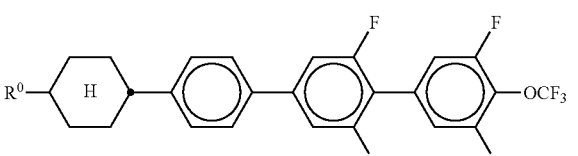

VIIIo
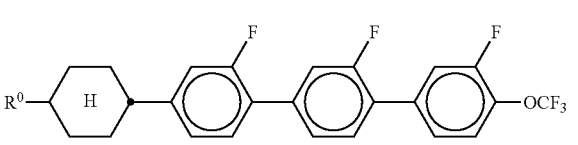

VIIIp
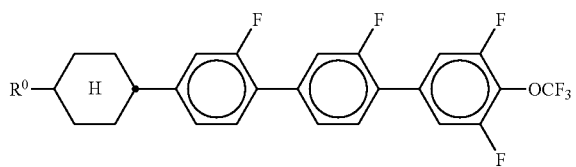

VIIIq
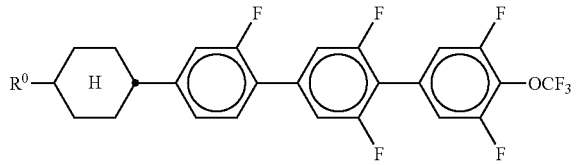

VIIIr
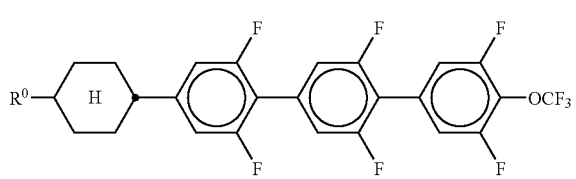

in which R⁰ denotes n-alkyl, alkylalkoxy, alkoxy, alkenyloxy, fluoroalkyl or alkenyl, each having up to 9 C atoms. R⁰ in the compounds of the formulae VIIIa to VIIIr preferably denotes straight-chain alkyl, preferably having 1-6 C atoms, in particular ethyl, propyl and pentyl.

The compound of the formula IX is preferably selected from the group of the compounds of the formulae IXa to IXl IXa
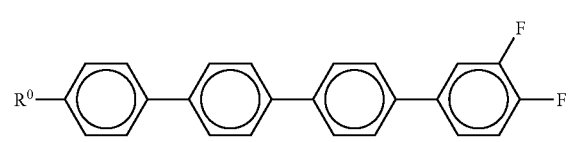

IXb
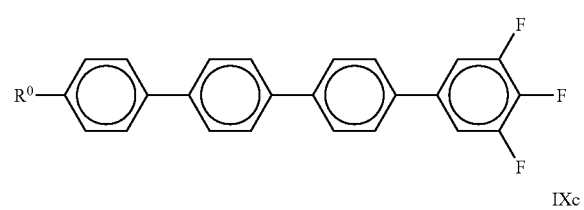

IXc
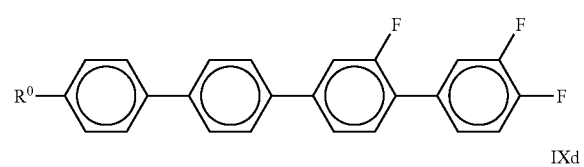

IXd
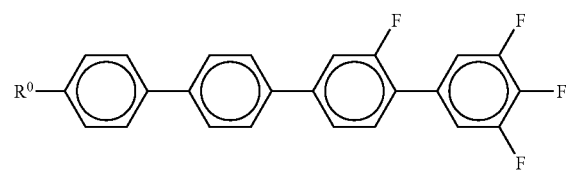

IXe
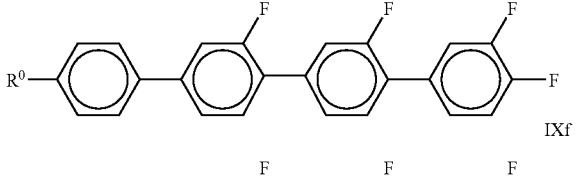

IXf
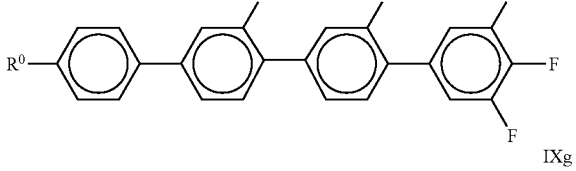

IXg
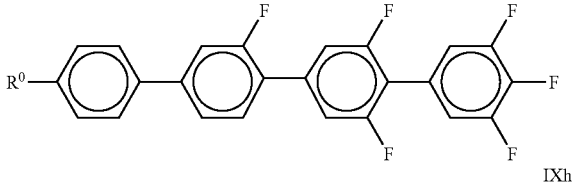

IXh
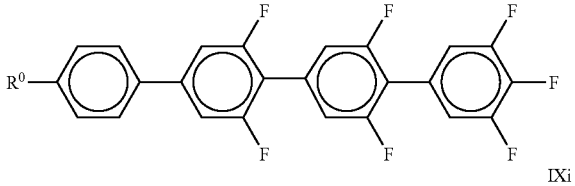

IXi
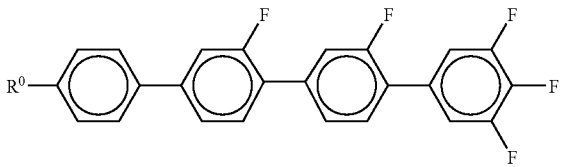

IXj

IXk

IXl in which R⁰ denotes n-alkyl, alkylalkoxy, alkoxy, alkenyloxy, fluoroalkyl or alkenyl, each having up to 9 C atoms. R⁰ in the compounds of the formulae IXa to IXl preferably denotes straight-chain alkyl, preferably having 1-6 C atoms, in particular ethyl, propyl and pentyl.

The compound of the formula X is preferably selected from the group of the compounds of the formulae Xa to Xf

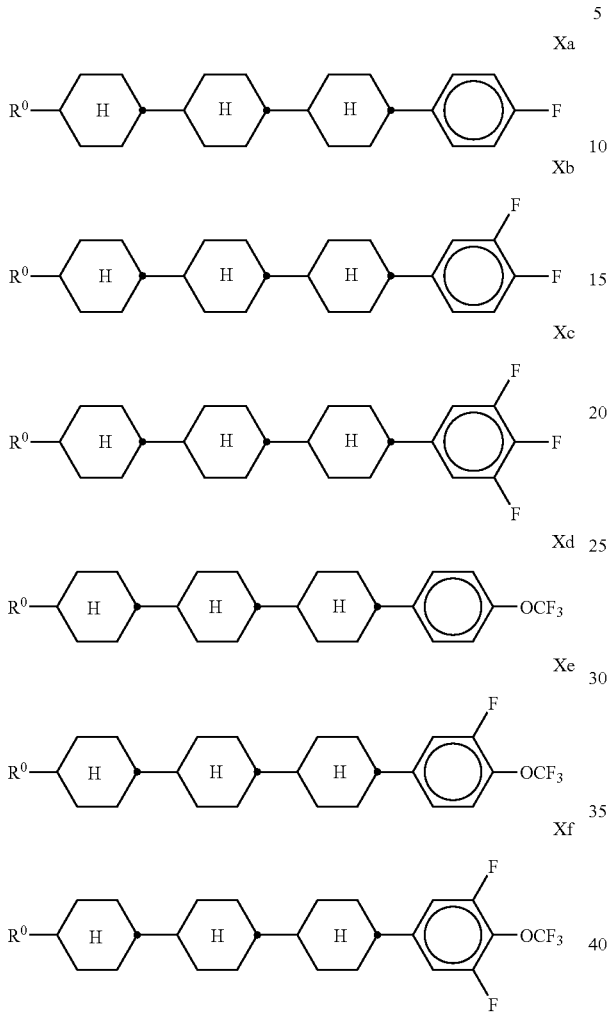

in which $R^0$ denotes n-alkyl, alkylalkoxy, alkoxy, alkenyloxy, fluoroalkyl or alkenyl, each having up to 9 C atoms. $R^0$ in the compounds of the formulae Xa to Xf preferably denotes straight-chain alkyl, preferably having 1-6 C atoms, in particular ethyl, propyl and pentyl.

Particularly preferred mixtures comprise one or more compounds of the formulae VI, VIII and/or IX in which $X^0$ preferably denotes F or $OCF_3$. $Y^1$ and $Y^2$ preferably both denote F.

The medium additionally comprises one or more compounds of the formulae E-a to E-d

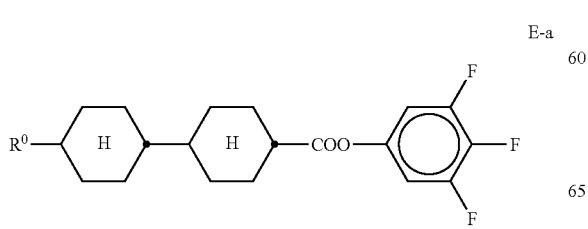

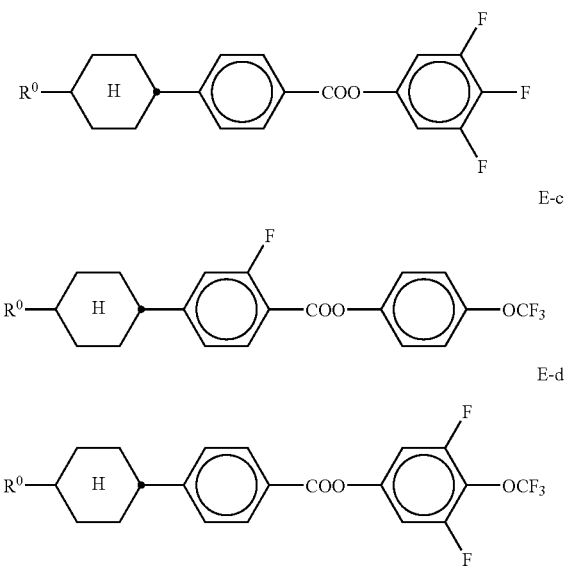

in which $R^0$ denotes n-alkyl, alkylalkoxy, alkoxy, alkenyloxy, fluoroalkyl or alkenyl, each having up to 9 C atoms.

$R^0$ in the compounds of the formulae E-a to E-d preferably denotes straight-chain alkyl, preferably having 1-6 C atoms, in particular ethyl, propyl and pentyl.

The proportion of the compounds of the formulae E-a to E-d is preferably 10-30% by weight, in particular 15-25% by weight;

The proportion of compounds of the formulae I to V together in the mixture as a whole is at least 10-50% by weight;

The proportion of compounds of the formulae II to V in the mixture as a whole is 5 to 50% by weight;

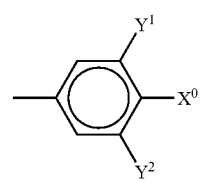

is preferably

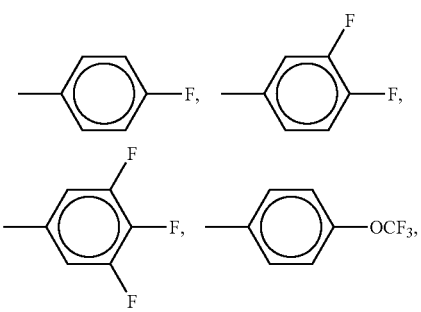

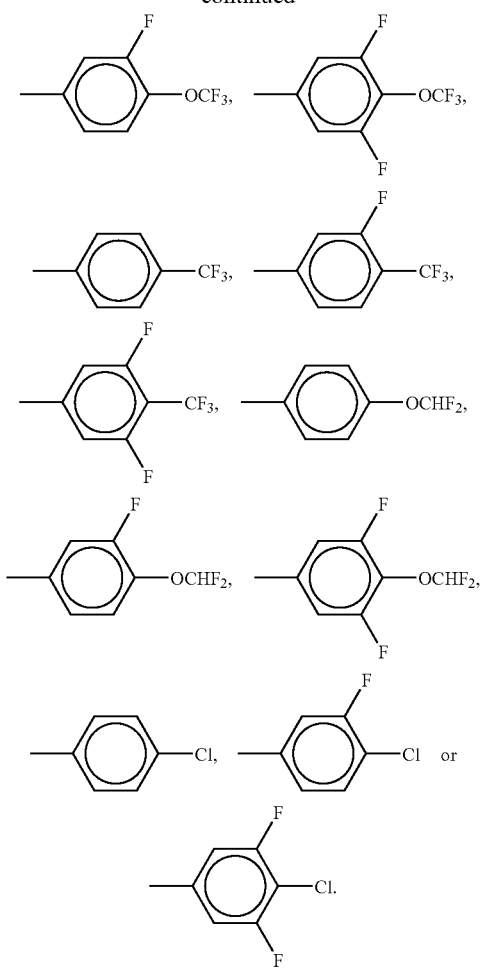
The medium comprises compounds of the formulae II, III, IV and/or V;
$R^0$ in the compounds II to XXVI is preferably straight-chain alkyl or alkenyl having 1 or 2 to 7 C atoms respectively;
The medium comprises further compounds, preferably selected from the following group consisting of the general formulae XI to XXVI
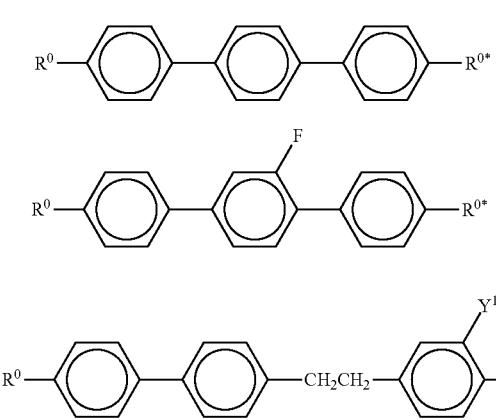
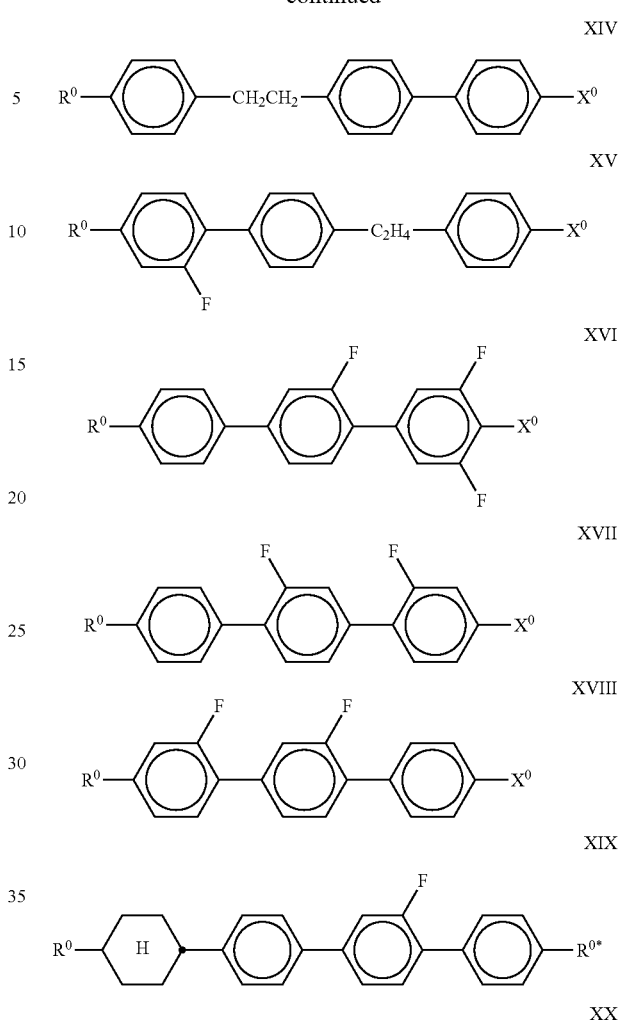

XXV

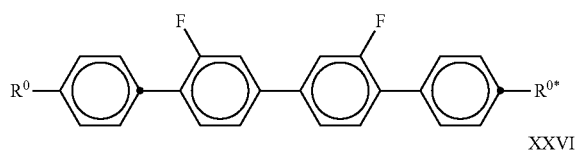

XXVI

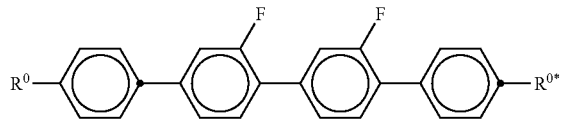

in which R⁰ and X⁰ have the meanings indicated above. Y¹ denotes H or F. X⁰ in the compounds of the formulae XIII to XVIII preferably denotes F, Cl or OCH=CF₂. R⁰* denotes alkyl or alkenyl. R⁰ preferably denotes alkyl, alkenyl or alkoxy.

Preferred compounds of the formula XII are mentioned below:

XIIa

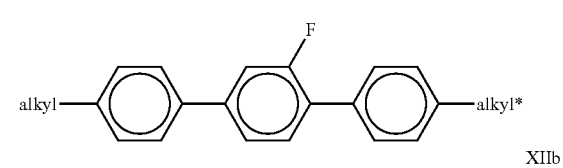

XIIb

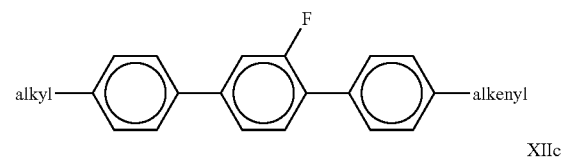

XIIc

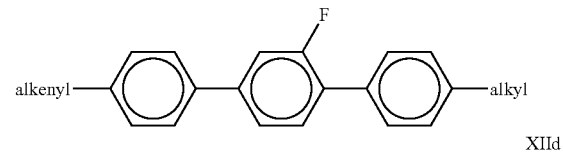

XIId

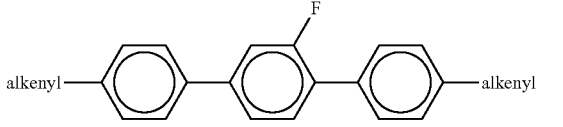

in particular

XIIa-1

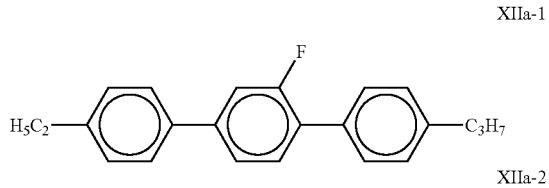

XIIa-2

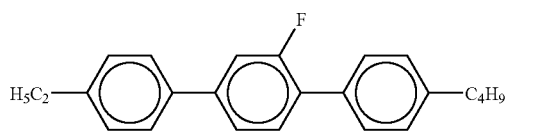

XIIa-3

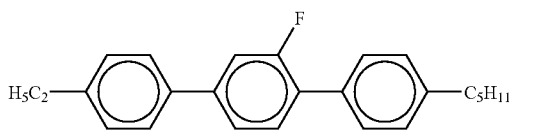

XIIb-1

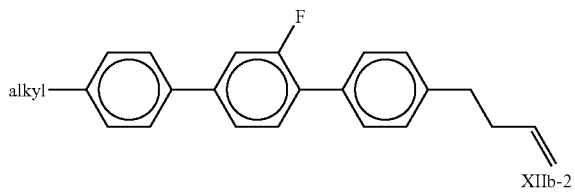

XIIb-2

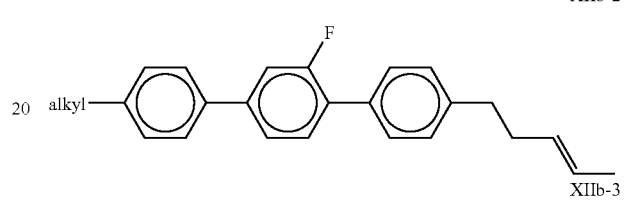

XIIb-3

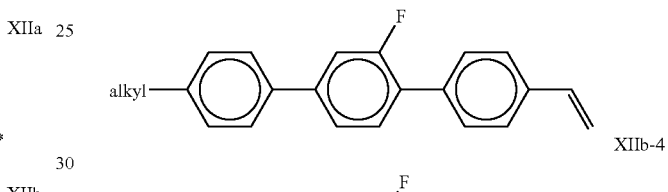

XIIb-4

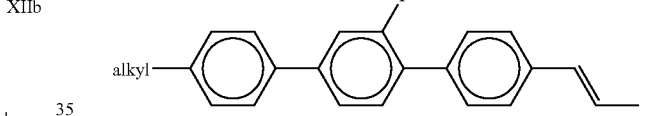

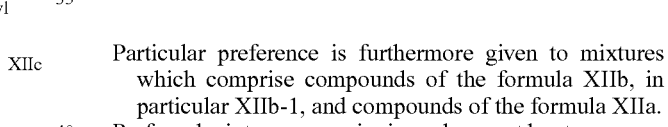

Particular preference is furthermore given to mixtures which comprise compounds of the formula XIIb, in particular XIIb-1, and compounds of the formula XIIa.

Preferred mixtures comprise in each case at least one compound of the formula XIIa and at least one compound of the formula XIIb, preferably in total amounts of 5-30%, in particular 10-25%. Alkyl and alkyl* each, independently of one another, denote a straight-chain alkyl radical having 1-7 C atoms, and alkenyl denotes a straight-chain alkenyl radical having 2-7 C atoms.

The medium comprises compounds of the formulae XIIa-1, XIIa-2 and XIIa-3.

The medium comprises at least one compound of the formula XIIb-1, preferably in which alkyl denotes C₂H₅.

The medium additionally comprises one, two, three or more, preferably two or three, compounds of the formulae

O1

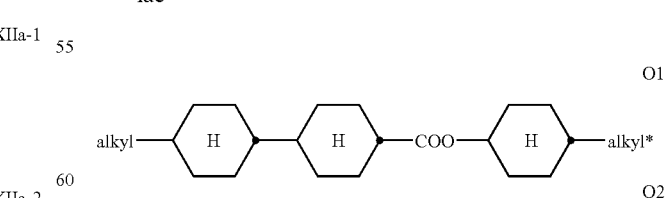

O2

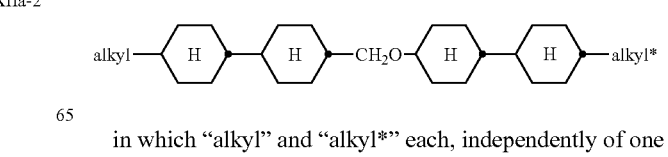

in which "alkyl" and "alkyl*" each, independently of one another, denote a straight-chain alkyl radical having 1-7

C atoms. The proportion of the compounds of the formulae O1 and/or O2 in the mixtures according to the invention is preferably 5-10% by weight.

The medium preferably comprises 5-35% by weight, in particular 5-20% by weight, of the compound of the formula IVa.

The medium preferably comprises one, two or three compounds of the formula IVa in which $X^0$ denotes F or $OCF_3$.

The medium preferably comprises compounds of the formulae II to V in which $R^0$ denotes methyl.

The medium preferably comprises one, two or more, preferably one or two, dioxane compounds of the formulae D1 to D4

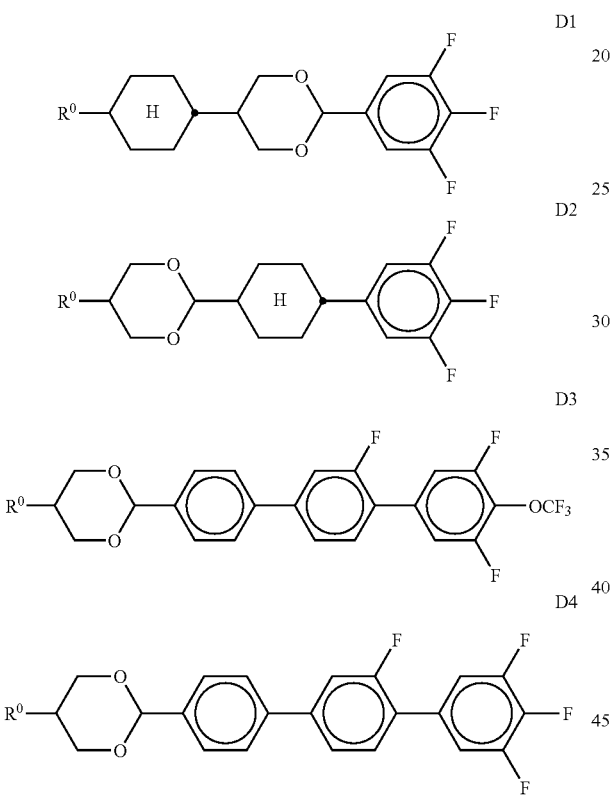

in which $R^0$ denotes n-alkyl, alkylalkoxy, alkoxy, alkenyloxy, fluoroalkyl or alkenyl, each having up to 9 C atoms.

The mixtures comprise 0.005-20% of compounds of the formulae D1, D2, D3 and/or D4.

The medium additionally comprises one, two or more bicyclic compounds of the formulae Z-1 to Z-10

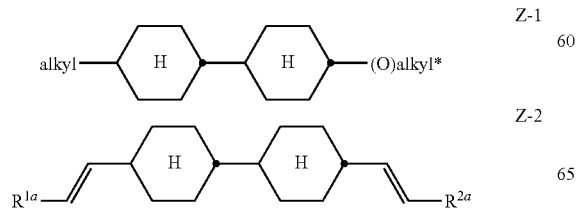

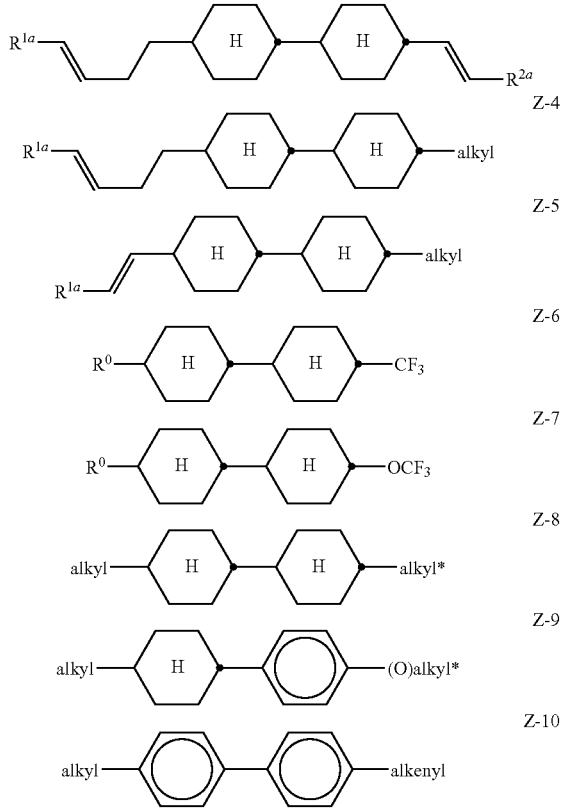

in which $R^{1a}$ and $R^{2a}$ each, independently of one another, denote H, $CH_3$, $C_2H_5$ or n-$C_3H_7$. $R^0$ denotes n-alkyl, alkylalkoxy, alkoxy, alkenyloxy, fluoroalkyl or alkenyl, each having up to 9 C atoms, alkyl and alkyl* each, independently of one another, denote a straight-chain alkyl radical having 1-7 C atoms, and alkenyl denotes a straight-chain alkenyl radical having 2-7 C atoms. Alkyl*, independently of one another, has the meaning of alkyl.

Particularly preferred compounds of the formula Z-5 are

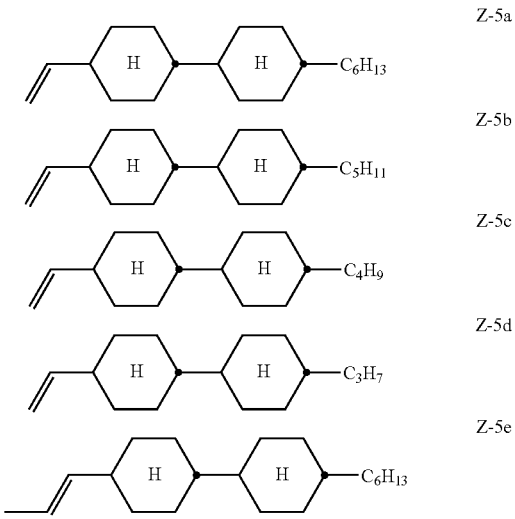

-continued

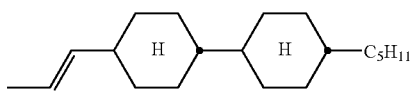
Z-5f

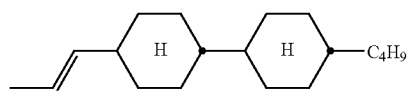
Z-5g

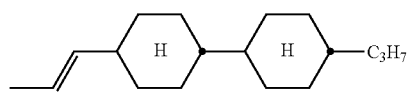
Z-5h

Very particularly preferred mixtures comprise 30-60% of one or more compounds from the group Z-5b, Z-5c, Z-5d, Z-5h.

A particularly preferred compound of the formula Z-10 is the compound of the formula Z-10a

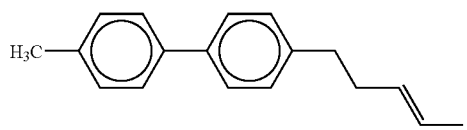
Z-10a

Of the said bicyclic compounds, particular preference is given to compounds Z-1, Z-2, Z-5, Z-6, Z-8, Z-9 and Z-10. The mixtures according to the invention preferably comprise 5-65%, in particular 10-60% and particularly preferably 30-60%, in particular 50%, of compounds of the formulae Z-1 to Z-10.

The medium additionally comprises one, two or more compounds containing fused rings, of the formulae AN1 to AN11

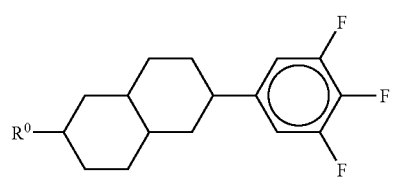
AN1

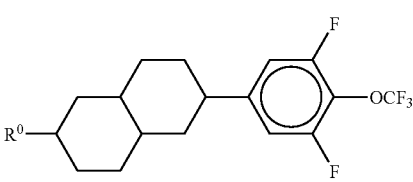
AN2

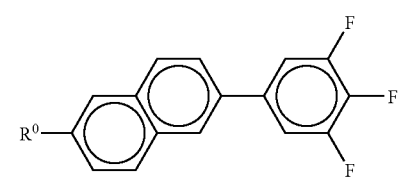
AN3

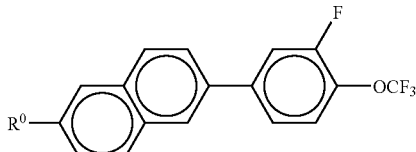
AN4

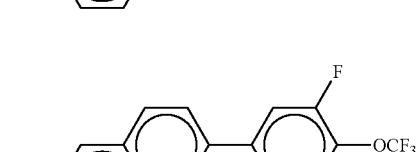
AN5

AN6

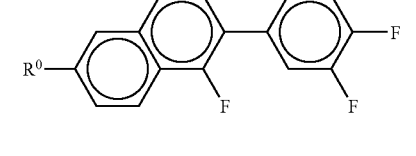
AN7

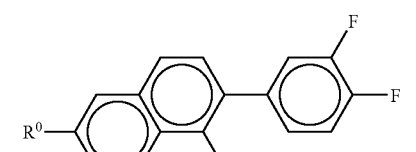
AN8

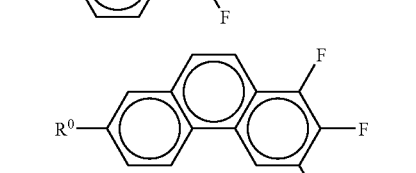
AN9

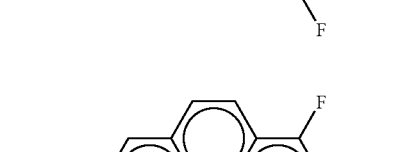
AN10

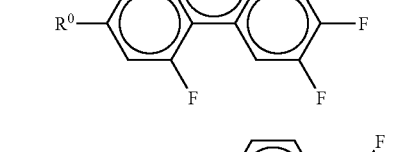
AN11 in which $R^0$ denotes n-alkyl, alkylalkoxy, alkoxy, alkenyloxy, fluoroalkyl or alkenyl, each having up to 9 C atoms.

The medium additionally comprises one or more compounds of the formulae IVa-1, IVb-1 and/or XVI-1

IVa-1
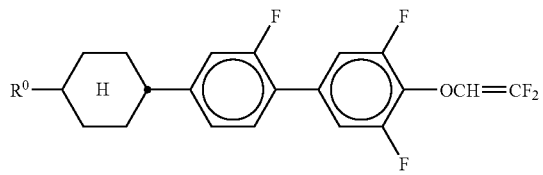

IVb-1
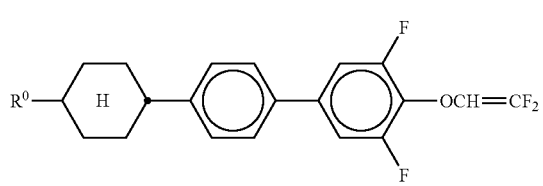

XVI-1
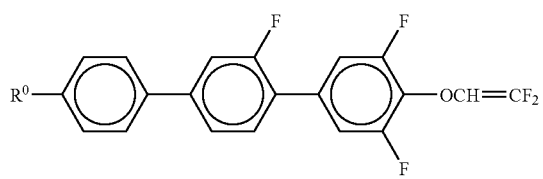

in which R⁰ has the meaning indicated above and is preferably a straight-chain alkyl radical.

The compounds are preferably present in the mixture in amounts of 5-50%.

The medium additionally comprises one or more compounds of the formula M

M
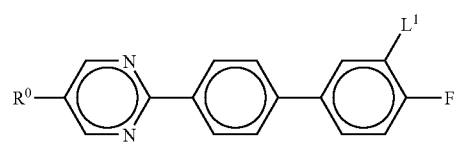

in which $R^0$ has the meanings indicated above and is preferably a straight-chain alkyl radical. $L^1$ denotes H or F.

The compounds are preferably present in the mixture in amounts of 5-35%.

The medium additionally comprises one or more compounds of the formulae N-1 to N-3

N-1
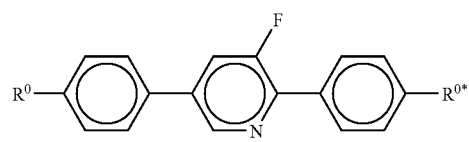

N-2
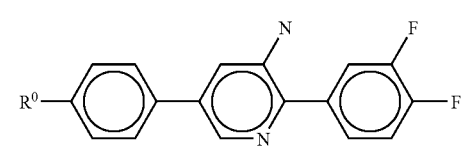

N-3
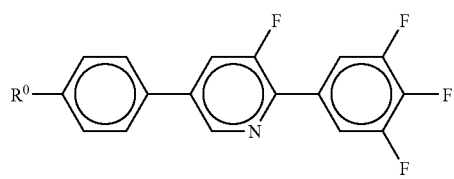

in which $R^0$ has the meanings indicated above. $R^0$ preferably denotes straight-chain alkyl, in particular ethyl, propyl, pentyl, furthermore methyl, butyl, hexyl. $R^{0*}$ preferably denotes straight-chain alkyl, in particular ethyl, propyl, pentyl, furthermore methyl, butyl, hexyl.

The compounds of the formulae N-1 to N-3 are preferably present in the mixture in amounts of 2-30%, in particular 2-20%.

The medium additionally comprises one, two or more compounds of the formula ST

ST
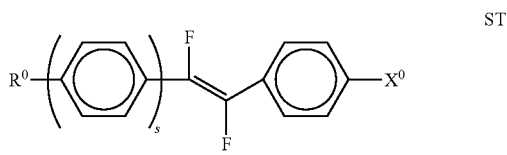

in which $R^0$ denotes n-alkyl, alkylalkoxy, alkoxy, alkenyloxy, fluoroalkyl or alkenyl, each having up to 9 C atoms, and $X^0$ denotes F, Cl, halogenated alkyl, halogenated alkenyl, halogenated alkenyloxy or halogenated alkoxy having up to 6 C atoms. $R^0$ preferably denotes straight-chain alkyl. $X^0$ is preferably F or $OCF_3$, s is 1 or 2, preferably s=1.

Besides one or more compounds of the formula I, very particularly preferred mixtures comprise at least one compound selected from the group of the formulae XIIb
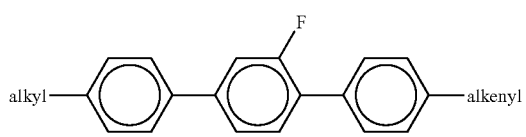

XVI-2
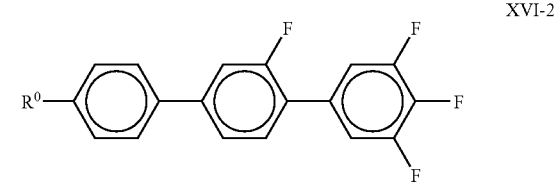

IVb-1
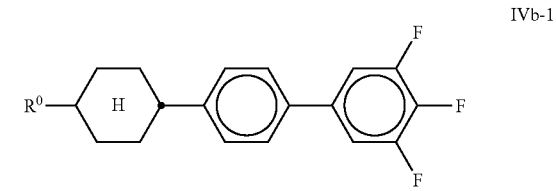

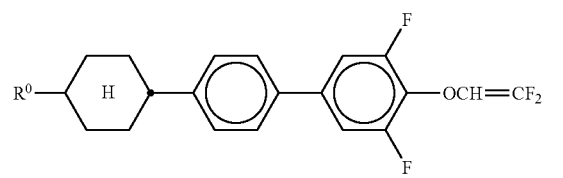

IVb-2

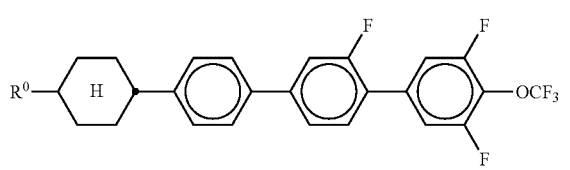

VIIIm

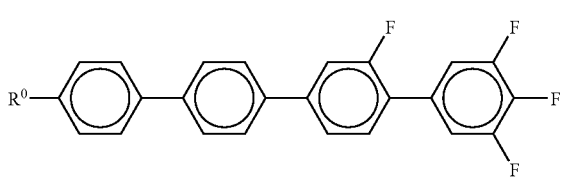

IXd

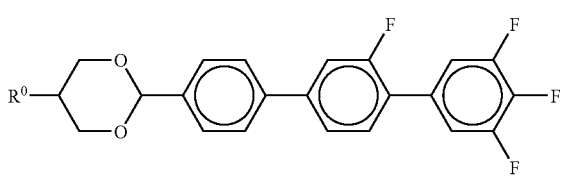

D4

The formula XIIb is preferably a compound of the formula XIIb-1, furthermore XIIb-2.

Preference is furthermore given to mixtures which, besides one or more compounds of the formula I, comprise at least one compound of the formula XIIa, preferably in amounts of 10-25%, at least one compound of the formula XVI, preferably in amounts of 5-25%, and optionally at least one compound of the formula XVIIIa

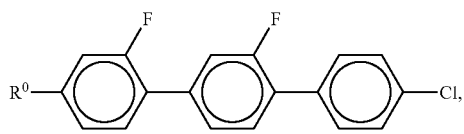

XVIIIa preferably in amounts of 5-20%, in particular 8-15%.

It has been found that even a relatively small proportion of compounds of the formula I and further conventional liquid-crystal materials, but in particular one or more compounds of the formulae XII-XXVI, results in a considerable lowering of the threshold voltage and in high birefringence values, with broad nematic phases with low smectic-nematic transition temperatures being observed at the same time, improving the shelf life. Particular preference is furthermore given to mixtures which, besides one or more compounds of the formula I, comprise one or more compounds of the formula IV, in particular compounds of the formula IVb in which $X^0$ denotes F, furthermore compounds of the formulae IVa, IVc and IVf. The compounds of the formulae I to XXVI are colourless, stable and readily miscible with one another and with other liquid-crystal materials.

The term "alkyl" or "alkyl*" encompasses straight-chain and branched alkyl groups having 1-7 carbon atoms, in particular the straight-chain groups methyl, ethyl, propyl, butyl, pentyl, hexyl and heptyl. Groups having 1-5 carbon atoms are generally preferred.

The term "alkenyl" encompasses straight-chain and branched alkenyl groups having 2-7 carbon atoms, in particular the straight-chain groups. Preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably encompasses straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" or "alkylalkoxy" preferably encompasses straight-chain radicals of the formula $C_nH_{2n+1}$—O—$(CH_2)_m$, in which n and m each, independently of one another, denote 1 to 6. Preferably, n=1 and m is 1 to 6.

Through a suitable choice of the meanings of $R^0$ and $X^0$, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in shorter addressing times, improved nematic tendencies and a higher ratio of the elastic constants $k_{33}$ (bend) and $k_{11}$ (splay) compared with alkyl and alkoxy radicals. 4-Alkenyl radicals, 3-alkenyl radicals and the like generally give lower threshold voltages and lower values of $k_{33}/k_{11}$ compared with alkyl and alkoxy radicals.

A —$CH_2CH_2$— group generally results in higher values of $k_{33}/k_{11}$ compared with a single covalent bond. Higher values of $k_{33}/k_{11}$ facilitate, for example, flatter transmission characteristic lines in TN cells with a 90° twist (in order to achieve grey shades) and steeper transmission characteristic lines in STN, SBE and OMI cells (greater multiplexability), and vice versa.

The optimum mixing ratio of the compounds of the formula I with the compounds of the formulae II-XXVI depends substantially on the desired properties, on the choice of the components of the formulae I and II-XXVI, and on the choice of any other components that may be present.

Suitable mixing ratios within the range given above can easily be determined from case to case.

The total amount of compounds of the formulae I and II to XXVI in the mixtures according to the invention is not crucial. The mixtures can therefore comprise one or more further components for the purposes of optimisation of various properties. However, the observed effect on the addressing times and the threshold voltage is generally greater, the higher the concentration of compounds of the formula I.

In a particularly preferred embodiment, the media according to the invention comprise compounds of the formulae II to V (preferably II, III and/or IV, in particular IVb) in which $X^0$ denotes F, $OCF_3$, $OCHF_2$, $OCH=CF_2$, $OCF=CF_2$ or $OCF_2$—$CF_2H$. A favourable synergistic effect with the compounds of the formula I results in particularly advantageous properties. In particular, mixtures comprising compounds of the formulae I and IVb in combination with one or more compounds from the group of the formulae XII-XXVI are distinguished by their low threshold voltages.

The individual compounds of the formulae I to XXVI and their sub-formulae which can be used in the media according to the invention are either known or can be prepared analogously to the known compounds.

The construction of the MLC display according to the invention from polarisers, electrode base plates and surface-treated electrodes corresponds to the usual design of displays of this type. The term "usual design" is broadly drawn here and also encompasses all derivatives and modifications of the MLC display, in particular including matrix display elements based on poly-Si TFTs or MIMs.

However, a significant difference between the displays according to the invention and the hitherto conventional displays based on the twisted nematic cell consists in the choice of the liquid-crystal parameters of the liquid-crystal layer.

The liquid-crystal mixtures which can be used in accordance with the invention are prepared in a manner conventional per se. In general, the desired amount of the components used in the lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives known to the person skilled in the art and described in the literature. For example, 0-15% of polymerisable compounds, pleochroic dyes, UV stabilisers, antioxidants, nanoparticles or chiral dopants can be added. Suitable dopants and stabilisers are listed in Tables C and D.

C denotes a crystalline phase, S a smectic phase, $S_C$ a smectic C phase, N a nematic phase and I the isotropic phase.

$V_{10}$ denotes the voltage for 10% transmission (viewing direction perpendicular to the plate surface). $t_{on}$ denotes the switch-on time and $t_{off}$ the switch-off time at an operating voltage corresponding to 2.0 times the value of $V_{10}$.

Δn denotes the optical anisotropy. ΔЄ denotes the dielectric anisotropy (ΔЄ=Є$_\parallel$−Є$_\perp$, where Є$_\parallel$ denotes the dielectric constant parallel to the longitudinal molecular axes and Є$_\perp$ denotes the dielectric constant perpendicular thereto). The electro-optical data are measured in a TN cell at the 1st minimum (i.e. at a d·Δn value of 0.5 μm) at 20° C., unless expressly stated otherwise. The optical data are measured at 20° C., unless expressly stated otherwise.

In the present application and in the examples below, the structures of the liquid-crystal compounds are indicated by means of acronyms, the trans-formation into chemical formulae taking place in accordance with Tables A and B below. All radicals $C_nH_{2n+1}$ and $C_mH_{2m+1}$ are straight-chain alkyl radicals having n and m C atoms respectively; n and m are integers and preferably denote 0, 1, 2, 3, 4, 5, 6, 7, 8, 9, 10, 11 or 12. The coding in Table B is self-evident. In Table A, only the acronym for the parent structure is indicated. In individual cases, the acronym for the parent structure is followed, separated by a dash, by a code for the substituents $R^{1*}$, $R^{2*}$, $L^{1*}$ and $L^{2*}$:

| Code for $R^{1*}$, $R^{2*}$, $L^{1*}$, $L^{2*}$, $L^{3*}$ | $R^{1*}$ | $R^{2*}$ | $L^{1*}$ | $L^{2*}$ |
|---|---|---|---|---|
| nm | $C_nH_{2n+1}$ | $C_mH_{2m+1}$ | H | H |
| nOm | $OC_nH_{2n+1}$ | $C_mH_{2m+1}$ | H | H |
| nO.m | $C_nH_{2n+1}$ | $OC_mH_{2m+1}$ | H | H |
| n | $C_nH_{2n+1}$ | CN | H | H |
| nN.F | $C_nH_{2n+1}$ | CN | F | H |
| nN.F.F | $C_nH_{2n+1}$ | CN | F | F |
| nF | $C_nH_{2n+1}$ | F | H | H |
| nCl | $C_nH_{2n+1}$ | Cl | H | H |
| nOF | $OC_nH_{2n+1}$ | F | H | H |
| nF.F | $C_nH_{2n+1}$ | F | F | H |
| nF.F.F | $C_nH_{2n+1}$ | F | F | F |
| nmF | $C_nH_{2n+1}$ | $C_mH_{2m+1}$ | F | H |
| nOCF$_3$ | $C_nH_{2n+1}$ | OCF$_3$ | H | H |
| nOCF$_3$.F | $C_nH_{2n+1}$ | OCF$_3$ | F | H |
| n-Vm | $C_nH_{2n+1}$ | —CH=CH—$C_mH_{2m+1}$ | H | H |
| nV-Vm | $C_nH_{2n+1}$—CH=CH— | —CH=CH—$C_mH_{2m+1}$ | H | H |
| n-OXF | $C_nH_{2n+1}$ | OCH=CF$_2$ | H | H |

Preferred mixture components are given in Tables A and B.

TABLE A

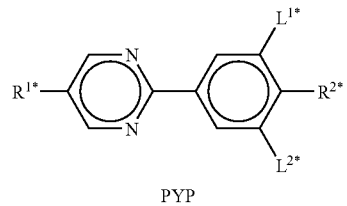

PYP

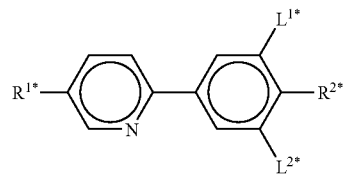

PYRP

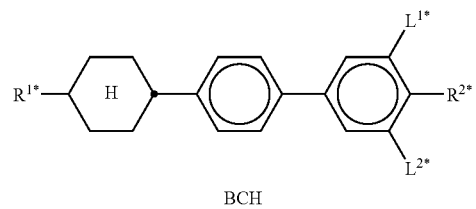

BCH

TABLE A-continued
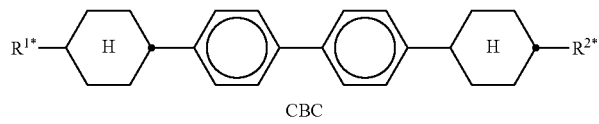
CBC
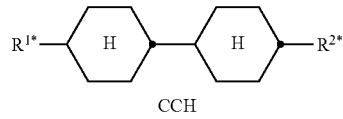
CCH
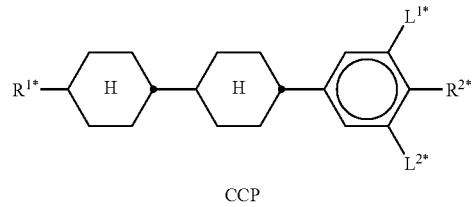
CCP
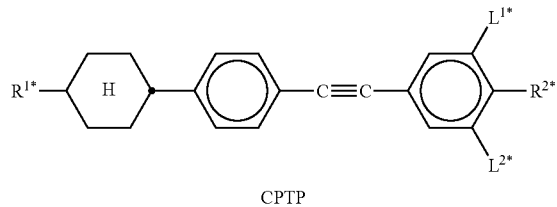
CPTP
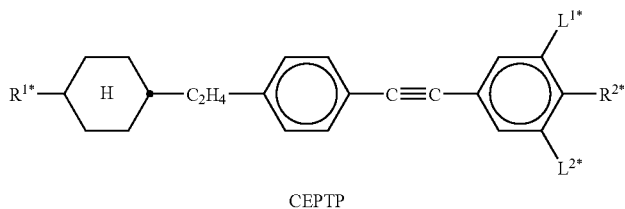
CEPTP
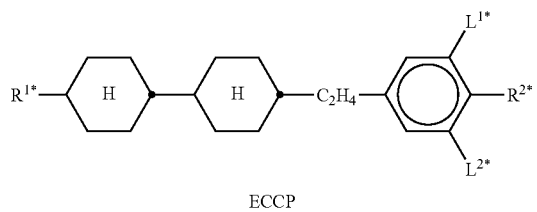
ECCP
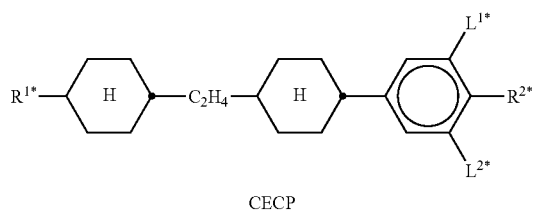
CECP
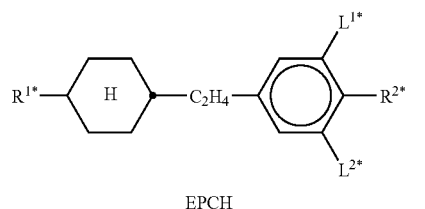
EPCH TABLE A-continued
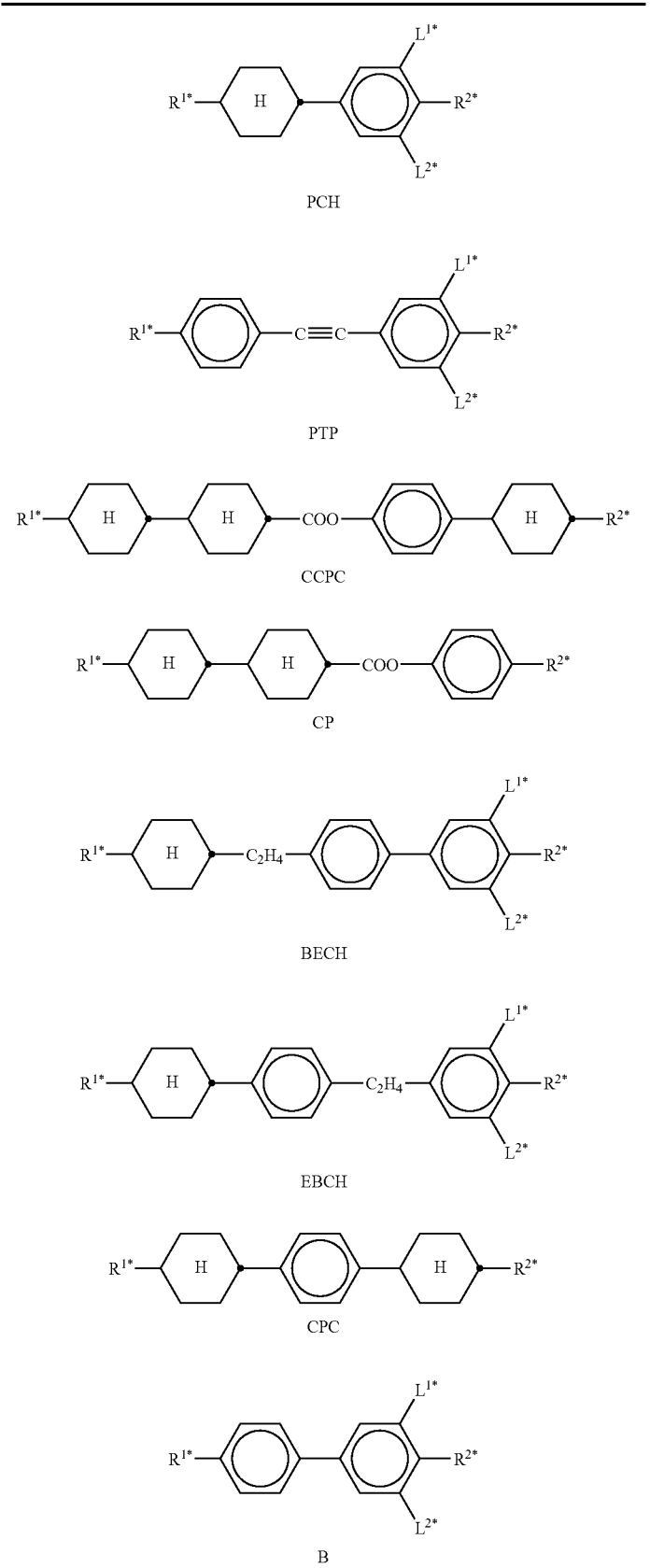

TABLE A-continued
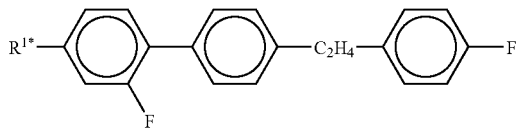
FET-nF
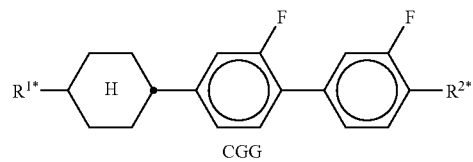
CGG
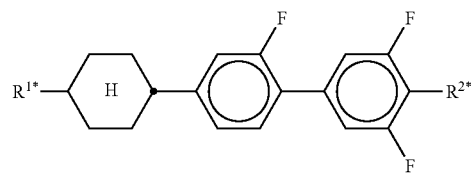
CGU
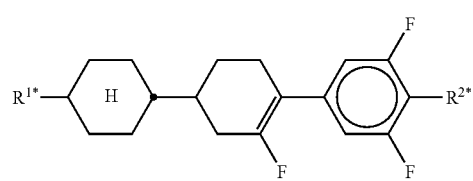
CFU
TABLE B
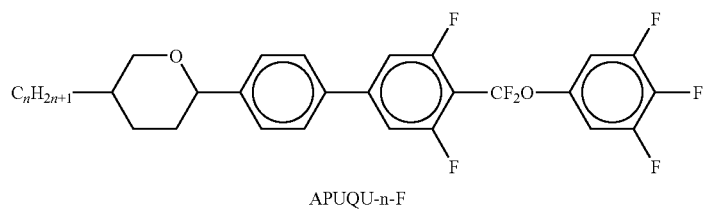
APUQU-n-F
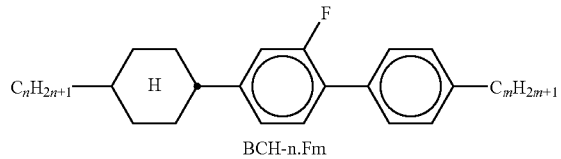
BCH-n.Fm
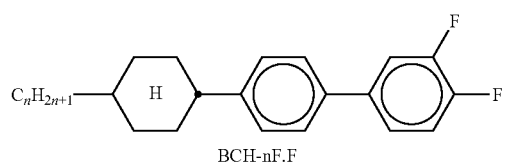
BCH-nF.F
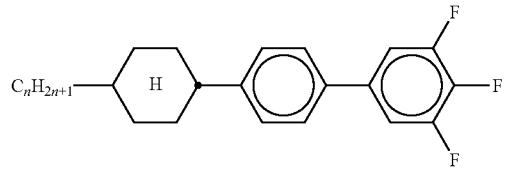
BCH-nF.F.F TABLE B-continued
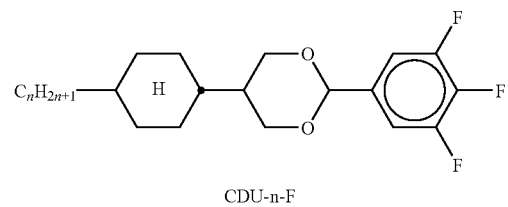
CDU-n-F
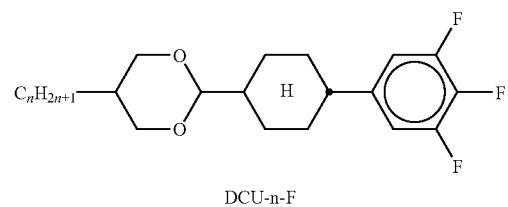
DCU-n-F
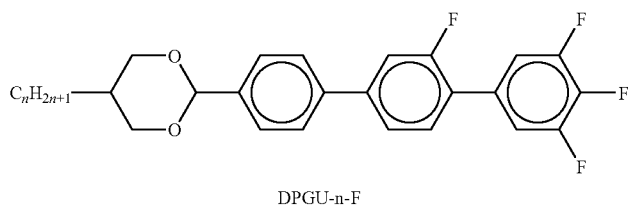
DPGU-n-F
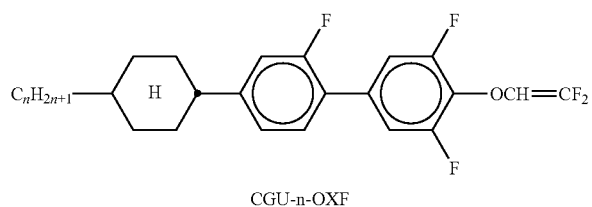
CGU-n-OXF
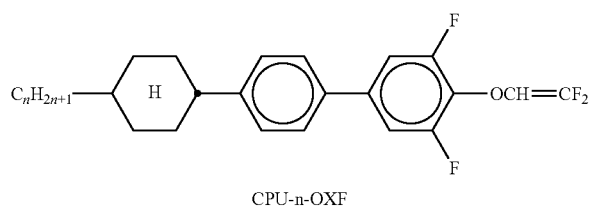
CPU-n-OXF
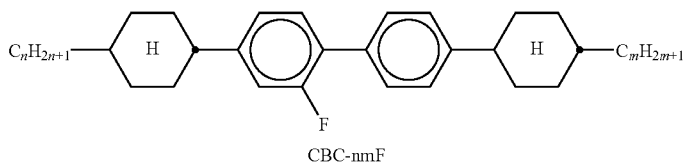
CBC-nmF
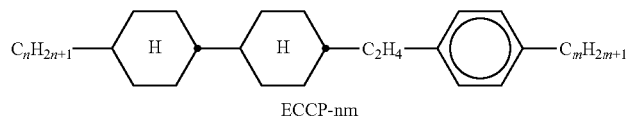
ECCP-nm
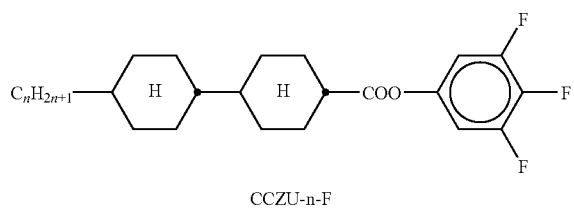
CCZU-n-F TABLE B-continued
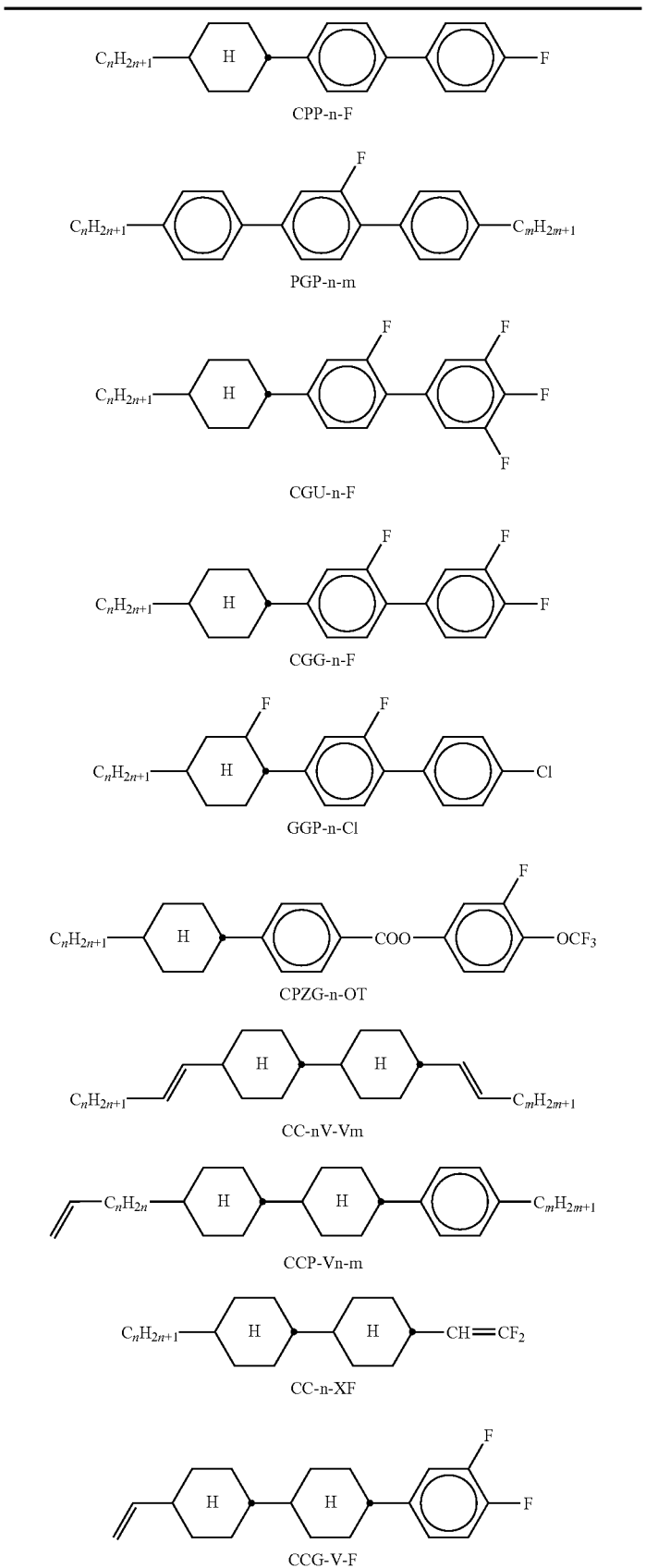

TABLE B-continued
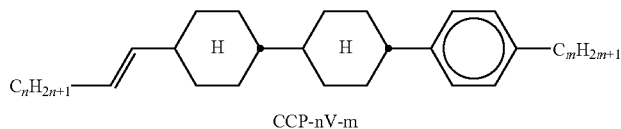
CCP-nV-m
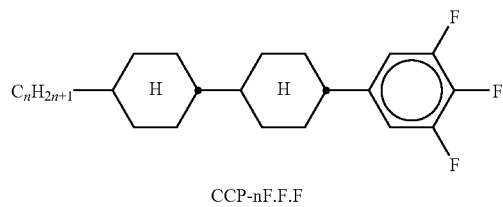
CCP-nF.F.F
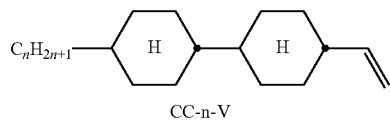
CC-n-V
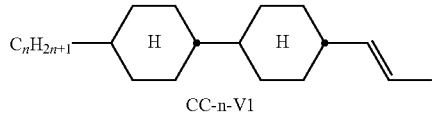
CC-n-V1
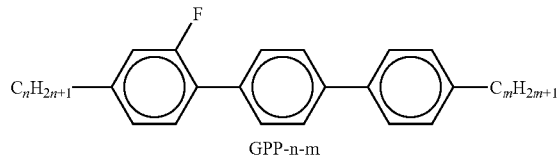
GPP-n-m
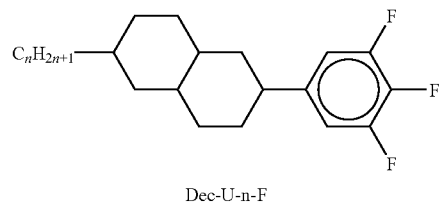
Dec-U-n-F
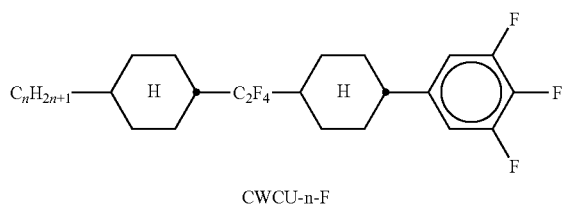
CWCU-n-F
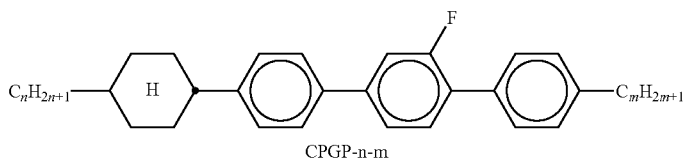
CPGP-n-m
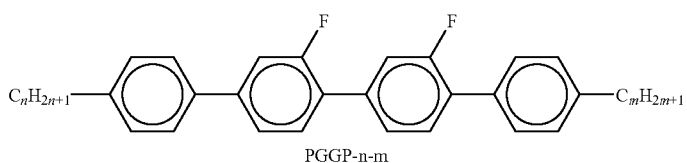
PGGP-n-m TABLE B-continued
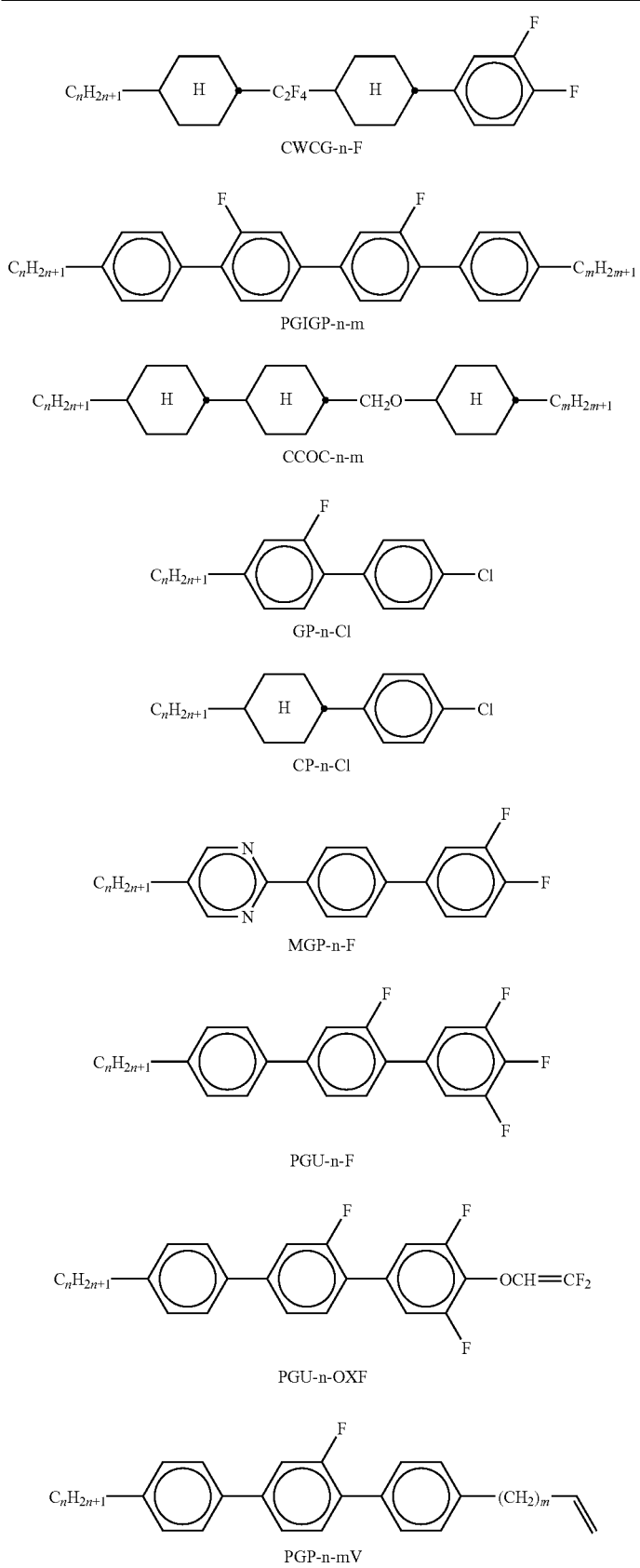

TABLE B-continued
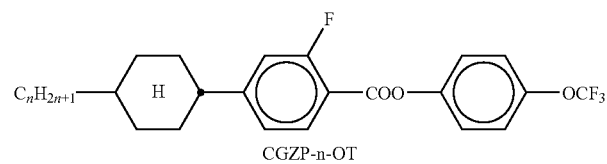
CGZP-n-OT
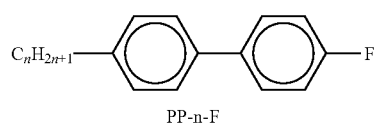
PP-n-F
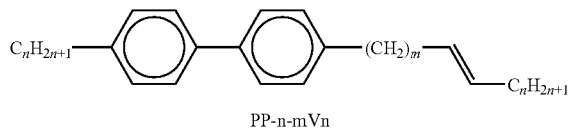
PP-n-mVn
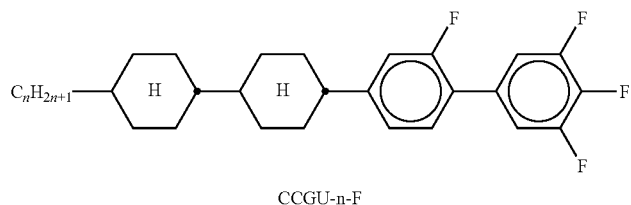
CCGU-n-F
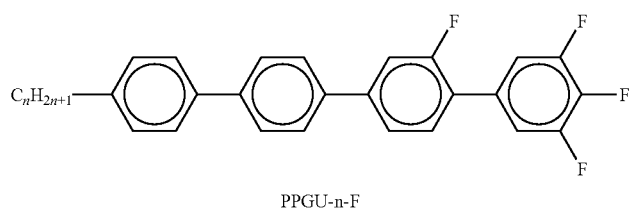
PPGU-n-F
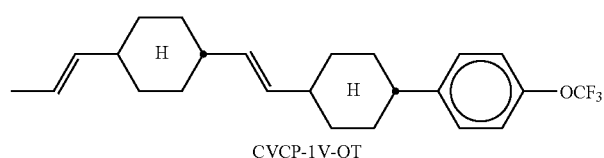
CVCP-1V-OT
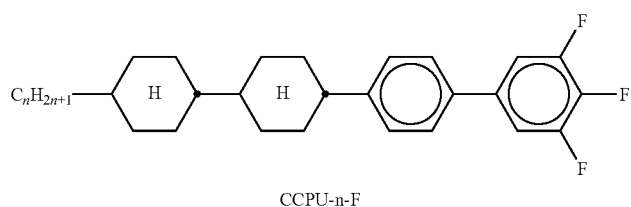
CCPU-n-F
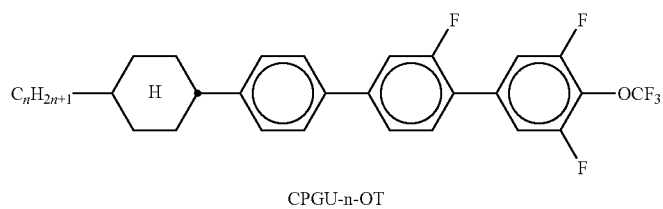
CPGU-n-OT
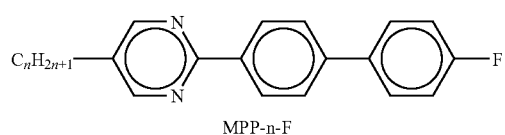
MPP-n-F TABLE B-continued

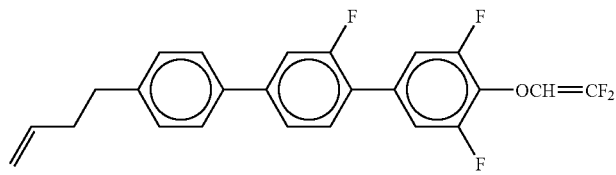

PGU-V2-OXF

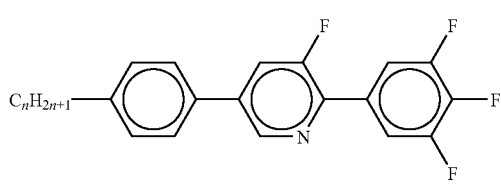

P(NF)U-n-F

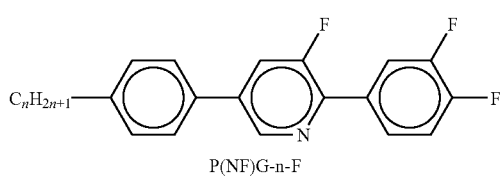

P(NF)G-n-F

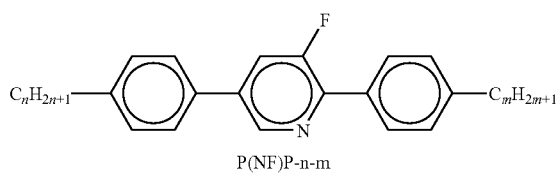

P(NF)P-n-m

Particular preference is given to liquid-crystalline mixtures which, besides the compounds of the formula I, comprise at least one, two, three or four compounds from Table B.

TABLE C

Table C shows possible dopants which are generally added to the mixtures according to the invention in a concentration of 0.1 to 10% by weight, in particular 0.1 to 6% by weight.

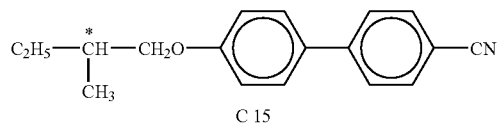

C 15

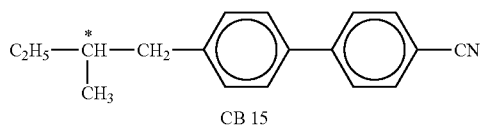

CB 15

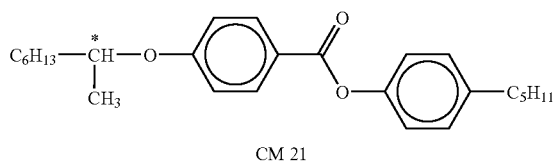

CM 21

TABLE C-continued
Table C shows possible dopants which are generally added to the mixtures according to the invention in a concentration of 0.1 to 10% by weight, in particular 0.1 to 6% by weight.
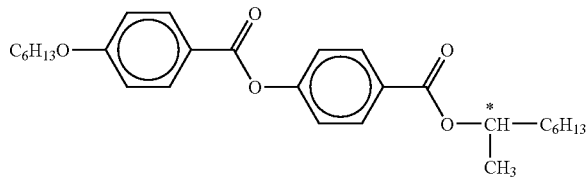
R/S-811
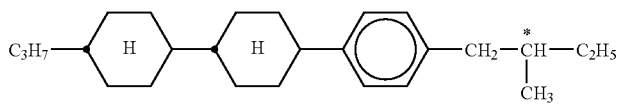
CM 44
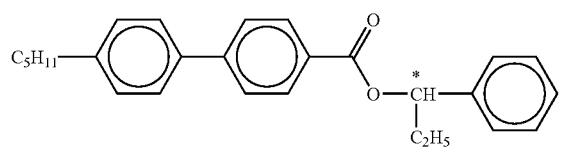
CM 45
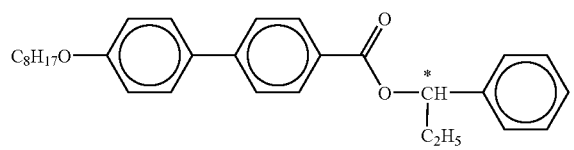
CM 47
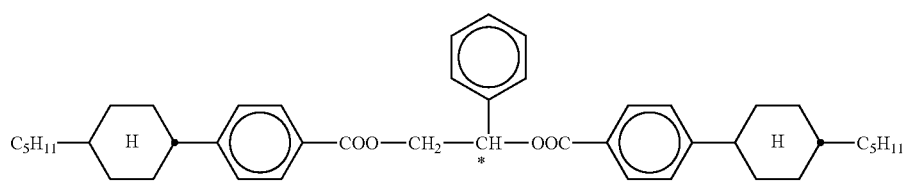
R/S-1011
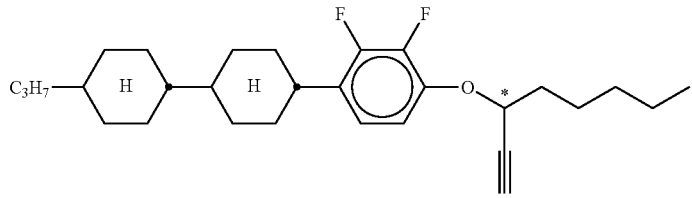
R/S-3011
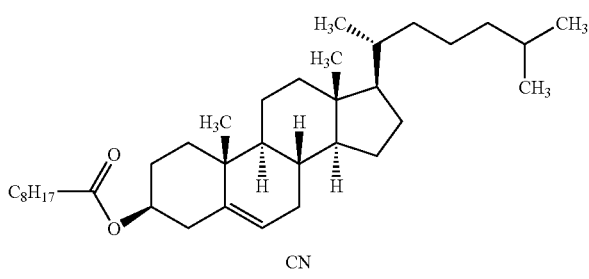
CN

TABLE C-continued

Table C shows possible dopants which are generally added to the mixtures according to the invention in a concentration of 0.1 to 10% by weight, in particular 0.1 to 6% by weight.

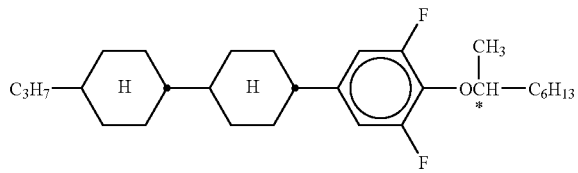

R/S-2011

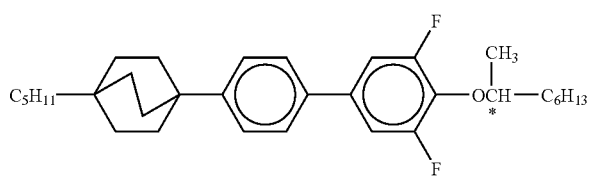

R/S-4011

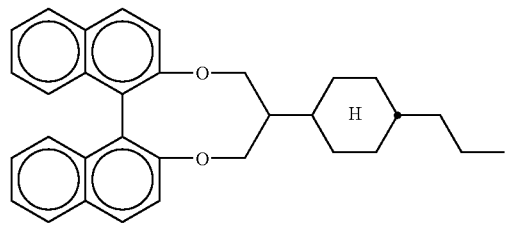

R/S-5011

TABLE D

Stabilisers and antioxidants which can be added, for example, to the mixtures according to the invention up to a maximum of 10% by weight, preferably 0.001-8% by weight, in particular 0.05-5% by weight, are shown below:

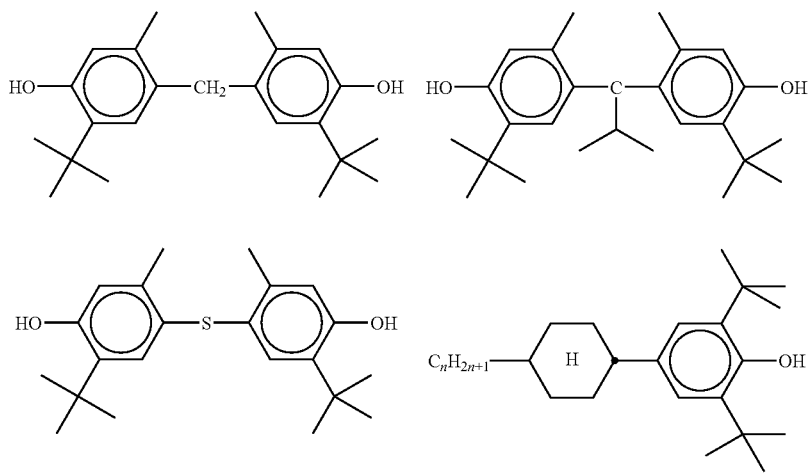

TABLE D-continued
Stabilisers and antioxidants which can be added, for example, to the mixtures according to the invention up to a maximum of 10% by weight, preferably 0.001-8% by weight, in particular 0.05-5% by weight, are shown below:
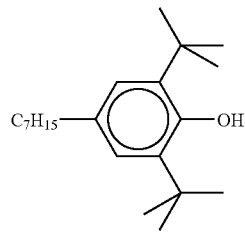 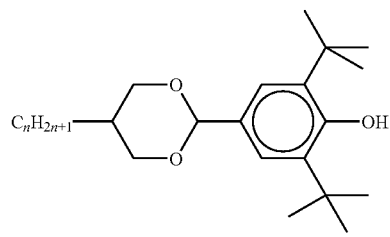
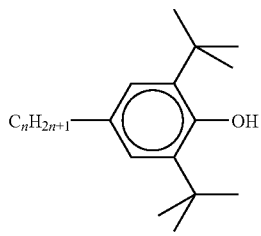 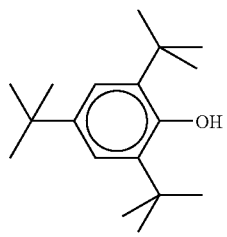
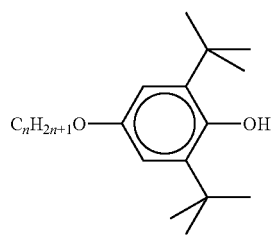 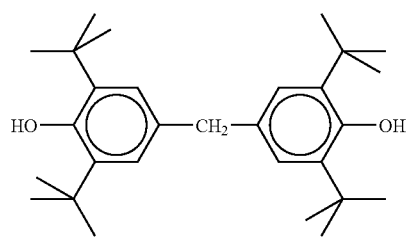
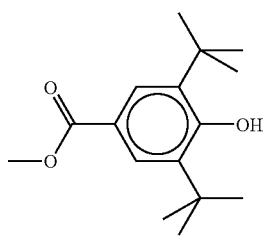 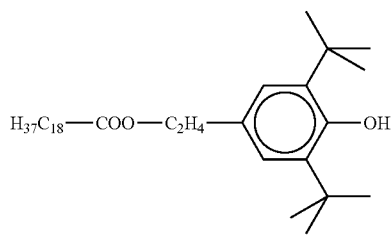
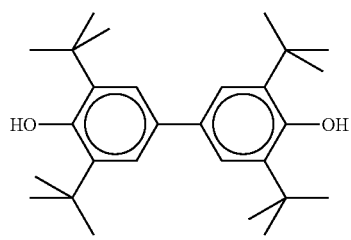 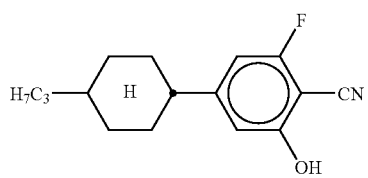
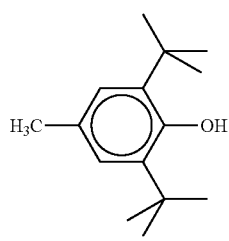

TABLE D-continued
Stabilisers and antioxidants which can be added, for example, to the mixtures according to the invention up to a maximum of 10% by weight, preferably 0.001-8% by weight, in particular 0.05-5% by weight, are shown below:
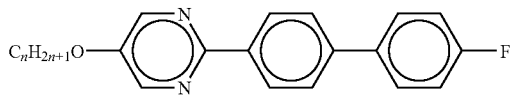
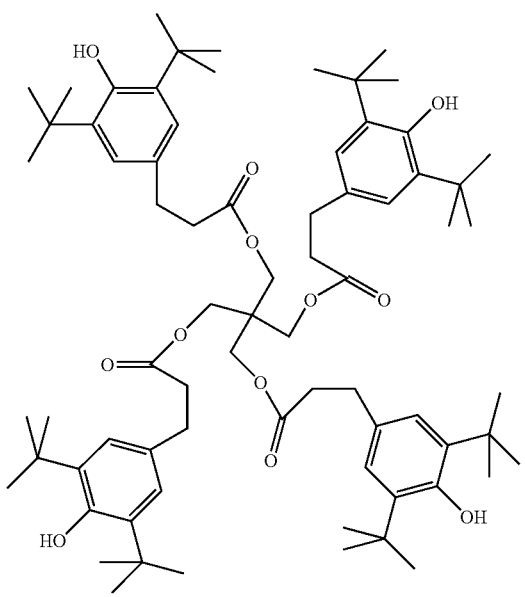
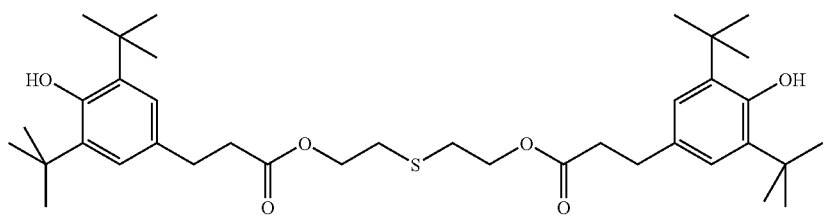
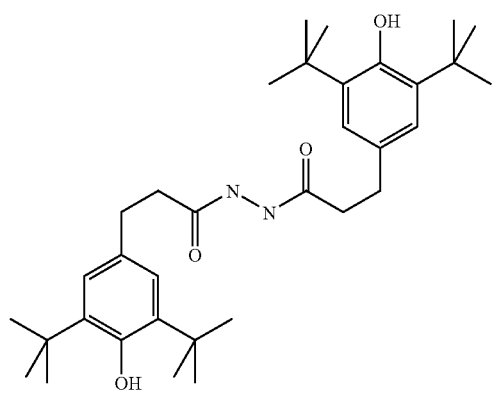

TABLE D-continued
Stabilisers and antioxidants which can be added, for example, to the mixtures according to the invention up to a maximum of 10% by weight, preferably 0.001-8% by weight, in particular 0.05-5% by weight, are shown below:
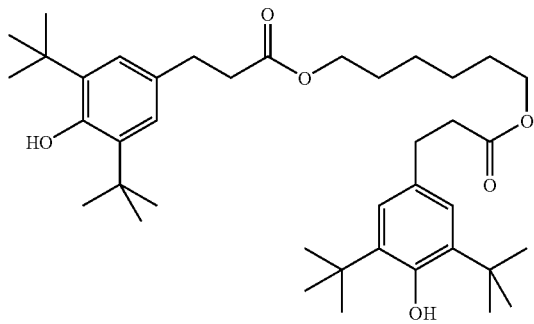
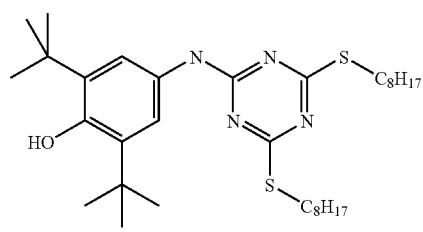
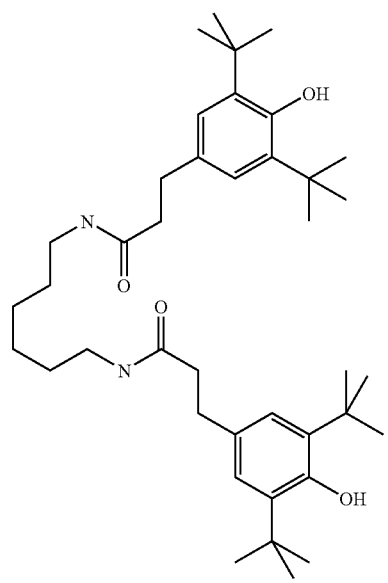

TABLE D-continued
Stabilisers and antioxidants which can be added, for example, to the mixtures according to the invention up to a maximum of 10% by weight, preferably 0.001-8% by weight, in particular 0.05-5% by weight, are shown below:
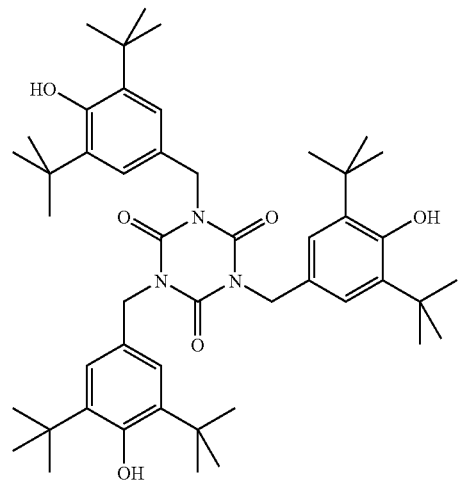
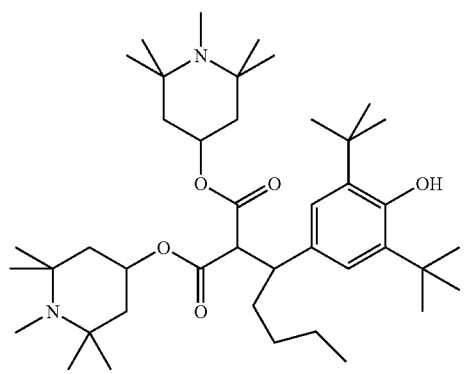
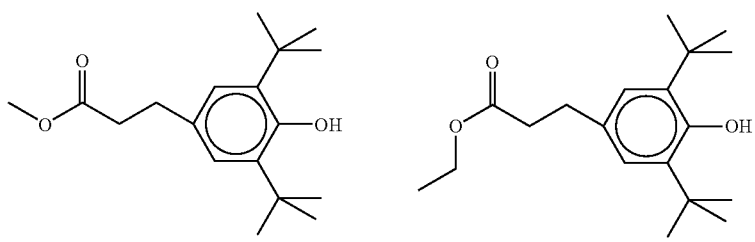
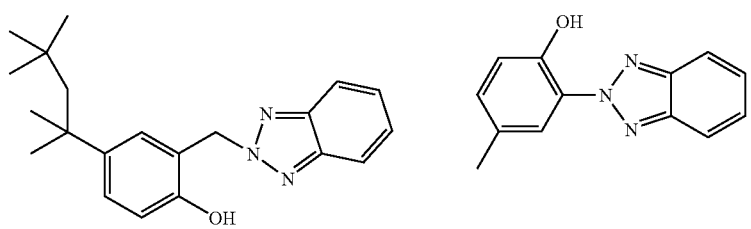

TABLE D-continued
Stabilisers and antioxidants which can be added, for example, to the mixtures according to the invention up to a maximum of 10% by weight, preferably 0.001-8% by weight, in particular 0.05-5% by weight, are shown below:
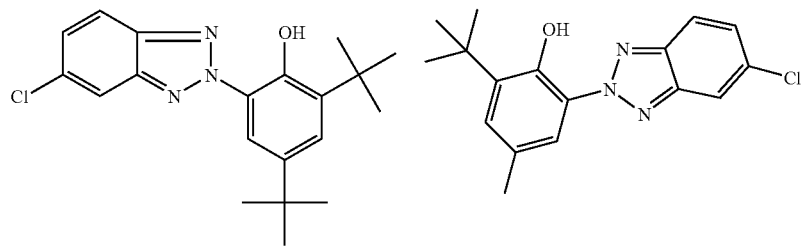
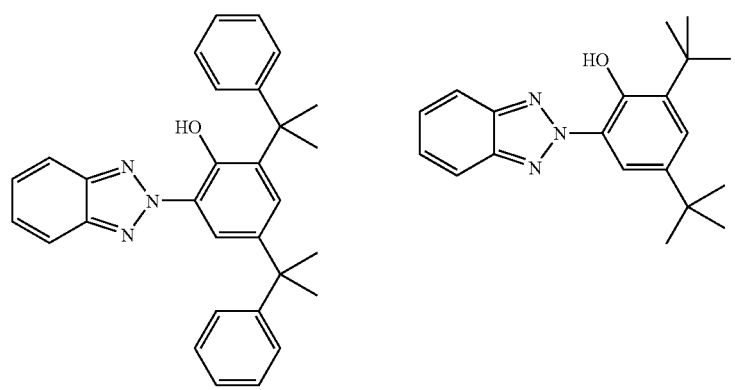
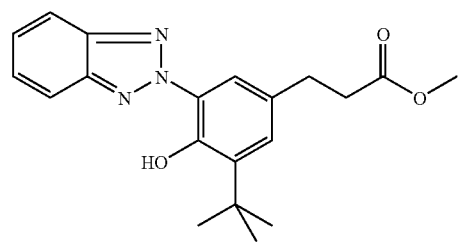
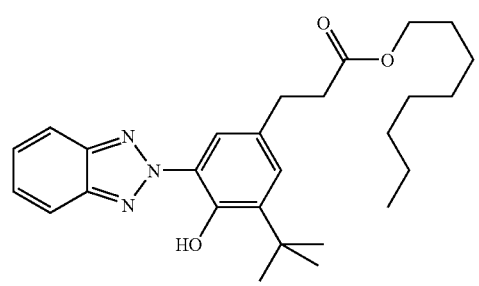

TABLE D-continued
Stabilisers and antioxidants which can be added, for example, to the mixtures according to the invention up to a maximum of 10% by weight, preferably 0.001-8% by weight, in particular 0.05-5% by weight, are shown below:
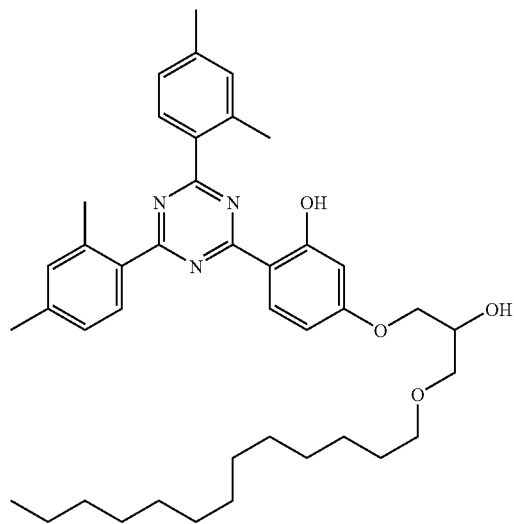
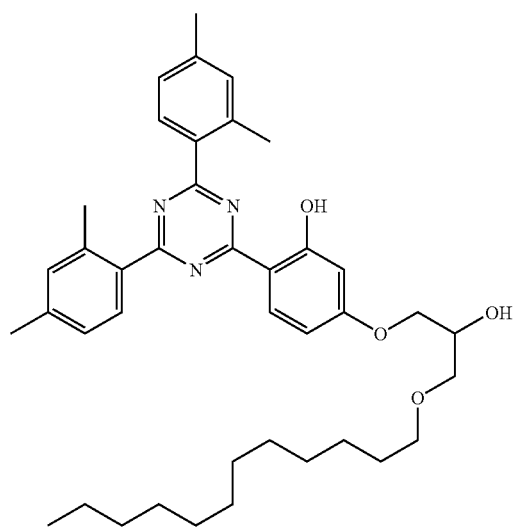
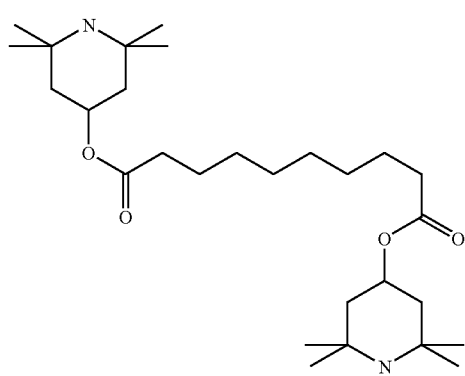

TABLE D-continued

Stabilisers and antioxidants which can be added, for example, to the mixtures according to the invention up to a maximum of 10% by weight, preferably 0.001-8% by weight, in particular 0.05-5% by weight, are shown below:

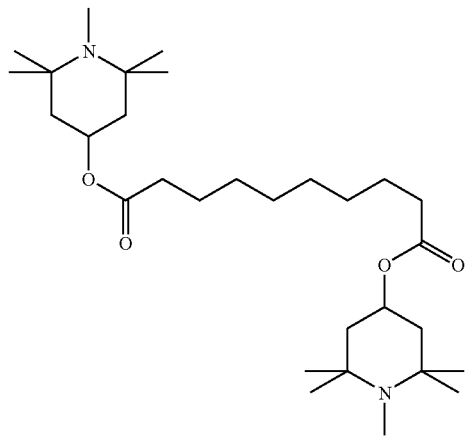

(n = 1, 2, 3, 4, 5, 6, 7, 8 or 9)

The following examples are intended to explain the invention without limiting it. Above and below, percentage data denote percent by weight. All temperatures are given in degrees Celsius. m.p. denotes melting point, cl.p.=clearing point. Furthermore, C=crystalline state, N=nematic phase, S=smectic phase and I=isotropic phase. The data between these symbols represent the transition temperatures. Δn denotes optical anisotropy (589 nm, 20° C.), the flow viscosity $v_{20}$ (mm$^2$/sec) and the rotational viscosity $\gamma_1$ (mPa·s) are each determined at 20° C. All physical properties are determined in accordance with "Merck Liquid Crystals, Physical Properties of Liquid Crystals", status November 1997, Merck KGaA, Germany, and apply for a temperature of 20° C., unless explicitly indicated otherwise. LTS is the low temperature stability, measured in cells at −20° C. and −30° C.

EXAMPLE M1

| | | | |
|---|---|---|---|
| CC-3-V | 45.50% | Clearing point [° C.]: | 76.0 |
| CC-3-V1 | 12.00% | Δn [589 nm, 20° C.]: | 0.1024 |
| PGP-2-3 | 4.00% | Δε [1 kHz, 20° C.]: | 5.1 |
| PGP-2-4 | 3.00% | $\gamma_1$ [mPa·s, 20° C.]: | 51 |
| PGU-3-F | 9.00% | $V_{10}$ [V]: | 1.89 |
| BCH-32 | 5.00% | | |
| CCP-V-1 | 7.50% | | |
| APUQU-2-F | 7.00% | | |
| APUQU-3-F | 7.00% | | |

EXAMPLE M2

| | | | |
|---|---|---|---|
| CC-3-V | 43.00% | Clearing point [° C.]: | 75.5 |
| CC-3-V1 | 12.00% | Δn [589 nm, 20° C.]: | 0.1059 |
| BCH-3F.F.F | 4.00% | Δε [1 kHz, 20° C.]: | 5.8 |
| PGP-2-3 | 4.00% | $\gamma_1$ [mPa·s, 20° C.]: | 54 |
| PGP-2-4 | 4.00% | $V_{10}$ [V]: | 1.76 |
| PGU-3-F | 8.00% | | |
| BCH-32 | 5.00% | | |
| CCP-V-1 | 5.00% | | |
| APUQU-2-F | 7.00% | | |
| APUQU-3-F | 8.00% | | |

EXAMPLE M3

| | | | |
|---|---|---|---|
| CCH-34 | 8.00% | Clearing point [° C.]: | 80.5 |
| CC-3-V1 | 14.00% | Δn [589 nm, 20° C.]: | 0.1049 |
| CC-4-V | 18.00% | Δε [1 kHz, 20° C.]: | 7.9 |
| CCP-V-1 | 11.00% | $\gamma_1$ [mPa·s, 20° C.]: | 74 |
| CCP-V2-1 | 5.00% | $V_{10}$ [V]: | 1.55 |
| PP-1-2V1 | 4.00% | | |
| APUQU-2-F | 6.00% | | |
| APUQU-4-F | 6.00% | | |
| CCP-2F.F.F | 6.00% | | |
| CCP-3F.F.F | 6.00% | | |
| PGU-3-F | 8.00% | | |
| PGU-2-F | 8.00% | | |

EXAMPLE M4

| | | | |
|---|---|---|---|
| CC-3-V | 49.00% | Clearing point [° C.]: | 74.5 |
| CC-3-V1 | 11.00% | Δn [589 nm, 20° C.]: | 0.1082 |
| PGP-2-3 | 7.00% | Δε [1 kHz, 20° C.]: | 5.3 |
| PGP-2-4 | 6.00% | $\gamma_1$ [mPa·s, 20° C.]: | 52 |
| PGU-3-F | 3.00% | $V_{10}$ [V]: | 1.86 |
| BCH-32 | 7.00% | | |
| APUQU-2-F | 8.00% | | |
| APUQU-3-F | 9.00% | | |

EXAMPLE M5

| | | | |
|---|---|---|---|
| CC-3-V1 | 18.00% | Clearing point [° C.]: | 82.0 |
| CC-3-V | 37.00% | Δn [589 nm, 20° C.]: | 0.1116 |
| CCP-V-1 | 5.00% | Δε [1 kHz, 20° C.]: | 8.2 |
| CCGU-3-F | 8.00% | $\gamma_1$ [mPa · s, 20° C.]: | 64 |
| PGU-2-F | 7.00% | $V_{10}$ [V]: | 1.59 |
| PGU-3-F | 10.00% | | |
| APUQU-2-F | 5.00% | | |
| APUQU-3-F | 5.00% | | |
| PPGU-3-F | 5.00% | | |

EXAMPLE M6

| | | | |
|---|---|---|---|
| CC-3-V | 43.00% | Clearing point [° C.]: | 75.0 |
| PP-1-2V1 | 1.00% | Δn [589 nm, 20° C.]: | 0.1190 |
| CC-3-V1 | 10.00% | Δε [1 kHz, 20° C.]: | 6.9 |
| PGU-2-F | 5.00% | $\gamma_1$ [mPa · s, 20° C.]: | 59 |
| PGU-3-F | 11.00% | $V_{10}$ [V]: | 1.65 |
| PGP-2-3 | 7.00% | | |
| PGP-2-4 | 5.00% | | |
| APUQU-2-F | 6.00% | | |
| APUQU-3-F | 7.00% | | |
| CCGU-3-F | 2.00% | | |
| CBC-33 | 3.00% | | |

EXAMPLE M7

| | | | |
|---|---|---|---|
| CC-3-V | 45.00% | Clearing point [° C.]: | 74.5 |
| CC-3-V1 | 11.50% | Δn [589 nm, 20° C.]: | 0.1189 |
| PGU-2-F | 8.00% | Δε [1 kHz, 20° C.]: | 5.5 |
| PGU-3-F | 10.00% | $\gamma_1$ [mPa · s, 20° C.]: | 53 |
| CCP-V-1 | 2.50% | $V_{10}$ [V]: | 1.84 |
| PGP-2-3 | 6.00% | | |
| PGP-2-4 | 5.00% | | |
| PPGU-3-F | 3.00% | | |
| APUQU-2-F | 6.00% | | |
| CBC-33 | 3.00% | | |

EXAMPLE M8

| | | | |
|---|---|---|---|
| CC-3-V | 36.00% | Clearing point [° C.]: | 74.5 |
| CC-3-V1 | 12.00% | Δn [589 nm, 20° C.]: | 0.1185 |
| PP-1-2V1 | 5.00% | Δε [1 kHz, 20° C.]: | 5.7 |
| PGU-2-F | 5.00% | $\gamma_1$ [mPa · s, 20° C.]: | 56 |
| PGU-3-F | 8.00% | $V_{10}$ [V]: | 1.86 |
| CCP-V-1 | 11.00% | | |
| PGP-2-3 | 6.00% | | |
| PGP-2-4 | 5.00% | | |
| APUQU-2-F | 6.00% | | |
| APUQU-3-F | 6.00% | | |

EXAMPLE M9

| | | | |
|---|---|---|---|
| CC-3-V | 45.00% | Clearing point [° C.]: | 74.0 |
| CC-3-V1 | 6.00% | Δn [589 nm, 20° C.]: | 0.1202 |
| PGU-2-F | 6.00% | Δε [1 kHz, 20° C.]: | 4.1 |
| PGU-3-F | 8.00% | $\gamma_1$ [mPa · s, 20° C.]: | 51 |
| PGP-2-3 | 6.00% | $V_{10}$ [V]: | 2.09 |
| PGP-2-4 | 6.00% | | |
| PGP-2-5 | 7.00% | | |
| CCP-V-1 | 10.00% | | |
| APUQU-2-F | 3.00% | | |
| APUQU-3-F | 3.00% | | |

EXAMPLE M10

| | | | |
|---|---|---|---|
| GGP-3-CI | 7.00% | Clearing point [° C.]: | 76.0 |
| GGP-5-CI | 3.00% | Δn [589 nm, 20° C.]: | 0.1264 |
| PGU-2-F | 5.00% | Δε [1 kHz, 20° C.]: | 4.8 |
| PGU-3-F | 4.00% | $\gamma_1$ [mPa · s, 20° C.]: | 61 |
| APUQU-2-F | 4.00% | $V_{10}$ [V]: | 1.90 |
| APUQU-3-F | 4.00% | LTS in cells at −20° C.: | >1000 h |
| CCP-V-1 | 11.00% | LTS in cells at −30° C.: | >1000 h |
| CC-3-V1 | 8.00% | | |
| PGP-2-3 | 7.00% | | |
| PGP-2-4 | 7.00% | | |
| CC-3-V | 37.00% | | |
| CP-3-CI | 3.00% | | |

EXAMPLE M11

| | | | |
|---|---|---|---|
| CC-3-V | 40.00% | Clearing point [° C.]: | 76.0 |
| CC-3-V1 | 7.00% | Δn [589 nm, 20° C.]: | 0.1302 |
| PP-1-2V1 | 2.00% | Δε [1 kHz, 20° C.]: | 4.5 |
| PGU-2-F | 4.00% | $\gamma_1$ [mPa · s, 20° C.]: | 61 |
| PGU-3-F | 7.00% | $V_{10}$ [V]: | 2.00 |
| PGP-2-3 | 5.00% | | |
| PGP-2-4 | 6.00% | | |
| PGP-2-5 | 6.00% | | |
| CCP-V-1 | 8.00% | | |
| GGP-3-CI | 5.00% | | |
| GGP-5-CI | 3.00% | | |
| APUQU-3-F | 7.00% | | |

EXAMPLE M12

| | | | |
|---|---|---|---|
| CC-3-V | 43.00% | Clearing point [° C.]: | 75.5 |
| CC-3-V1 | 7.00% | Δn [589 nm, 20° C.]: | 0.1295 |
| PGU-2-F | 3.00% | Δε [1 kHz, 20° C.]: | 4.5 |
| PGU-2-F | 8.00% | $\gamma_1$ [mPa · s, 20° C.]: | 60 |
| PGP-2-4 | 6.00% | $V_{10}$ [V]: | 1.97 |
| PGP-2-5 | 6.00% | | |
| PGP-2-2V | 7.00% | | |
| CCP-V-1 | 5.00% | | |
| GGP-3-CI | 5.00% | | |
| GGP-5-CI | 3.00% | | |
| APUQU-3-F | 7.00% | | |

EXAMPLE M13

| | | | |
|---|---|---|---|
| PCH-301 | 14.00% | Clearing point [° C.]: | 80.0 |
| CCP-V-1 | 16.00% | Δn [589 nm, 20° C.]: | 0.1346 |

-continued

| | | | | |
|---|---|---|---|---|
| CCP-V2-1 | 6.00% | Δε [1 kHz, 20° C.]: | | 5.1 |
| PP-1-2V1 | 9.00% | γ₁ [mPa·s, 20° C.]: | | 68 |
| PGP-2-3 | 7.00% | $V_{10}$ [V]: | | 1.86 |
| PGP-2-4 | 8.00% | | | |
| CC-3-V | 19.00% | | | |
| PGU-2-F | 7.00% | | | |
| APUQU-2-F | 7.00% | | | |
| APUQU-4-F | 7.00% | | | |

EXAMPLE M14

| | | | | |
|---|---|---|---|---|
| GGP-3-CI | 6.00% | Clearing point [° C.]: | | 73.5 |
| GGP-5-CI | 11.00% | Δn [589 nm, 20° C.]: | | 0.1373 |
| PGP-2-3 | 7.00% | Δε [1 kHz, 20° C.]: | | 3.9 |
| PGP-2-4 | 8.00% | γ₁ [mPa·s, 20° C.]: | | 64 |
| CBC-33 | 2.00% | $V_{10}$ [V]: | | 2.10 |
| CCP-V-1 | 4.00% | | | |
| PP-1-2V1 | 6.00% | | | |
| CC-3-V | 45.00% | | | |
| APUQU-2-F | 5.00% | | | |
| PGU-3-F | 6.00% | | | |

EXAMPLE M15

| | | | | |
|---|---|---|---|---|
| CC-3-V | 44.00% | Clearing point [° C.]: | | 69.5 |
| PP-1-2V1 | 8.00% | Δn [589 nm, 20° C.]: | | 0.1355 |
| PGU-2-F | 3.00% | Δε [1 kHz, 20° C.]: | | 3.9 |
| PGU-3-F | 6.00% | γ₁ [mPa·s, 20° C.]: | | 56 |
| PGP-2-3 | 5.00% | $V_{10}$ [V]: | | 2.09 |
| PGP-2-4 | 7.00% | | | |
| PGP-2-5 | 5.00% | | | |
| GGP-3-CI | 8.00% | | | |
| GGP-5-CI | 3.00% | | | |
| CCP-V-1 | 6.00% | | | |
| APUQU-3-F | 5.00% | | | |

EXAMPLE M16

| | | | | |
|---|---|---|---|---|
| CC-3-V | 43.00% | Clearing point [° C.]: | | 70.0 |
| CC-3-V1 | 2.00% | Δn [589 nm, 20° C.]: | | 0.1338 |
| PP-1-2V1 | 9.00% | Δε [1 kHz, 20° C.]: | | 4.2 |
| PGU-2-F | 3.00% | γ₁ [mPa·s, 20° C.]: | | 55 |
| PGU-3-F | 6.00% | $V_{10}$ [V]: | | 2.04 |
| PGP-2-5 | 7.00% | | | |
| PGP-2-2V | 7.00% | | | |
| GGP-3-CI | 8.00% | | | |
| GGP-5-CI | 3.00% | | | |
| CCP-V-1 | 6.00% | | | |
| APUQU-3-F | 6.00% | | | |

EXAMPLE M17

| | | | | |
|---|---|---|---|---|
| GGP-3-CI | 5.00% | Clearing point [° C.]: | | 75.0 |
| GGP-5-CI | 6.00% | Δn [589 nm, 20° C.]: | | 0.1413 |
| PGP-2-3 | 7.00% | Δε [1 kHz, 20° C.]: | | 4.0 |
| PGP-2-4 | 9.00% | γ₁ [mPa·s, 20° C.]: | | 64 |

-continued

| | | | | |
|---|---|---|---|---|
| CBC-33 | 2.00% | $V_{10}$ [V]: | | 2.17 |
| CCP-V-1 | 7.00% | | | |
| PP-1-2V1 | 10.00% | | | |
| CC-3-V | 40.00% | | | |
| APUQU-3-F | 5.00% | | | |
| PGU-3-F | 9.00% | | | |

EXAMPLE M18

| | | | | |
|---|---|---|---|---|
| GGP-3-CI | 8.50% | Clearing point [° C.]: | | 75.5 |
| PGP-2-2V | 10.00% | Δn [589 nm, 20° C.]: | | 0.1407 |
| PGP-2-4 | 10.00% | Δε [1 kHz, 20° C.]: | | 3.9 |
| PGP-2-5 | 10.00% | γ₁ [mPa·s, 20° C.]: | | 58 |
| CC-3-V | 48.00% | $V_{10}$ [V]: | | 2.10 |
| APUQU-2-F | 7.50% | | | |
| PGU-3-F | 6.00% | | | |

EXAMPLE M19

| | | | | |
|---|---|---|---|---|
| CC-3-V | 31.00% | Clearing point [° C.]: | | 77.0 |
| CCP-V-1 | 10.00% | Δn [589 nm, 20° C.]: | | 0.1049 |
| PP-1-2V1 | 10.00% | Δε [1 kHz, 20° C.]: | | 8.1 |
| APUQU-2-F | 10.00% | γ₁ [mPa·s, 20° C.]: | | 74 |
| APUQU-4-F | 10.00% | $V_{10}$ [V]: | | 1.48 |
| PGP-2-4 | 6.00% | | | |
| CCP-2F.F.F | 8.00% | | | |
| CCP-3F.F.F | 8.00% | | | |
| CCP-5F.F.F | 7.00% | | | |

EXAMPLE M20

| | | | | |
|---|---|---|---|---|
| APUQU-2-F | 10.00% | Clearing point [° C.]: | | 74.5 |
| APUQU-3-F | 10.00% | Δn [589 nm, 20° C.]: | | 0.1052 |
| BCH-32 | 4.00% | Δε [1 kHz, 20° C.]: | | 5.0 |
| CC-3-V | 50.00% | γ₁ [mPa·s, 20° C.]: | | 52 |
| CC-3-V1 | 10.00% | $V_{10}$ [V]: | | 1.83 |
| PGP-2-3 | 8.00% | | | |
| PGP-2-4 | 8.00% | | | |

EXAMPLE M21

| | | | | |
|---|---|---|---|---|
| APUQU-2-F | 8.50% | Clearing point [° C.]: | | 79.5 |
| APUQU-3-F | 12.00% | Δn [589 nm, 20° C.]: | | 0.1307 |
| BCH-3F.F.F | 14.00% | Δε [1 kHz, 20° C.]: | | 11.1 |
| CGU-3-F | 10.00% | γ₁ [mPa·s, 20° C.]: | | 97 |
| CCGU-3-F | 8.00% | $V_{10}$ [V]: | | 1.32 |
| CC-3-V | 29.50% | LTS in cells at −20° C.: | | >1000 h |
| PGP-2-3 | 6.00% | LTS in cells at −30° C.: | | >1000 h |
| PGP-2-4 | 7.00% | | | |
| PP-1-2V1 | 5.00% | | | |

EXAMPLE M22

| | | | |
|---|---|---|---|
| CC-3-V | 40.00% | Clearing point [° C.]: | 76.0 |
| PP-1-2V1 | 9.00% | Δn [589 nm, 20° C.]: | 0.1224 |
| BCH-3F.F | 8.00% | Δε [1 kHz, 20° C.]: | 4.8 |
| BCH-3F.F | 3.00% | γ$_1$ [mPa · s, 20° C.]: | 64 |
| GGP-3-CI | 3.00% | V$_{10}$ [V]: | 2.03 |
| PGP-2-3 | 3.00% | | |
| PGP-2-4 | 6.00% | | |
| PGP-2-5 | 5.00% | | |
| CCP-V-1 | 11.00% | | |
| APUQU-2-F | 6.00% | | |
| APUQU-3-F | 6.00% | | |

EXAMPLE M23

| | | | |
|---|---|---|---|
| PCH-301 | 26.00% | Clearing point [° C.]: | 74.0 |
| CCP-V-1 | 13.00% | Δn [589 nm, 20° C.]: | 0.1347 |
| PP-1-2V1 | 10.00% | Δε [1 kHz, 20° C.]: | 5.1 |
| PGP-2-3 | 8.00% | γ$_1$ [mPa · s, 20° C.]: | 82 |
| PGP-2-4 | 9.00% | V$_{10}$ [V]: | 1.82 |
| CC-3-V1 | 14.00% | | |
| APUQU-2-F | 10.00% | | |
| APUQU-4-F | 10.00% | | |

EXAMPLE M24

| | | | |
|---|---|---|---|
| GGP-3-CI | 5.00% | Clearing point [° C.]: | 76.0 |
| BCH-3F.F.F | 10.00% | Δn [589 nm, 20° C.]: | 0.1402 |
| CCP-V-1 | 4.50% | Δε [1 kHz, 20° C.]: | 4.4 |
| PGP-2-3 | 7.00% | γ$_1$ [mPa · s, 20° C.]: | 65 |
| PGP-2-4 | 7.00% | V$_{10}$ [V]: | 2.11 |
| PGP-2-5 | 9.00% | | |
| PP-1-2V1 | 10.00% | | |
| CC-3-V | 37.50% | | |
| APUQU-3-F | 10.00% | | |

EXAMPLE M25

| | | | |
|---|---|---|---|
| GGP-3-CI | 6.00% | Clearing point [° C.]: | 75.0 |
| GGP-5-CI | 4.00% | Δn [589 nm, 20° C.]: | 0.1406 |
| PGP-2-2V | 10.00% | Δε [1 kHz, 20° C.]: | 3.8 |
| PGP-2-4 | 10.00% | γ$_1$ [mPa · s, 20° C.]: | 62 |
| PGP-2-5 | 9.00% | V$_{10}$ [V]: | 2.12 |
| PP-1-2V1 | 4.00% | | |
| CC-3-V | 46.00% | | |
| APUQU-2-F | 11.00% | | |

EXAMPLE M26

| | | | |
|---|---|---|---|
| PGU-3-F | 7.00% | Clearing point [° C.]: | 72.5 |
| PGP-2-2V | 13.00% | Δn [589 nm, 20° C.]: | 0.1419 |
| PGP-2-4 | 11.00% | Δε [1 kHz, 20° C.]: | 4.0 |
| PGP-2-5 | 12.00% | γ$_1$ [mPa · s, 20° C.]: | 59 |
| CC-3-V | 44.00% | LTS in cells at −20° C.: | >1000 h |
| APUQU-2-F | 9.00% | LTS in cells at −30° C.: | >1000 h |
| GP-2-CI | 4.00% | | |

EXAMPLE M27

| | | | |
|---|---|---|---|
| CC-3-V | 60.00% | Clearing point [° C.]: | 80.0 |
| CCGU-3-F | 6.00% | Δn [589 nm, 20° C.]: | 0.1008 |
| APUQU-2-F | 10.00% | Δε [1 kHz, 20° C.]: | 7.3 |
| APUQU-3-F | 13.00% | γ$_1$ [mPa · s, 20° C.]: | 60 |
| PPGU-3-F | 3.00% | V$_{10}$ [V] | 1.51 |
| PGP-2-4 | 5.00% | | |
| PGGP-3-5 | 3.00% | | |

EXAMPLE M28

| | | | |
|---|---|---|---|
| CC-3-V1 | 18.00% | Clearing point [° C.]: | 82.0 |
| CC-3-V | 37.00% | Δn [589 nm, 20° C.]: | 0.1116 |
| CCP-V-1 | 5.00% | Δε [1 kHz, 20° C.]: | 8.2 |
| CCGU-3-F | 8.00% | γ$_1$ [mPa · s, 20° C.]: | 64 |
| PGU-2-F | 7.00% | V$_{10}$ [V]: | 1.59 |
| PGU-3-F | 10.00% | | |
| APUQU-2-F | 5.00% | | |
| APUQU-3-F | 5.00% | | |
| PPGU-3-F | 5.00% | | |

EXAMPLE M29

| | | | |
|---|---|---|---|
| GGP-3-CI | 6.00% | Clearing point [° C.]: | 74.0 |
| GGP-5-CI | 11.00% | Δn [589 nm, 20° C.]: | 0.1382 |
| PGP-2-3 | 7.00% | Δε [1 kHz, 20° C.]: | 4.0 |
| PGP-2-4 | 5.00% | γ$_1$ [mPa · s, 20° C.]: | 65 |
| CCP-V-1 | 1.00% | V$_{10}$ [V]: | 2.11 |
| PP-1-2V1 | 6.00% | | |
| CC-3-V | 48.00% | | |
| APUQU-2-F | 5.00% | | |
| PGU-3-F | 6.00% | | |
| CPGP-3-3 | 5.00% | | |

EXAMPLE M30

| | | | |
|---|---|---|---|
| CCP-V-1 | 14.00% | Clearing point [° C.]: | 80.5 |
| CCP-V2-1 | 3.00% | Δn [589 nm, 20° C.]: | 0.1339 |
| PP-1-2V1 | 9.00% | Δε [1 kHz, 20° C.]: | 5.3 |
| PGP-2-3 | 5.00% | γ$_1$ [mPa · s, 20° C.]: | 69 |
| PGP-2-4 | 6.00% | V$_{10}$ [V]: | 1.97 |
| PGP-2-5 | 8.00% | | |
| CC-3-V | 25.00% | | |
| PGU-2-F | 7.00% | | |
| APUQU-2-F | 7.00% | | |
| APUQU-4-F | 7.00% | | |
| CC-3-XF | 9.00% | | |

EXAMPLE M31

| | | | |
|---|---|---|---|
| GGP-3-Cl | 5.00% | Clearing point [° C.]: | 76.5 |
| BCH-3F.F.F | 8.00% | Δn [589 nm, 20° C.]: | 0.1403 |
| PGP-2-3 | 7.00% | Δε [1 kHz, 20° C.]: | 4.5 |
| PGP-2-4 | 7.00% | γ₁ [mPa · s, 20° C.]: | 66 |
| PGP-2-5 | 7.00% | V₁₀ [V]: | 2.05 |
| PP-1-2V1 | 9.00% | | |
| CC-3-V | 38.00% | | |
| APUQU-3-F | 10.00% | | |
| CPP-2-F | 4.00% | | |
| CPP-3-F | 5.00% | | |

EXAMPLE M32

| | | | |
|---|---|---|---|
| APUQU-2-F | 8.50% | Clearing point [° C.]: | 81.0 |
| APUQU-3-F | 12.00% | Δn [589 nm, 20° C.]: | 0.1317 |
| BCH-3F.F.F | 14.00% | Δε [1 kHz, 20° C.]: | 10.6 |
| CGU-3-F | 10.00% | γ₁ [mPa · s, 20° C.]: | 95 |
| CCPU-2-F | 4.00% | V₁₀ [V]: | 1.33 |
| CCPU-3-F | 4.00% | | |
| CC-3-V | 29.50% | | |
| PGP-2-3 | 6.00% | | |
| PGP-2-4 | 7.00% | | |
| PP-1-2V1 | 5.00% | | |

EXAMPLE M33

| | | | |
|---|---|---|---|
| CC-3-V1 | 18.00% | Clearing point [° C.]: | 80.0 |
| CC-3-V | 37.00% | Δn [589 nm, 20° C.]: | 0.1131 |
| CCP-V-1 | 2.00% | Δε [1 kHz, 20° C.]: | 8.0 |
| CCGU-3-F | 8.00% | γ₁ [mPa · s, 20° C.]: | 65 |
| PGU-2-F | 9.00% | V₁₀ [V]: | 1.59 |
| PGU-3-F | 11.00% | | |
| APUQU-2-F | 5.00% | | |
| APUQU-3-F | 5.00% | | |
| PGIGP-3-5 | 5.00% | | |

EXAMPLE M34

| | | | |
|---|---|---|---|
| CC-3-V | 38.00% | Clearing point [° C.]: | 75.0 |
| PP-1-2V1 | 9.00% | Δn [589 nm, 20° C.]: | 0.1243 |
| BCH-3F.F.F | 8.00% | Δε [1 kHz, 20° C.]: | 5.0 |
| BCH-3F.F | 3.00% | γ₁ [mPa•s, 20° C.]: | 58 |
| GGP-3-Cl | 3.00% | V₁₀ [V]: | 1.96 |
| PGP-2-3 | 3.00% | | |
| PGP-2-4 | 6.00% | | |
| CCP-V-1 | 13.00% | | |
| APUQU-2-F | 6.00% | | |
| APUQU-3-F | 6.00% | | |

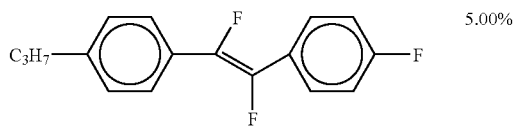

5.00%

EXAMPLE M35

| | | | |
|---|---|---|---|
| CC-3-V | 38.00% | Clearing point [° C.]: | 75.0 |
| PP-1-2V1 | 9.00% | Δn [589 nm, 20° C.]: | 0.1236 |
| BCH-3F.F.F | 8.00% | Δε [1 kHz, 20° C.]: | 5.1 |
| BCH-3F.F | 3.00% | γ₁ [mPa•s, 20° C.]: | 60 |
| GGP-3-Cl | 3.00% | V₁₀ [V]: | 1.96 |
| PGP-2-3 | 3.00% | | |
| PGP-2-4 | 6.00% | | |
| CCP-V-1 | 13.00% | | |
| APUQU-2-F | 6.00% | | |
| APUQU-3-F | 6.00% | | |

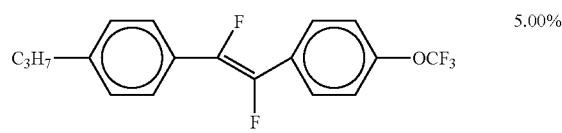

5.00%

EXAMPLE M36

| | | | |
|---|---|---|---|
| CP-3-CI | 2.00% | Clearing point [° C.]: | 75.3 |
| APUQU-2-F | 6.00% | Δn [589 nm, 20° C.]: | 0.1117 |
| BCH-3F.F.F | 16.00% | Δε [1 kHz, 20° C.]: | 3.4 |
| CC-3-V | 46.00% | γ₁ [mPa·s, 20° C.]: | 50 |
| CCP-V-1 | 9.00% | | |
| PGP-2-3 | 10.00% | | |
| PGP-2-5 | 11.00% | | |

EXAMPLE M37

| | | | |
|---|---|---|---|
| APUQU-2-F | 4.00% | Clearing point [° C.]: | 76.0 |
| APUQU-3-F | 7.00% | Δn [589 nm, 20° C.]: | 0.1152 |
| CPGU-3-OT | 6.00% | Δε [1 kHz, 20° C.]: | +4.2 |
| BCH-3F.F.F | 3.00% | γ₁ [mPa·s, 20° C.]: | 53 |
| CCP-V-1 | 6.00% | $V_{10}$ [V]: | 2.11 |
| PGP-2-4 | 7.00% | LTS in cells at −20° C.: | >1000 h |
| PGP-2-2V | 8.00% | | |
| CC-3-V | 51.00% | | |
| PP-1-2V1 | 8.00% | | |

EXAMPLE M38

| | | | |
|---|---|---|---|
| PGP-2-2V | 9.00% | Clearing point [° C.]: | 76.0 |
| PGP-2-4 | 8.00% | Δn [589 nm, 20° C.]: | 0.1409 |
| PGP-2-5 | 9.00% | Δε [1 kHz, 20° C.]: | +4.1 |
| PP-1-2V1 | 10.00% | γ₁ [mPa·s, 20° C.]: | 60 |
| CC-3-V | 44.50% | $V_{10}$ [V]: | 2.16 |
| APUQU-3-F | 6.00% | | |
| CPGU-4-OT | 6.50% | | |
| PGU-3-F | 7.00% | | |

EXAMPLE M39

| | | | |
|---|---|---|---|
| GGP-3-CI | 10.00% | Clearing point [° C.]: | 73.5 |
| CGU-3-F | 6.00% | Δn [589 nm, 20° C.]: | 0.1496 |
| PGP-2-2V | 8.00% | Δε [1 kHz, 20° C.]: | +4.3 |
| PGP-2-4 | 8.00% | γ₁ [mPa·s, 20° C.]: | 65 |
| PGP-2-5 | 8.00% | $V_{10}$ [V]: | 2.05 |
| PP-1-2V1 | 12.00% | LTS in cells at −20° C.: | >1000 h |
| CC-3-V | 38.00% | LTS in cells at −30° C.: | >1000 h |
| CPGU-3-OT | 4.00% | | |
| APUQU-2-F | 6.00% | | |

EXAMPLE M40

| | | | |
|---|---|---|---|
| PGP-2-2V | 9.00% | Clearing point [° C.]: | 75.5 |
| PGP-2-4 | 8.00% | Δn [589 nm, 20° C.]: | 0.1367 |
| PGP-2-5 | 9.50% | Δε [1 kHz, 20° C.]: | +4.2 |
| PP-1-2V1 | 8.00% | γ₁ [mPa·s, 20° C.]: | 56 |
| CC-3-V | 46.50% | $V_{10}$ [V]: | 2.13 |
| APUQU-2-F | 8.00% | LTS in cells at −20° C.: | >1000 h |
| CPGU-3-OT | 6.00% | LTS in cells at −30° C.: | >1000 h |
| PGU-3-F | 5.00% | | |

EXAMPLE M41

| | | | |
|---|---|---|---|
| APUQU-2-F | 4.00% | Clearing point [° C.]: | 75.5 |
| APUQU-3-F | 7.00% | Δn [589 nm, 20° C.]: | 0.1157 |
| CPGU-3-OT | 6.00% | Δε [1 kHz, 20° C.]: | +4.2 |
| BCH-3F.F.F | 3.00% | γ₁ [mPa·s, 20° C.]: | 56 |
| CCP-V-1 | 6.00% | $V_{10}$ [V]: | 2.10 |
| PGP-2-4 | 8.00% | LTS in cells at −20° C.: | >1000 h |
| PGP-2-5 | 8.00% | | |
| CC-3-V | 50.00% | | |
| PP-1-2V1 | 8.00% | | |

EXAMPLE M42

| | | | |
|---|---|---|---|
| CC-3-V | 61.50% | Clearing point [° C.]: | 72 |
| PP-1-2V1 | 4.00% | Δn [589 nm, 20° C.]: | 0.1048 |
| PGP-2-3 | 5.50% | Δε [1 kHz, 20° C.]: | +4.4 |
| PGP-2-4 | 8.00% | γ₁ [mPa·s, 20° C.]: | 46 |
| CPGU-3-OT | 8.00% | $V_{10}$ [V]: | 1.96 |
| APUQU-3-F | 13.00% | | |

EXAMPLE M43

| | | | |
|---|---|---|---|
| CCU-3-OXF | 10.00% | Clearing point [° C.]: | 81.5 |
| CGU-3-OXF | 25.00% | Δn [589 nm, 20° C.]: | 0.1103 |
| APUQU-3-F | 10.00% | Δε [1 kHz, 20° C.]: | +8.7 |
| CPGU-3-OT | 8.00% | γ₁ [mPa·s, 20° C.]: | 72 |
| CC-3-V | 42.00% | $V_{10}$ [V]: | 1.43 |
| PGP-2-4 | 5.00% | LTS in cells at −20° C.: | >1000 h |
| | | LTS in cells at −30° C.: | >1000 h |

EXAMPLE M44

| | | | |
|---|---|---|---|
| CC-3-V | 48.00% | Clearing point [° C.]: | 77 |
| PGP-2-4 | 5.00% | Δn [589 nm, 20° C.]: | 0.1186 |
| PGP-2-5 | 5.00% | Δε [1 kHz, 20° C.]: | +5.9 |
| PP-1-2V1 | 8.00% | γ₁ [mPa·s, 20° C.]: | 56 |
| APUQU-3-F | 11.00% | $V_{10}$ [V]: | 1.79 |
| CPGU-3-OT | 8.00% | | |
| CPU-3-OXF | 15.00% | | |

EXAMPLE M45

| | | | |
|---|---|---|---|
| GGP-3-CI | 6.00% | Clearing point [° C.]: | 73 |
| GGP-5-CI | 4.00% | Δn [589 nm, 20° C.]: | 0.1396 |
| PGP-2-2V | 10.00% | Δε [1 kHz, 20° C.]: | +3.7 |
| PGP-2-4 | 10.00% | γ₁ [mPa·s, 20° C.]: | 59 |
| PGP-2-5 | 5.00% | $V_{10}$ [V]: | 2.15 |
| PP-1-2V1 | 8.00% | | |
| CC-3-V | 46.00% | | |
| APUQU-3-F | 11.00% | | |

EXAMPLE M46

| | | | |
|---|---|---|---|
| APUQU-2-F | 8.00% | Clearing point [° C.]: | 76.5 |
| APUQU-3-F | 8.00% | Δn [589 nm, 20° C.]: | 0.1160 |
| BCH-32 | 8.00% | Δε [1 kHz, 20° C.]: | +5.2 |
| GGP-3-Cl | 5.00% | γ₁ [mPa·s, 20° C.]: | 59 |
| GPP-2-3 | 4.00% | $V_{10}$ [V]: | 1.92 |
| GPP-3-2 | 4.00% | | |
| BCH-3F.F.F | 5.00% | | |
| CC-3-V | 47.00% | | |
| CCP-V-1 | 5.00% | | |
| PP-1-2V1 | 6.00% | | |

EXAMPLE M47

| | | | |
|---|---|---|---|
| CC-3-V | 49.00% | Clearing point [° C.]: | 74 |
| CC-3-V1 | 6.00% | Δn [589 nm, 20° C.]: | 0.1054 |
| PGP-2-3 | 3.00% | Δε [1 kHz, 20° C.]: | +4.5 |
| PGP-2-4 | 7.00% | γ₁ [mPa·s, 20° C.]: | 47 |
| APUQU-3-F | 6.00% | $V_{10}$ [V]: | 1.94 |
| CPU-3-OXF | 29.00% | LTS in cells at −20° C.: | >1000 h |
| | | LTS in cells at −30° C.: | >1000 h |

EXAMPLE M48

| | | | |
|---|---|---|---|
| CDU-2-F | 6.00% | Clearing point [° C.]: | 75.5 |
| PGU-2-OXF | 9.00% | Δn [589 nm, 20° C.]: | 0.1010 |
| PGU-3-OXF | 6.50% | Δε [1 kHz, 20° C.]: | +8.6 |
| CC-3-V | 54.50% | γ₁ [mPa·s, 20° C.]: | 55 |
| APUQU-2-F | 9.00% | LTS in cells at −20° C.: | >1000 h |
| APUQU-3-F | 9.00% | | |
| CBC-33 | 6.00% | | |

EXAMPLE M49

| | | | |
|---|---|---|---|
| PGU-2-F | 9.00% | Clearing point [° C.]: | 74 |
| PGU-3-F | 3.50% | Δn [589 nm, 20° C.]: | 0.1059 |
| CC-3-V | 59.50% | Δε [1 kHz, 20° C.]: | +7.1 |
| APUQU-2-F | 8.00% | γ₁ [mPa·s, 20° C.]: | 50 |
| APUQU-3-F | 7.00% | LTS in cells at −20° C.: | >1000 h |
| MPP-3-F | 4.00% | | |
| MPP-5-F | 4.50% | | |
| CBC-33 | 4.50% | | |

EXAMPLE M50

| | | | |
|---|---|---|---|
| CC-3-V | 48.50% | Clearing point [° C.]: | 80 |
| APUQU-2-F | 8.50% | Δn [589 nm, 20° C.]: | 0.1028 |
| APUQU-3-F | 9.50% | Δε [1 kHz, 20° C.]: | +8.4 |
| CBC-33 | 2.50% | γ₁ [mPa·s, 20° C.]: | 59 |
| CPU-3-OXF | 31.00% | | |

EXAMPLE M51

| | | | |
|---|---|---|---|
| CPU-3-OXF | 23.50% | Clearing point [° C.]: | 74.5 |
| CC-3-V | 49.00% | Δn [589 nm, 20° C.]: | 0.1050 |
| PGP-2-4 | 7.00% | Δε [1 kHz, 20° C.]: | +7.7 |
| APUQU-2-F | 11.00% | γ₁ [mPa·s, 20° C.]: | 55 |
| APUQU-3-F | 6.50% | | |
| CCZU-3-F | 3.00% | | |

EXAMPLE M52

| | | | |
|---|---|---|---|
| PGU-2-OXF | 10.00% | Clearing point [° C.]: | 73.5 |
| PGU-4-OXF | 8.50% | Δn [589 nm, 20° C.]: | 0.1012 |
| CC-3-V1 | 10.00% | Δε [1 kHz, 20° C.]: | +7.2 |
| CC-3-V | 47.00% | γ₁ [mPa·s, 20° C.]: | 50 |
| CCP-V-1 | 7.50% | | |
| APUQU-2-F | 9.00% | | |
| APUQU-3-F | 6.00% | | |
| CCGU-3-F | 2.00% | | |

EXAMPLE M53

| | | | |
|---|---|---|---|
| APUQU-3-F | 8.00% | Clearing point [° C.]: | 75.0 |
| PGU-2-F | 7.00% | Δn [589 nm, 20° C.]: | 0.0918 |
| PGU-3-F | 7.50% | Δε [1 kHz, 20° C.]: | +5.6 |
| CC-3-V | 48.00% | γ₁ [mPa·s, 20° C.]: | 53 |
| CC-3-V1 | 3.50% | | |
| CCP-V-1 | 16.00% | | |
| CCZU-3-F | 10.00% | | |

EXAMPLE M54

| | | | |
|---|---|---|---|
| APUQU-3-F | 9.00% | Clearing point [° C.]: | 76.0 |
| CCP-V-1 | 8.00% | Δn [589 nm, 20° C.]: | 0.1158 |
| PGP-2-3 | 4.00% | Δε [1 kHz, 20° C.]: | +4.2 |
| PGP-2-4 | 5.00% | γ₁ [mPa·s, 20° C.]: | 47 |
| PGP-2-2V | 5.00% | $V_{10}$ [V]: | 2.06 |
| CC-3-V | 54.00% | | |
| PGU-V2-OXF | 15.00% | | |

EXAMPLE M55

| | | | |
|---|---|---|---|
| APUQU-3-F | 6.00% | Clearing point [° C.]: | 90.0 |
| APUQU-2-F | 8.00% | Δn [589 nm, 20° C.]: | 0.1308 |
| PGU-2-F | 5.00% | Δε [1 kHz, 20° C.]: | +6.9 |
| CP-3-CL | 4.00% | γ₁ [mPa·s, 20° C.]: | 74 |
| CC-3-V | 36.00% | | |
| CCP-V-1 | 16.00% | | |
| PGP-2-3 | 6.00% | | |
| PGP-2-4 | 4.00% | | |
| PGP-2-5 | 4.00% | | |
| CPGP-4-3 | 3.00% | | |
| CPGU-3-OT | 3.00% | | |
| P(NF)U-3-F | 3.00% | | |
| P(NF)G-3-F | 2.00% | | |

EXAMPLE M56

| | | | |
|---|---|---|---|
| PGU-2-F | 2.50% | Clearing point [° C.]: | 74.0 |
| APUQU-2-F | 11.00% | Δn [589 nm, 20° C.]: | 0.1125 |
| APUQU-3-F | 8.50% | Δε [1 kHz, 20° C.]: | +5.9 |
| CC-3-V | 53.00% | $\gamma_1$ [mPa · s, 20° C.]: | 48 |
| CC-3-V1 | 6.50% | | |
| P(NF)P-2-4 | 5.50% | | |
| P(NF)P-3-2 | 6.50% | | |
| P(NF)P-4-2 | 6.50% | | |

The invention claimed is:

1. A liquid-crystalline medium based on a mixture of polar compounds, comprising one or more compounds of formula I and one or more compounds of formulae ST, XIIb, IVb-1, IVb-2, VIIIm, IXd and/or D4

I

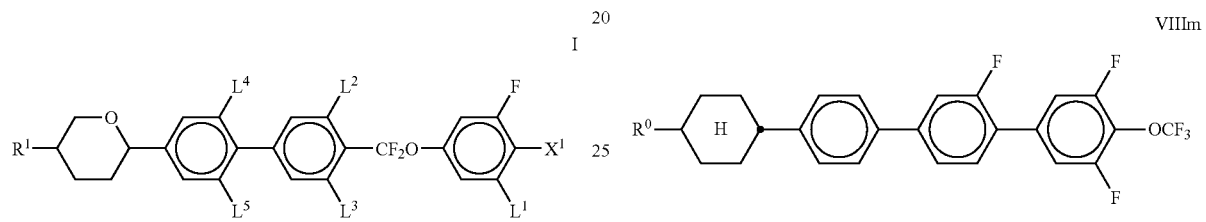

in which
R$^1$ denotes a halogenated or unsubstituted alkyl or alkoxy radical having 1 to 15 C atoms, in which one or more CH$_2$ groups may each be replaced, independently of one another, by —C≡C—, —CH═CH—, —O—, —CO—O— or —O—CO— in such a way that O atoms are not linked directly to one another, X$^1$ in each case, independently of one another, denotes F, Cl, CN, SF$_5$, NCS, a halogenated alkyl radical, a halogenated alkenyl radical, a halogenated alkoxy radical or a halogenated alkenyloxy radical having up to 6 C atoms, and L$^1$ to L$^5$ each, independently of one another, denote H or F,

ST

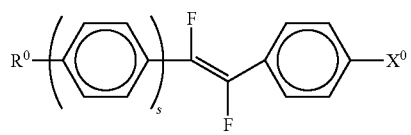

in which
R$^0$ denotes n-alkyl, alkylalkoxy, alkoxy, alkenyloxy, fluoroalkyl or alkenyl, each having up to 9 C atoms,
X$^0$ denotes F, Cl, halogenated alkyl, halogenated alkenyl, halogenated alkenyloxy or halogenated alkoxy having up to 6 C atoms, and
s is 1 or 2, XIIb

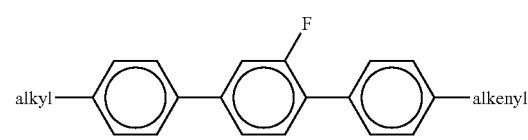

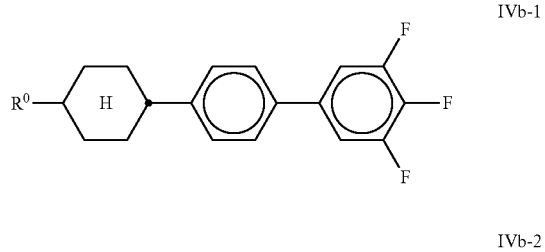

in which
R$^0$ has the definition from above as for the compound of ST, alkyl denotes a straight-chain alkyl radical having 1-7 C atoms, and alkenyl denotes a straight-chain alkenyl radical having 2-7 C atoms, with the provisos that, aside from the compounds of Formula I, the liquid-crystalline medium comprises no further compounds having a CF$_2$O bridge group connecting ring groups, and no further compounds containing a pyran ring.

2. A liquid-crystalline medium according to claim 1, wherein R$^1$ in the compound of formula I denotes a straight-chain alkyl.

3. A liquid-crystalline medium according to claim 1, which comprises one or more compounds of formulae I-1 to I-48

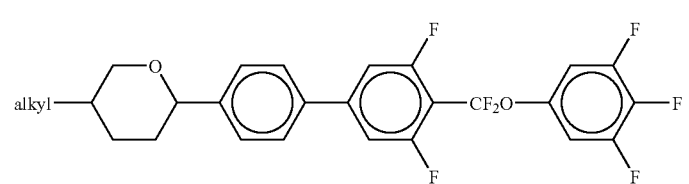
I-1
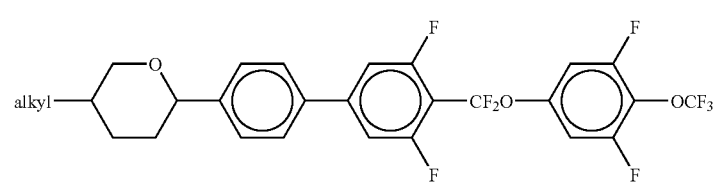
I-2
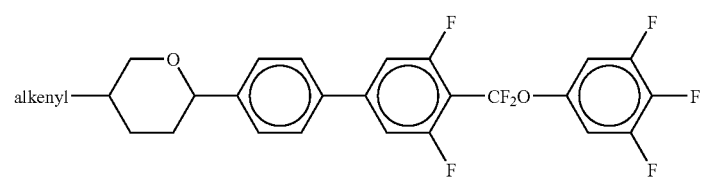
I-3
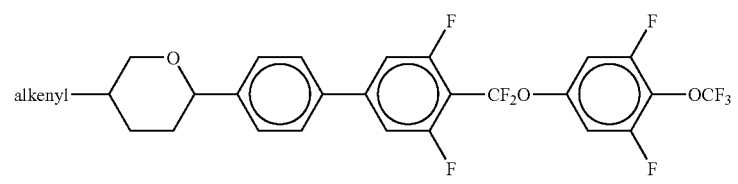
I-4
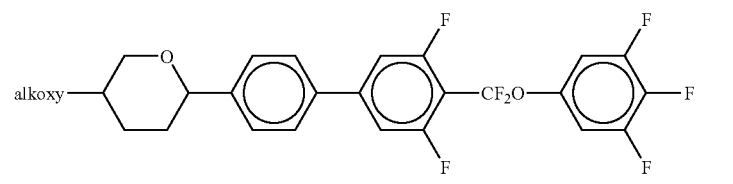
I-5
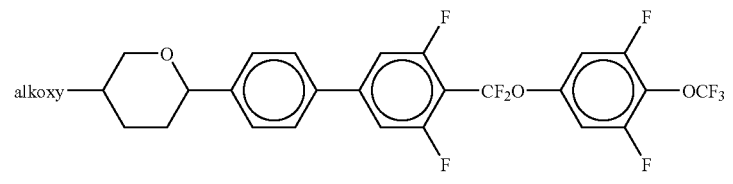
I-6
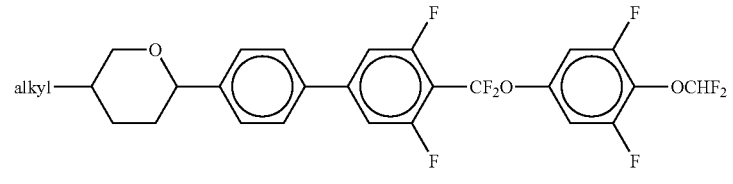
I-7
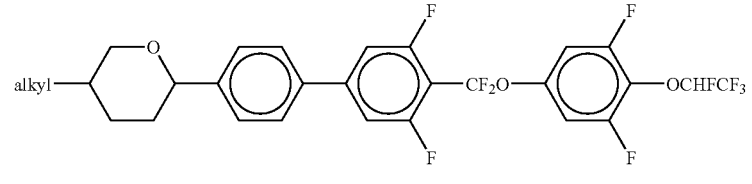
I-8
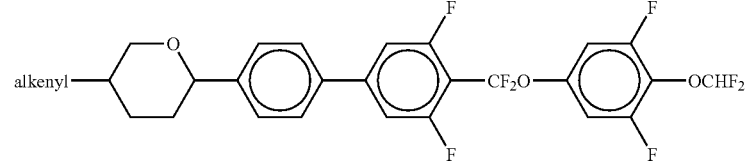
I-9

-continued
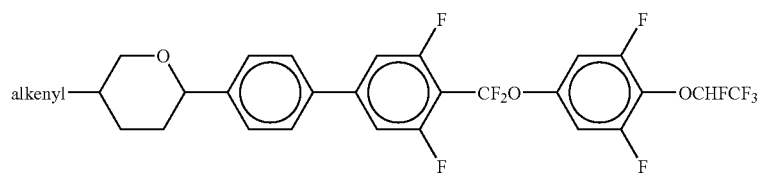
I-10
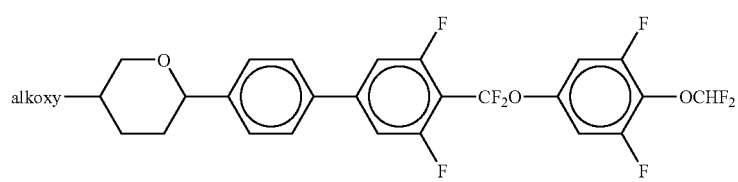
I-11
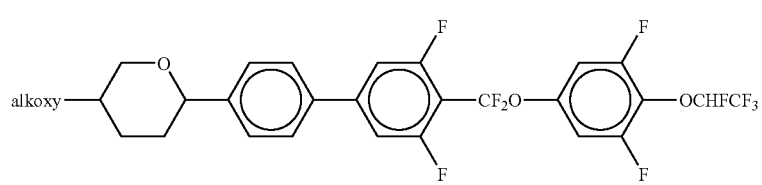
I-12
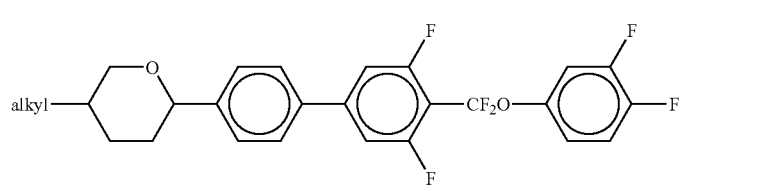
I-13
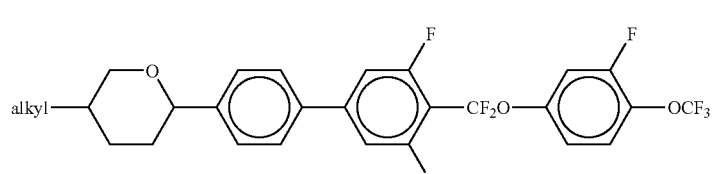
I-14
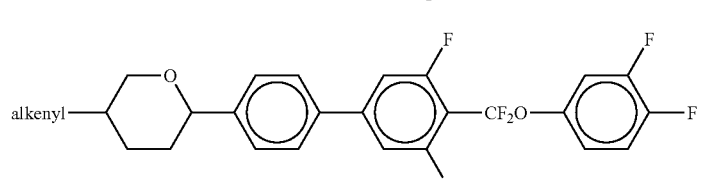
I-15
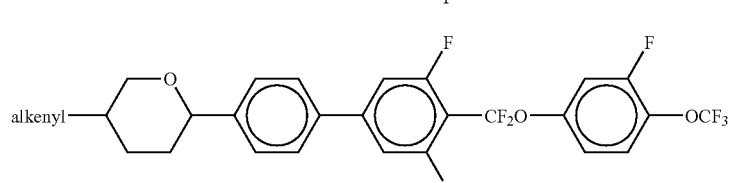
I-16
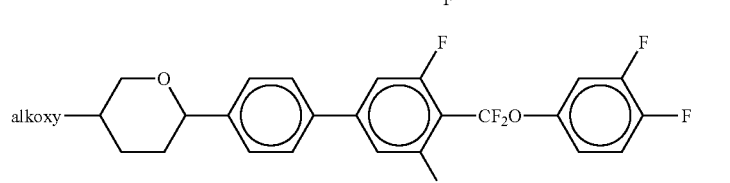
I-17
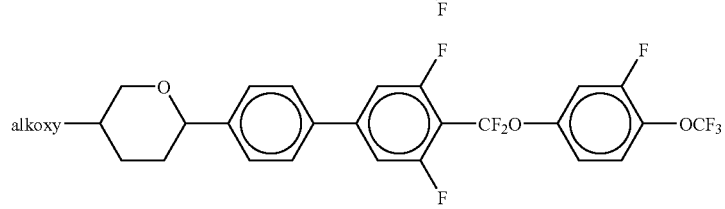
I-18

I-19
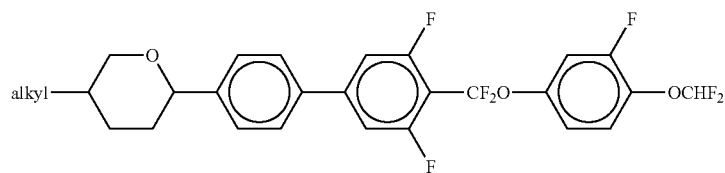
I-20
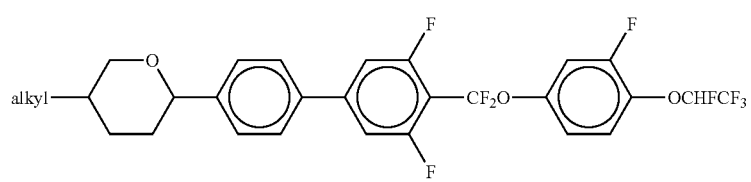
I-21
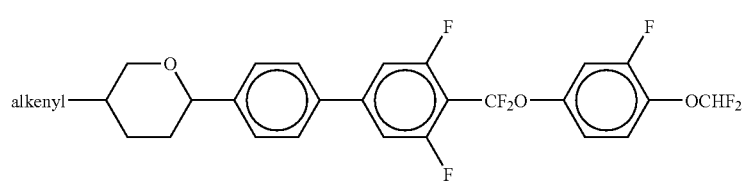
I-22
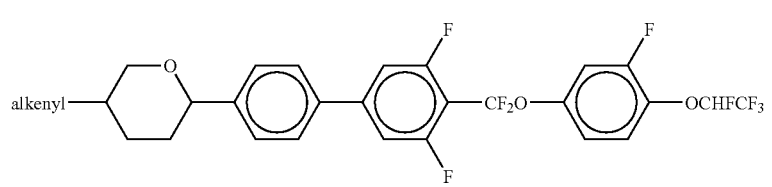
I-23
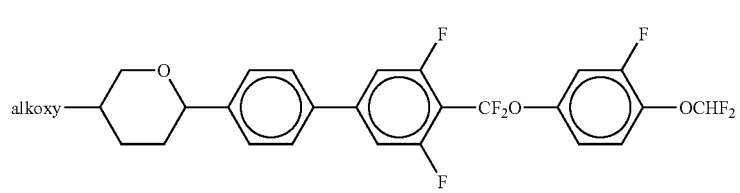
I-24
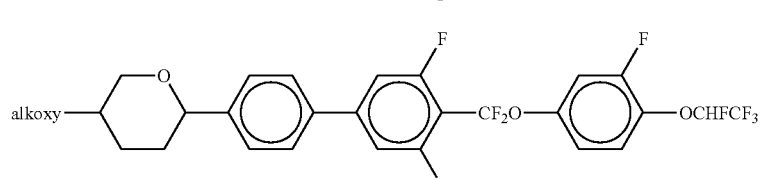
I-25
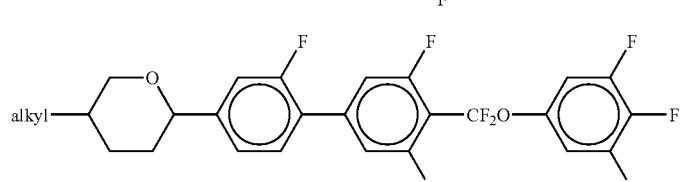
I-26
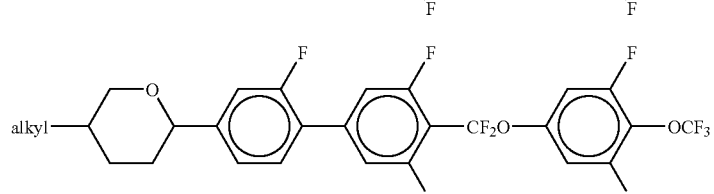
I-27
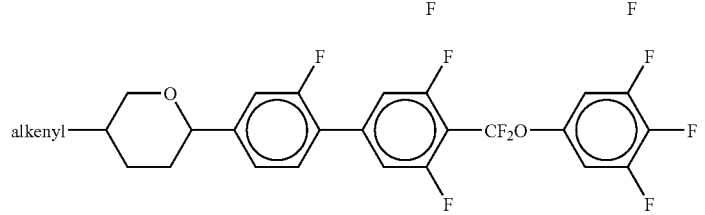

-continued
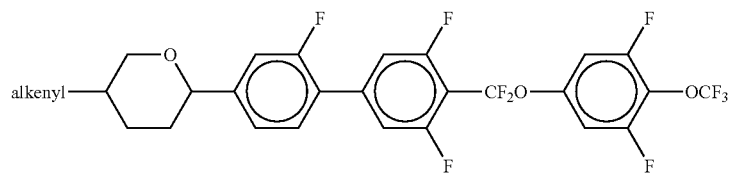
I-28
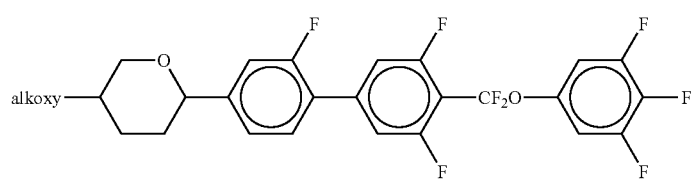
I-29
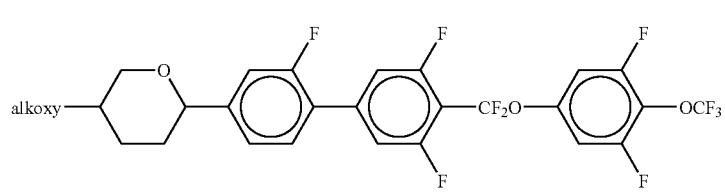
I-30
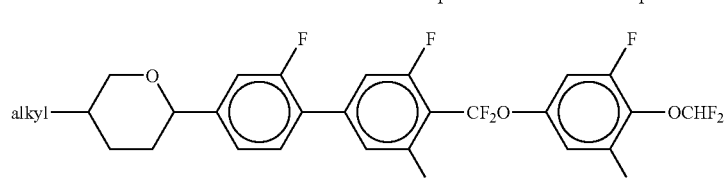
I-31
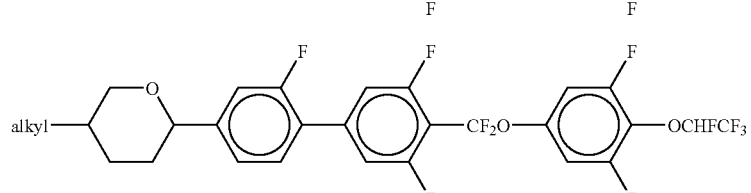
I-32
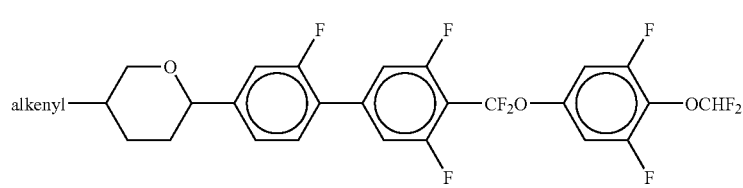
I-33
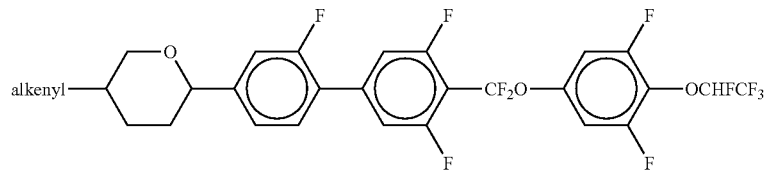
I-34
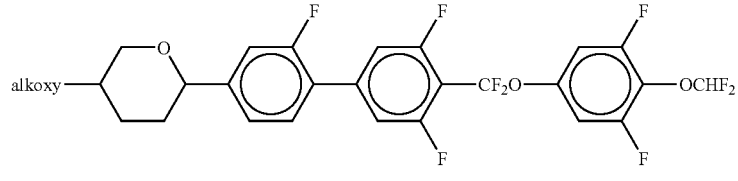
I-35
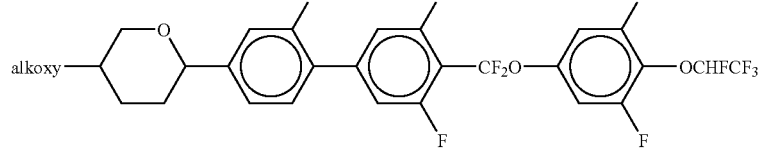
I-36

I-37
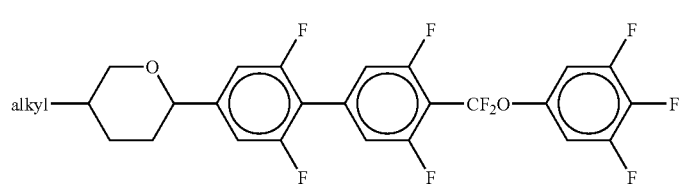
I-38
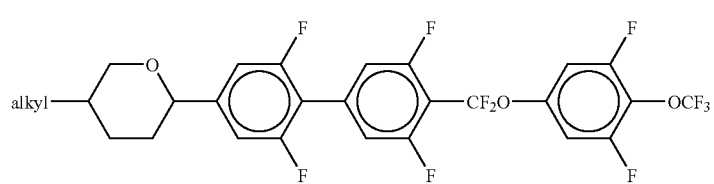
I-39
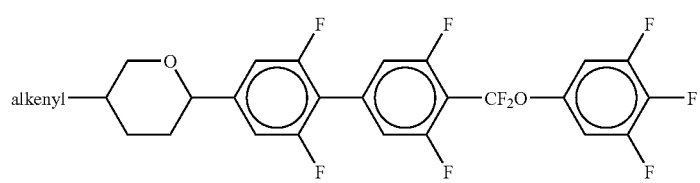
I-40
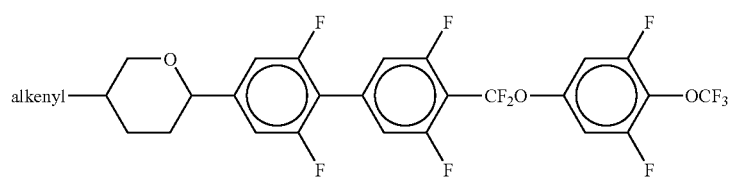
I-41
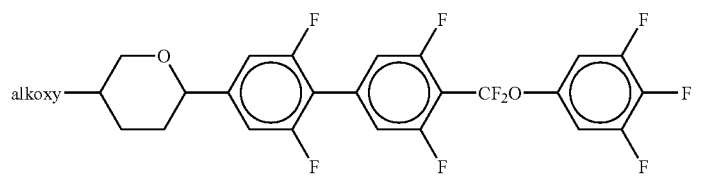
I-42
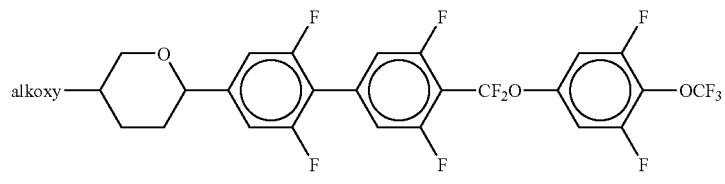
I-43
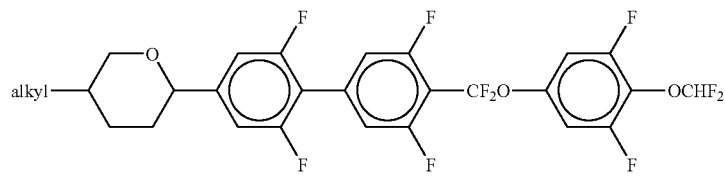
I-44
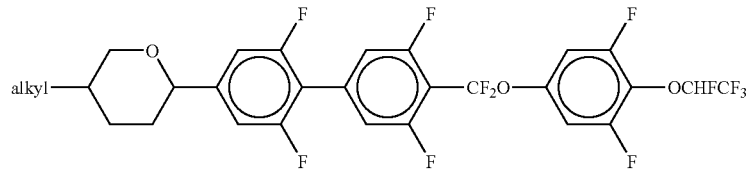
I-45
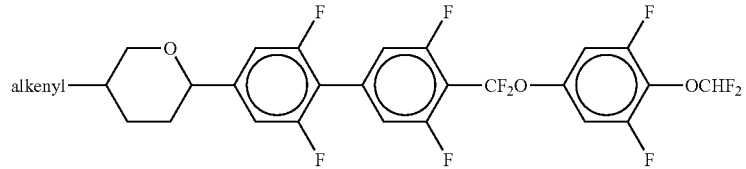

-continued

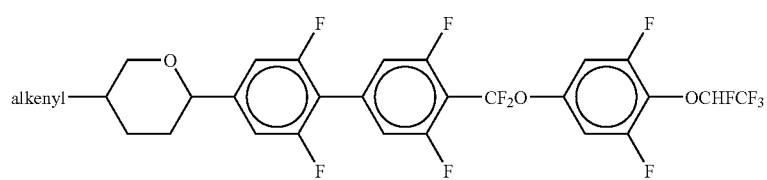
I-46

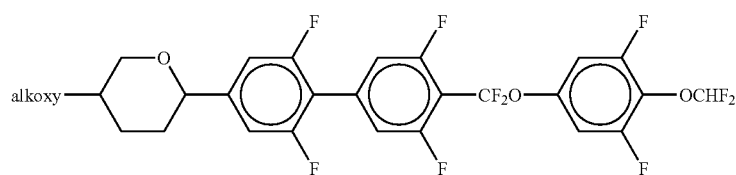
I-47

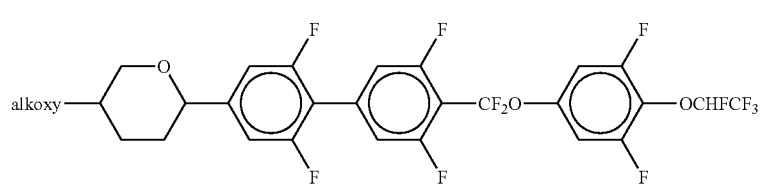
I-48 in which alkyl denotes a straight-chain alkyl radical having 1-7 C atoms, alkoxy denotes a straight-chain alkoxy radical having 1-7 C atoms, alkenyl denotes a straight-chain alkenyl radical having 2-7 C atoms.

4. A liquid-crystalline medium according to claim 1, further comprising one or more bicyclic compounds of formulae Z-1 to Z-10

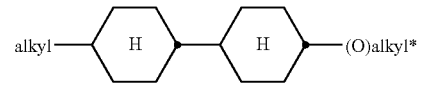
Z-1

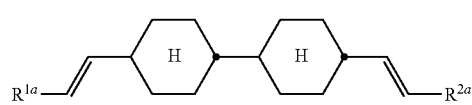
Z-2

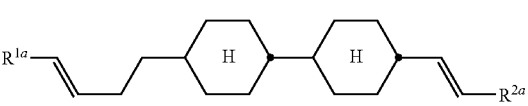
Z-3

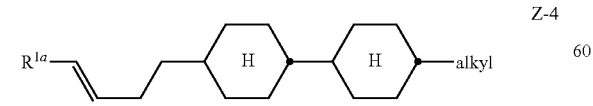
Z-4

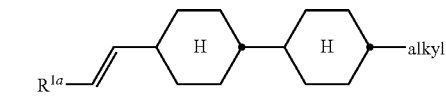
Z-5

-continued

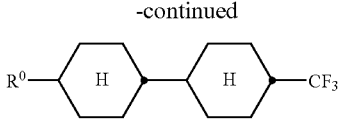
Z-6

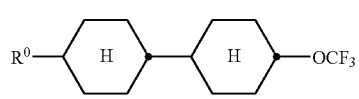
Z-7

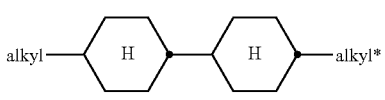
Z-8

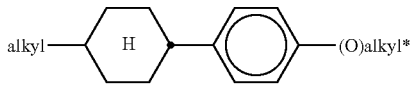
Z-9

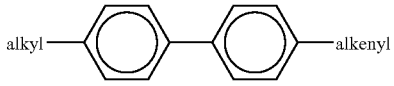
Z-10 in which $R^0$ denotes n-alkyl, alkylalkoxy, alkoxy, alkenyloxy, fluoroalkyl or alkenyl, each having up to 9 C atoms, $R^{1a}$ and $R^{2a}$ each, independently of one another, denote H, $CH_3$, $C_2H_5$ or n-$C_3H_7$, alkyl and alkyl* each, independently of one another, denote a straight-chain alkyl radical having 1-7 C atoms, and alkenyl denotes a straight-chain alkenyl radical having 2-7 C atoms.

5. A liquid-crystalline medium according to claim 1, which additionally comprises one or more compounds of formulae II, III, IV or V

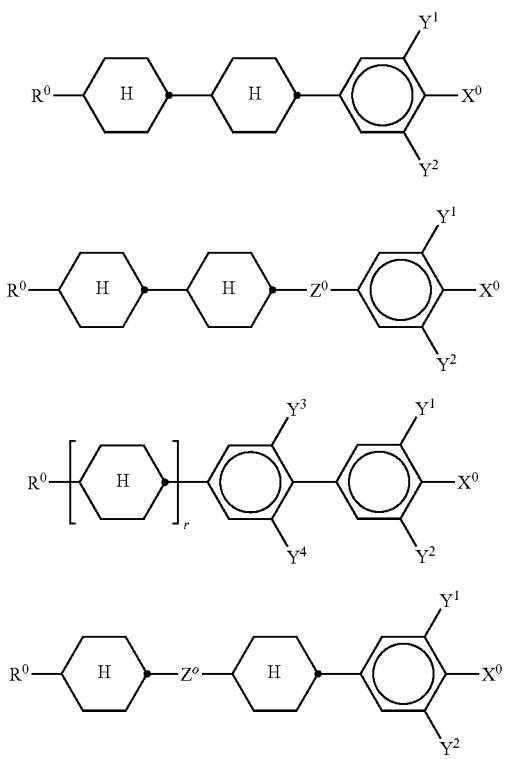

in which
- $R^0$ denotes n-alkyl, alkylalkoxy, alkoxy, alkenyloxy, fluoroalkyl or alkenyl, each having up to 9 C atoms,
- $X^0$ denotes F, Cl, halogenated alkyl, halogenated alkenyl, halogenated alkenyloxy or halogenated alkoxy having up to 6 C atoms,
- $Z^0$ denotes —$C_2F_4$—, —CF=CF—, —$C_2H_4$—, —$(CH_2)_4$—, —$OCH_2$—, or —$CH_2O$—,
- $Y^1$ to $Y^4$ each, independently of one another, denote H or F, and
- r denotes 0 or 1.

6. A liquid-crystalline medium according to claim 1, further comprising one or more compounds of formulae XI to XXVI

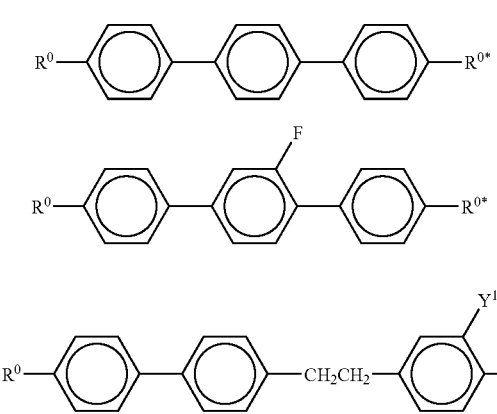

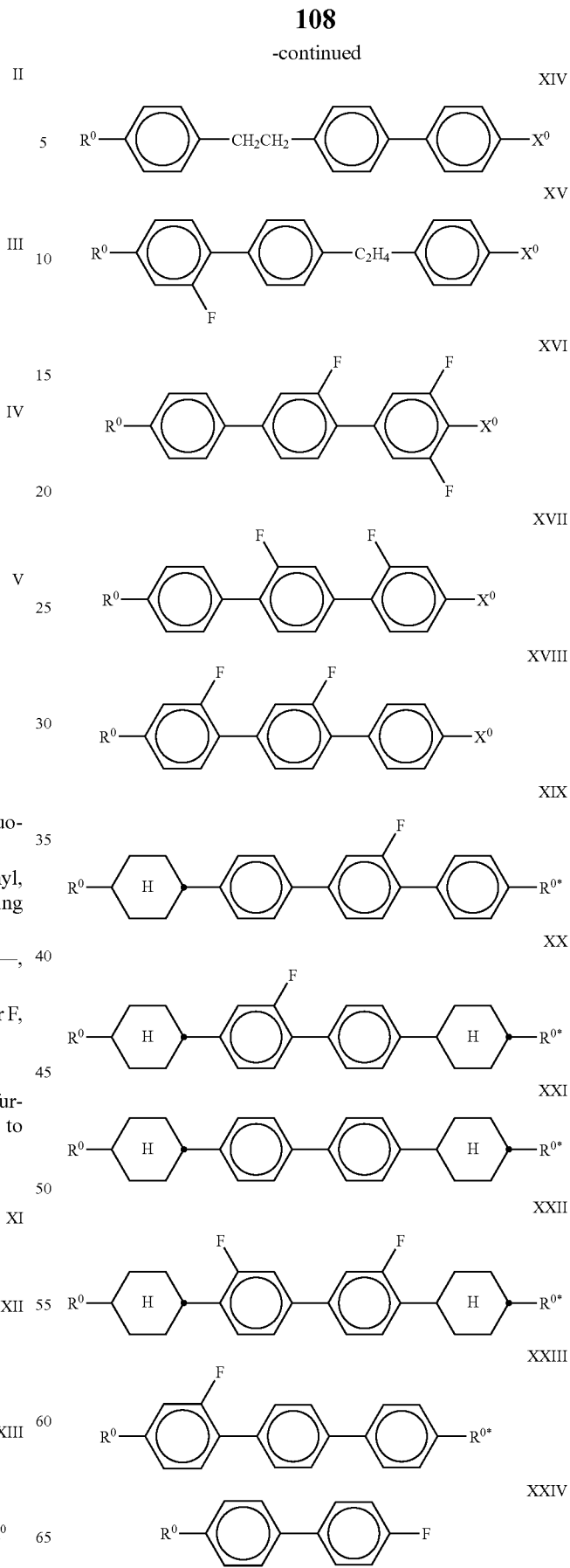

-continued

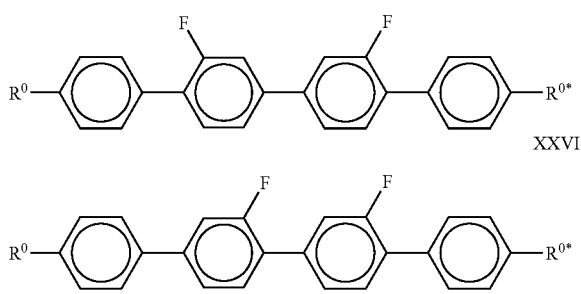

in which
R⁰ denotes n-alkyl, alkylalkoxy, alkoxy, alkenyloxy, fluoroalkyl or alkenyl, each having up to 9 C atoms,
denotes F, Cl, halogenated alkyl, halogenated alkenyl, halogenated alkenyloxy or halogenated alkoxy having up to 6 C atoms,
$Y^1$ denotes H or F, and
R⁰* denotes alkyl or alkenyl, each having up to 6 C atoms.

7. A liquid-crystalline medium according to claim 1, which comprises at least one or more compounds of formula XIIb

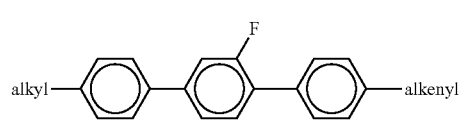

in which
alkyl denotes a straight-chain alkyl radical having 1 to 6 C atoms, and
alkenyl denotes a straight-chain alkenyl radical having 2 to 6 C atoms.

8. A liquid-crystalline medium according to claim 1, further comprising at least one compound of formula XVIIIa

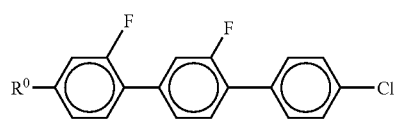

in which
R⁰ denotes n-alkyl, alkylalkoxy, alkoxy, alkenyloxy, fluoroalkyl or alkenyl, each having up to 9 C atoms.

9. A liquid-crystalline medium according to claim 1, further comprising at least one compound of formula Z-5

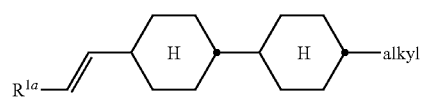

in which
$R^{1a}$ denotes H, CH₃, C₂H₅ or n-C₃H₇.

10. A liquid-crystalline medium according to claim 1, wherein the proportion of compounds of formula I in the mixture as a whole is 3 to 40% by weight.

11. A liquid-crystalline medium according to claim 4, wherein the proportion of compounds of the formula Z-5 in the mixture as a whole is 30-60% by weight.

12. A process for preparing a liquid-crystalline medium according to claim 1, comprising mixing together one or more compounds of formula I with one or more compounds of formulae ST, XIIb, IVb-1, IVb-2, VIIIm, IXd and/or D4.

13. A method of achieving an electro-optical effect, which comprises achieving said effect by a liquid-crystalline medium according to claim 1.

14. An electro-optical liquid-crystal display containing a liquid-crystalline medium according to claim 1.

15. A liquid-crystalline medium according to claim 1, which contains a compound of formula ST.

16. A liquid-crystalline medium according to claim 1, which contains a compound of formula XIIb.

17. A liquid-crystalline medium according to claim 1, which contains a compound of formula IVb-1 or IVb-2.

18. A liquid-crystalline medium according to claim 1, which contains a compound of formula VIIIm.

19. A liquid-crystalline medium according to claim 1, which contains a compound of formula IXd.

20. A liquid-crystalline medium according to claim 1, which contains a compound of formula D4.

21. A liquid-crystalline medium according to claim 1, further comprising at least one or more compounds of formula XIIa

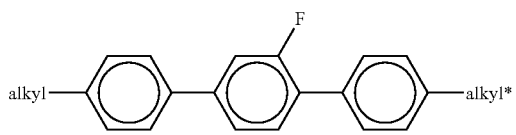

in which
alkyl and alkyl* each denote a straight-chain alkyl radical having 1 to 6 C atoms.

22. A liquid-crystalline medium according to claim 21, which comprises at least one or more compounds of formula XIIb

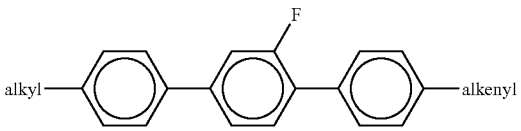

in which
alkyl denotes a straight-chain alkyl radical having 1 to 6 C atoms, and
alkenyl denotes a straight-chain alkenyl radical having 2 to 6 C atoms.

* * * * *

UNITED STATES PATENT AND TRADEMARK OFFICE
CERTIFICATE OF CORRECTION

PATENT NO. : 8,236,390 B2  Page 1 of 1
APPLICATION NO. : 12/809828
DATED : August 7, 2012
INVENTOR(S) : Hirschmann et al.

It is certified that error appears in the above-identified patent and that said Letters Patent is hereby corrected as shown below:

Column 109, line 19, claim 6 reads "denotes F, Cl, halogenated alkyl, halogenated alkenyl," should read -- $X^0$ denotes F, Cl, halogenated alkyl, halogenated alkenyl, --

Signed and Sealed this

Thirteenth Day of November, 2012

David J. Kappos
*Director of the United States Patent and Trademark Office*